United States Patent
Anderson et al.

(10) Patent No.: US 12,439,840 B2
(45) Date of Patent: Oct. 14, 2025

(54) OBTAINING AND AUGMENTING AGRICULTURAL DATA AND GENERATING AN AUGMENTED DISPLAY

(71) Applicant: Deere & Company, Moline, IL (US)

(72) Inventors: Noel W. Anderson, Fargo, ND (US); Cary S. Hubner, Geneseo, IL (US); Brandon M. McDonald, Johnston, IA (US); Nathan Ogden, Mahomet, IL (US); Brittany Sprabery, Woodinville, WA (US); Sean A. Mahrt, Le Claire, IA (US); Sarah L. Schinckel, Ankeny, IA (US); Mark D. Moran, Urbana, IL (US)

(73) Assignee: Deere & Company, Moline, IL (US)

( * ) Notice: Subject to any disclaimer, the term of this patent is extended or adjusted under 35 U.S.C. 154(b) by 816 days.

(21) Appl. No.: 17/669,030

(22) Filed: Feb. 10, 2022

(65) Prior Publication Data
US 2023/0046844 A1    Feb. 16, 2023

Related U.S. Application Data

(60) Provisional application No. 63/231,870, filed on Aug. 11, 2021.

(51) Int. Cl.
*A01B 79/00* (2006.01)
*A01B 69/04* (2006.01)
(Continued)

(52) U.S. Cl.
CPC .......... *A01B 79/005* (2013.01); *A01B 69/008* (2013.01); *A01B 79/02* (2013.01);
(Continued)

(58) Field of Classification Search
CPC ..... A01B 79/005; A01B 69/008; A01B 79/02; G06F 3/0488; G06T 7/0014;
(Continued)

(56) References Cited

U.S. PATENT DOCUMENTS 6,553,312 B2    4/2003  Upadhyaya et al.
7,362,738 B2    4/2008  Taube et al.
(Continued)

FOREIGN PATENT DOCUMENTS

CN    107181323 A    9/2017
CN    108257145      7/2018
(Continued)

OTHER PUBLICATIONS https://www.youtube.com/watch?v=Pu5pXadjtFc&t=3333s, 43:00-53:00 minutes—submitted as a transcript. Hyundai x CES | Hyundai Press Conference at CES 2022 61,669 views Streamed live on Jan. 4, 2022.
(Continued)

*Primary Examiner* — Aditya S Bhat
(74) *Attorney, Agent, or Firm* — Christopher J. Volkmann; KELLY, HOLT & CHRISTENSON PLLC

(57) ABSTRACT

A geographic position of an agricultural machine is captured. Agricultural data is received that corresponds to a geographic position. Georeferenced visual indicia are displayed that are indicative of the received agricultural data.

20 Claims, 38 Drawing Sheets

(51) Int. Cl.
*A01B 79/02* (2006.01)
*G06F 3/0488* (2022.01)
*G06T 7/00* (2017.01)
*H04W 4/18* (2009.01)

(52) U.S. Cl.
CPC .......... *G06F 3/0488* (2013.01); *G06T 7/0014* (2013.01); *H04W 4/185* (2013.01); *G06T 2200/24* (2013.01); *G06T 2207/10024* (2013.01); *G06T 2207/30188* (2013.01); *G06T 2207/30252* (2013.01)

(58) Field of Classification Search
CPC ....... G06T 2200/24; G06T 2207/10024; G06T 2207/30188; G06T 2207/30252; H04W 4/185; H04W 4/024; G06Q 50/02; G09B 29/007
USPC .......................................................... 702/2
See application file for complete search history.

(56) References Cited

U.S. PATENT DOCUMENTS

| | | | |
|---|---|---|---|
| 8,150,617 B2 * | 4/2012 | Manber | H04L 67/52 |
| | | | 701/484 |
| 8,321,365 B2 | 11/2012 | Anderson | |
| 9,058,633 B2 * | 6/2015 | Lindores | G06Q 50/02 |
| 9,282,693 B2 | 3/2016 | Anderson | |
| 9,668,420 B2 | 6/2017 | Andersan et al. | |
| 9,740,208 B2 | 8/2017 | Sugumaran et al. | |
| 9,861,040 B2 * | 1/2018 | Bonefas | A01D 75/00 |
| 10,127,725 B2 | 11/2018 | Kahler et al. | |
| 10,242,499 B2 | 3/2019 | Bryson et al. | |
| 10,577,103 B2 | 3/2020 | Cantrell et al. | |
| 10,638,667 B2 | 5/2020 | Regan et al. | |
| 10,664,518 B2 | 5/2020 | McKinnon et al. | |
| 10,666,856 B1 | 5/2020 | Ruechker | |
| 10,679,056 B2 | 6/2020 | Zemenchik | |
| 10,719,709 B2 | 7/2020 | Zemenchik | |
| 10,740,987 B2 | 8/2020 | Scott et al. | |
| 10,761,544 B2 | 9/2020 | Anderson et al. | |
| 10,806,074 B2 | 10/2020 | Zemenchik | |
| 10,808,074 B2 | 10/2020 | Daugs et al. | |
| 10,820,478 B1 | 11/2020 | Ferrari et al. | |
| 10,885,675 B1 | 1/2021 | Shulman et al. | |
| 10,888,399 B2 | 1/2021 | Kopelman et al. | |
| 10,896,218 B2 | 1/2021 | Reyes Martinez et al. | |
| 10,930,065 B2 | 2/2021 | Grant et al. | |
| 10,957,036 B2 | 3/2021 | Stueve et al. | |
| 11,477,935 B1 | 10/2022 | Muehlfeld | |
| 12,010,986 B2 | 6/2024 | Kwak et al. | |
| 2011/0127659 A1 | 6/2011 | Eskildsen et al. | |
| 2015/0187109 A1 * | 7/2015 | Mentzer | G06T 11/00 |
| | | | 345/632 |
| 2017/0088147 A1 | 3/2017 | Tentinger et al. | |
| 2017/0090196 A1 | 3/2017 | Hendron | |
| 2017/0113610 A1 | 4/2017 | Payne | |
| 2017/0131718 A1 | 5/2017 | Matsumura et al. | |
| 2018/0224802 A1 | 8/2018 | Vasavada et al. | |
| 2018/0271027 A1 | 9/2018 | Funabashi | |
| 2019/0141883 A1 | 5/2019 | Zemenchik | |
| 2019/0228224 A1 | 7/2019 | Guo et al. | |
| 2019/0244428 A1 | 8/2019 | Greenberg et al. | |
| 2020/0107490 A1 | 4/2020 | Zemenchik | |
| 2020/0146203 A1 | 5/2020 | Deng | |
| 2020/0150848 A1 | 5/2020 | Deng | |
| 2020/0230633 A1 | 7/2020 | Serrat et al. | |
| 2020/0281110 A1 | 9/2020 | McNichols et al. | |
| 2020/0329632 A1 | 10/2020 | Yagyu et al. | |
| 2020/0352082 A1 | 11/2020 | Maeder et al. | |
| 2020/0352088 A1 | 11/2020 | Arnett et al. | |
| 2021/0045362 A1 | 2/2021 | Gritzman et al. | |
| 2021/0056338 A1 | 2/2021 | Padwick et al. | |
| 2021/0084805 A1 | 3/2021 | Cozza et al. | |
| 2021/0089027 A1 | 3/2021 | Dasika | |
| 2021/0185885 A1 | 6/2021 | Sibley et al. | |
| 2021/0185886 A1 * | 6/2021 | Sibley | G05D 1/0274 |
| 2021/0192211 A1 | 6/2021 | Sibley et al. | |
| 2021/0243939 A1 | 8/2021 | Strnad et al. | |
| 2022/0100996 A1 | 3/2022 | Fu et al. | |
| 2022/0101554 A1 | 3/2022 | Fu et al. | |
| 2022/0132828 A1 | 5/2022 | Kwak et al. | |
| 2022/0256764 A1 | 8/2022 | Henry et al. | |
| 2023/0000015 A1 | 1/2023 | Herrmann et al. | |
| 2023/0028706 A1 | 1/2023 | Watson et al. | |
| 2023/0112376 A1 | 4/2023 | Strnad et al. | |
| 2023/0136009 A1 | 5/2023 | Faers et al. | |
| 2023/0343090 A1 | 10/2023 | Khait et al. | |
| 2023/0371492 A1 | 11/2023 | Houis | |
| 2024/0180064 A1 | 6/2024 | Tempelmeyer et al. | |
| 2024/0295954 A1 | 9/2024 | Stoller et al. | |

FOREIGN PATENT DOCUMENTS

| | | |
|---|---|---|
| DE | 102019114667 A1 | 12/2020 |
| EP | 3418956 A1 | 12/2018 |
| EP | 3418956 A4 | 12/2018 |
| JP | 2871609 | 3/1999 |
| JP | 6512463 | 4/2019 |
| WO | WO2012142395 A1 | 10/2012 |
| WO | 2017024358 A1 | 2/2017 |
| WO | 2017061281 A1 | 4/2017 |
| WO | 2018048708 A1 | 3/2018 |
| WO | 2019000325 | 1/2019 |
| WO | 20006236 A1 | 1/2020 |
| WO | WO2021081428 A1 | 4/2021 |

OTHER PUBLICATIONS

Hridja, Augmented Reality in Agriculture, Dec. 26, 2019, https://www.queppelin.com/augmented-reality-in-agriculture/, 11 pages.
Aimee Chanthadavong, AI and gamification being used to help Aussie farmers reduce spray drift impact. May 2, 2021, 5 pages.
Farmwise.io website, Apr. 28, 2021, 6 pages.
https://www.agritecture.com/blog/2018/11/27/the-hidden-potential-of-augmented-reality-in-farming, Nov. 27, 2018, 5 pages.
https://www.precisionplanting.com/products/product/smartdepth, Accessed on Feb. 2, 2022, 10 pages.
https://www.farmworks.com/files/manuals/FW_View_English.pdf, Accessed on Feb. 2, 2022. 52 pages.
https://www.ssequip.com/pdf/20-20-seed-sense-overview.pdf, Accessed on Feb. 2, 2022, 6 pages.
Suprem et al. "A review on application of technology systems, standards and interfaces for agriculture and food sector", Computer Standards & Interfaces vol. 35, Issue 4, Jun. 2013, pp. 355-364.
U.S. Appl. No. 17/869,027 Non Final Office Action dated Aug. 10, 2023, 51 pages.
U.S. Appl. No. 17/669,027 Final Office Action dated Feb. 8, 2024, 99 pages.
Extended European Search Report and Written Opinion issued in European Patent Application No. 22182494.9, dated Dec. 2, 2022, in 07 pages.
Extended European Search Report and Written Opinion issued in European Patent Application No. 22182493.1, dated Nov. 24, 2022, in 07 pages.
Extended European Search Report and Written Opinion issued in European Patent Application No. 22182492.3, dated Dec. 1, 2022, in 07 pages.

* cited by examiner

OBTAINING AND AUGMENTING AGRICULTURAL DATA AND GENERATING AN AUGMENTED DISPLAY

CROSS-REFERENCE TO RELATED APPLICATION

The present application is based on and claims the benefit of U.S. provisional patent application Ser. No. 63/231,870, filed Aug. 11, 2021, the content of which is hereby incorporated by reference in its entirety.

FIELD OF THE DISCLOSURE

The present disclosure relates to agriculture. More specifically, the present disclosure relates to an infrastructure for accessing data and generating an augmented display.
BACKGROUND In order to be successful in the field of agriculture, a farmer normally needs to make a relatively large number of decisions each year. Those decisions may determine how successful the farmer will be in that given year.

The decisions can be quite wide ranging. For instance, the farmer can make decisions as to what types of crops to plant in a given year, when to plant them, how much fertilizer to apply, and when to apply it, what types of pest or weed control agents are to be applied (and when), among a wide variety of other decisions. These are just examples of decisions that are made by a farmer.

Mobile computing devices are currently in wide use. Such computing devices include tablet computers, hand held computers, smart phones, and personal digital assistants, to name a few. Such mobile devices are often equipped with functionality that can be used to download and run mobile applications. They often include communication components that can be used to perform a relatively wide variety of different kinds of communication, such as communication using the cellular telephone network, using a wireless local area network (such as Wi-Fi), as well as even using a wired connection (such as Ethernet or others). In general, such mobile devices include functionality that allows them to exchange data, or connect to a wide area network (such as the Internet) wirelessly using radio waves or using other electromagnetic or other communication techniques. In addition, such mobile devices often include image capture components, such as cameras, and position and orientation systems that allow the mobile devices to calculate their own position and orientation.

The discussion above is merely provided for general background information and is not intended to be used as an aid in determining the scope of the claimed subject matter.

SUMMARY

Agricultural data is received that corresponds to a geographic position. Georeferenced visual indicia are displayed to generate an enhanced display on a display device. The georeferenced visual indicia are indicative of the received agricultural data.

Example 1 is a computer-implemented method of controlling an agricultural system, comprising:
receiving predictive visual data indicative of an expected visualization of a geographic location on an agricultural worksite;
receiving an actual visual representation of the geographic location;
comparing the expected visualization of the geographic location to the actual visual representation of the geographic location to identify an anomaly;
generating a geographically referenced anomaly indicator indicative of the anomaly; and
generating an enhanced display, the enhanced display showing the geographic location enhanced with the geographically referenced anomaly indicator.

Example 2 is the computer-implemented method of any or all previous examples and further comprising:
detecting a user interaction with the enhanced display;
processing the detected user interaction to identify additional anomaly information corresponding to the identified anomaly; and
modifying the enhanced display with the additional anomaly information.

Example 3 is the computer-implemented method of any or all previous examples wherein processing the detected user interaction comprises:
performing diagnostic processing to identify, as the additional anomaly information, a diagnostic factor contributing to a possible cause of the anomaly; and
generating a diagnostic factor display element, wherein modifying the enhanced display comprises adding the diagnostic factor display element to the enhanced display.

Example 4 is the computer-implemented method of any or all previous examples wherein processing the detected user interaction comprises:
performing prognosis processing to identify remedial information indicative of a possible remedy for the anomaly; and
generating a possible remedy display element, wherein modifying the enhanced display comprises adding the possible remedy display element to the enhanced display.

Example 5 is the computer-implemented method of any or all previous examples wherein the agricultural system includes an agricultural machine and further comprising:
automatically controlling the agricultural machine to implement the possible remedy.

Example 6 is the computer-implemented method of any or all previous examples and further comprising:
identifying a severity level of the anomaly; and
generating the geographically referenced anomaly indicator to be indicative of the severity level.

Example 7 is the computer-implemented method of any or all previous examples wherein identifying the severity level of the identified anomaly comprises:
generating an anomaly metric value indicative of a measure of difference between the expected visualization and the actual visual representation of the geographic location;
comparing the anomaly metric value to a metric threshold value to obtain a metric difference value; and
identifying the severity level of the identified anomaly based on the metric difference value.

Example 8 is the computer-implemented method of any or all previous examples wherein receiving predictive visual data comprises:
identifying a neighboring geographic location adjacent the geographic location; and
generating the predictive visual data based on a visualization of the neighboring geographic location.

Example 9 is the computer-implemented method of any or all previous examples wherein generating a geographically referenced anomaly indicator comprises:

generating a geometric shaped display element, a geometric shape of the geometric shaped display element being indicative of the geographically referenced anomaly indicator.

Example 10 is the computer-implemented method of any or all previous examples wherein generating a geographically referenced anomaly indicator comprises:

generating a colored display element, a color of the colored display element being indicative of the geographically referenced anomaly indicator.

Example 11 is the computer-implemented method of any or all previous examples wherein receiving predictive visual data indicative of an expected visualization of a geographic location on an agricultural worksite comprises:

obtaining a prior state of the geographic location and prior conditions that affect the prior state;

generating a predictive state of the geographic location based on the prior state and prior conditions; and generating the predictive visual data based on the predictive state of the geographic location.

Example 12 is an agricultural system, comprising:

an expected state identification system identifying predictive visual data indicative of an expected visualization of a geographic location on an agricultural worksite;

a comparison system receiving an actual visual representation of the geographic location and comparing the expected visualization of the geographic location to the actual visual representation of the geographic location to generate a comparison result;

an anomaly identifier identifying an anomaly based on the comparison result;

an anomaly output system generating a geographically referenced anomaly indicator indicative of the anomaly; and a display generation system generating an enhanced display, the enhanced display showing the geographic location enhanced with the geographically referenced anomaly indicator.

Example 13 is the agricultural system of any or all previous examples and further comprising:

a user interaction detector configured to detect a user interaction with the enhanced display;

a workflow processing system configured to process the detected user interaction to identify additional anomaly information corresponding to the identified anomaly; and a display output system configured to modify the enhanced display with the additional anomaly information.

Example 14 is the agricultural system of any or all previous examples wherein the workflow processing system comprises:

a diagnostic system configured to perform diagnostic processing to identify, as the additional anomaly information, a diagnostic factor contributing to a possible cause of the anomaly and generate a diagnostic factor display element, the display generation system modifying the enhanced display by adding the diagnostic factor display element to the enhanced display.

Example 15 is the agricultural system of any or all previous examples wherein the workflow processing system comprises:

a prognosis system configured to perform prognosis processing to identify remedial information indicative of a possible remedy for the anomaly and generate a possible remedy display element, the display generation system modifying the enhanced display by adding the possible remedy display element to the enhanced display.

Example 16 is the agricultural system of any or all previous examples wherein the comparison system is configured to generate an anomaly metric value indicative of a measure of difference between the expected visualization and the actual visual representation of the geographic location and to compare the anomaly metric value to a metric threshold value to obtain a metric difference value and wherein the anomaly identifier is configured to identify a severity level of the identified anomaly based on the metric difference value.

Example 17 is the agricultural system of any or all previous examples wherein the display generation system is configured to generate, as the geographically referenced anomaly indicator, a geometric shaped display element, a geometric shape of the geometric shaped display element being indicative of the geographically referenced anomaly indicator.

Example 18 is the agricultural system of any or all previous examples wherein the display generation system is configured to generate, as the geographically referenced anomaly indicator a colored display element, a color of the colored display element being indicative of the geographically referenced anomaly indicator.

Example 19 is the agricultural system of any or all previous examples and further comprising:

a prior state identification system configured to identify a prior state of the geographic location;

a prior condition identification system configured to identify prior conditions that affect the prior state; and an expected state identification system configured to generate a predictive state of the geographic location based on the prior state and prior conditions.

Example 20 is a computing system, comprising:

at least one processor; and a data store storing computer executable instructions which, when executed by the at least one processor cause the at least one processor to perform steps, comprising:

receiving predictive visual data indicative of an expected visualization of a geographic location on an agricultural worksite;

receiving an actual visual representation of the geographic location;

comparing the expected visualization of the geographic location to the actual visual representation of the geographic location to identify an anomaly;

generating a geographically referenced anomaly indicator indicative of the anomaly; and generating an enhanced display, the enhanced display showing the geographic location enhanced with the geographically referenced anomaly indicator.

This Summary is provided only to introduce some concepts in a simplified form. The concepts are further described below in the Detailed Description. This Summary is not intended to identify either key features or essential features of the claimed subject matter, nor is it intended to be used as an aid in determining the scope of the claimed subject matter. Further, the claimed subject matter is not limited to implementations that solve any or all disadvantages noted in the background.

DETAILED DESCRIPTION

While the background section mentioned some decisions that are made by a farmer, a host of other decisions must also be made throughout the growing season, and even after the growing season. For instance, during the growing season, the farmer may wish to evaluate the progress of various crops to determine whether additional fertilizer or pest or weed control agents should be applied. The farmer may also wish to identify pests and weeds and other plants or animals, in order to determine what types of control agents should be applied. After the growing season, the farmer may wish to analyze yield data in order to determine whether changes should be made during the next growing season.

All of these types of decisions are also influenced by a wide variety of other data. For instance, all of these decisions may be influenced by the weather that was experienced during that year. The decisions may also be influenced by, among other things, the different soil types that reside in a given field, the types and locations of fertilizer or other chemical application, and the seed locations. The decisions may be influenced by the type of equipment that the farmer is using, the types of hybrids or plants that the farmer is planting, and a whole host of other data.

Currently, some farmers attempt to track and consider all of this information, in making their decisions, in a wide variety of different ways. Some farmers simply rely on their memory in order to make these decisions. Other farmers attempt to keep track of various items of information using a plurality of different spreadsheets on one or more different computing devices (such as a laptop or desktop computer). Such farmers often attempt to access data over a large area network (such as the Internet) in order to augment the data used to make their decisions. However, this type of information gathering is cumbersome, time consuming, and can be error prone. It also consumes a large amount of computer processing and memory overhead. It is also relatively imprecise. Further, attempting to obtain and correlate data from various sources consumes a great deal of processing and memory resources in computing, rendering, and navigating through a great many user interface displays.

The present description describes a system that can preprocess and store a wide variety of information. The information may be georeferenced to an agricultural surface, such as a field. The information can be displayed in an augmented reality display where objects or items on the agricultural surface are enhanced on the display by computer-generated perceptual information indicative of the georeferenced information. The perceptual information may be visual, auditory, haptic, or other information.

Figure 1A:
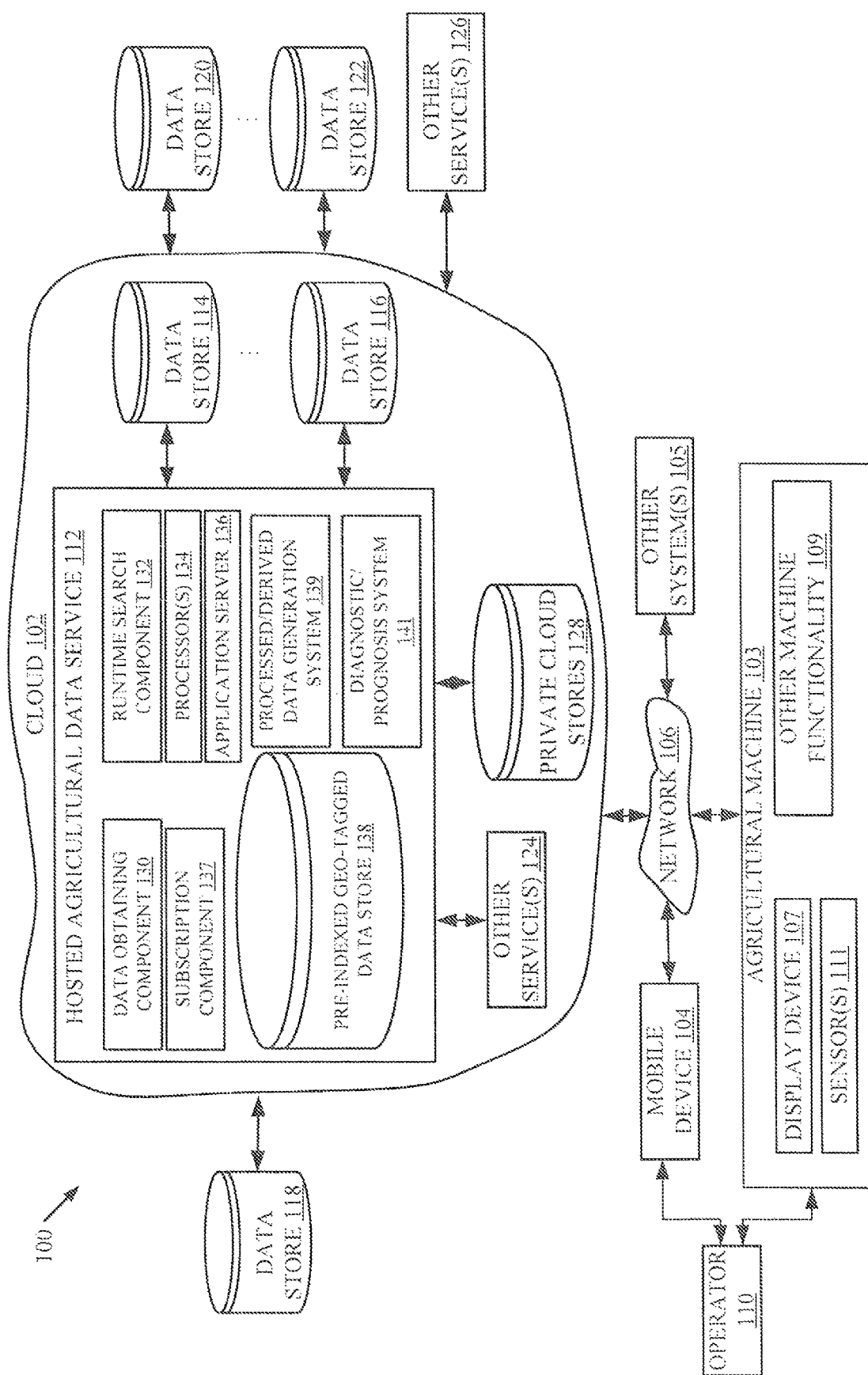
FIG. 1A shows a block diagram of one illustrative agricultural system.

FIG. 1A is a block diagram of one illustrative agricultural system 100. System 100 includes cloud 102. FIG. 1A also shows that agricultural machine 103, mobile device 104, and other systems 105 can communicate with items in cloud 102 over network 106. Network 106 can be a wide area network, a local area network, a near field communication network, a Wi-Fi network, a cellular network, or any of a variety of other networks or combinations of networks. It will be noted that mobile device 104 can be carried or worn by an operator 110 of agricultural machine 103 or mounted in the operator compartment of agricultural machine 103. Also, agricultural machine 103 may have its own display device 107 (in addition to, or instead of, mobile device 104), sensor(s) 111, and other machine functionality 109. Agricultural machine 103 may be a harvester, a planting machine, a tillage machine, a sprayer, a towing vehicle (such as a tractor), an implement, or another agricultural machine 103. Agricultural machine 103 may also be a towing vehicle that is towing an implement, or another vehicle coupled to another implement or attachment. In some examples, agricultural machine 103 may be a teleoperated unmanned land, air, or water vehicle. Operator 110 with mobile device 104 may be at a remote location from agricultural machine 103. Operator 110 may control the location and pose of agricultural machine 103 as well as parameters of sensors 111 and other machine functionality 109 from the remote location. In the example discussed herein, it is assumed that operator 110 uses mobile device 104 to access a hosted agricultural data service 112 in cloud 102. Service 112 can access data stores 114-116, also in cloud 102, or data stores 118, 120, and 122 which are located in other systems or devices, outside of cloud 102. FIG. 1A also shows that hosted data service 112 can access other services 124 in cloud 102, or still additional services 126, that are provided outside of cloud 102.

In addition, FIG. 1A shows that cloud 102 includes private cloud stores 128 which can store private data of various users or operator 110. In the example described herein, operator 110 is illustratively a farmer that has a private cloud store 128 that stores agricultural information for the given farmer 110. Private cloud store 128 is not generally accessible by other, non-authorized, people.

In one example, hosted agricultural data service 112 illustratively includes data obtaining component 130, runtime search component 132, one or more processors (such as computer processors or servers) 134, application server 136, subscription component 137, pre-indexed, geo-tagged data store 138, processed/derived data generation system 139, and diagnostic/prognosis system 141. These items will each be described in more detail below.

Figure 1B:
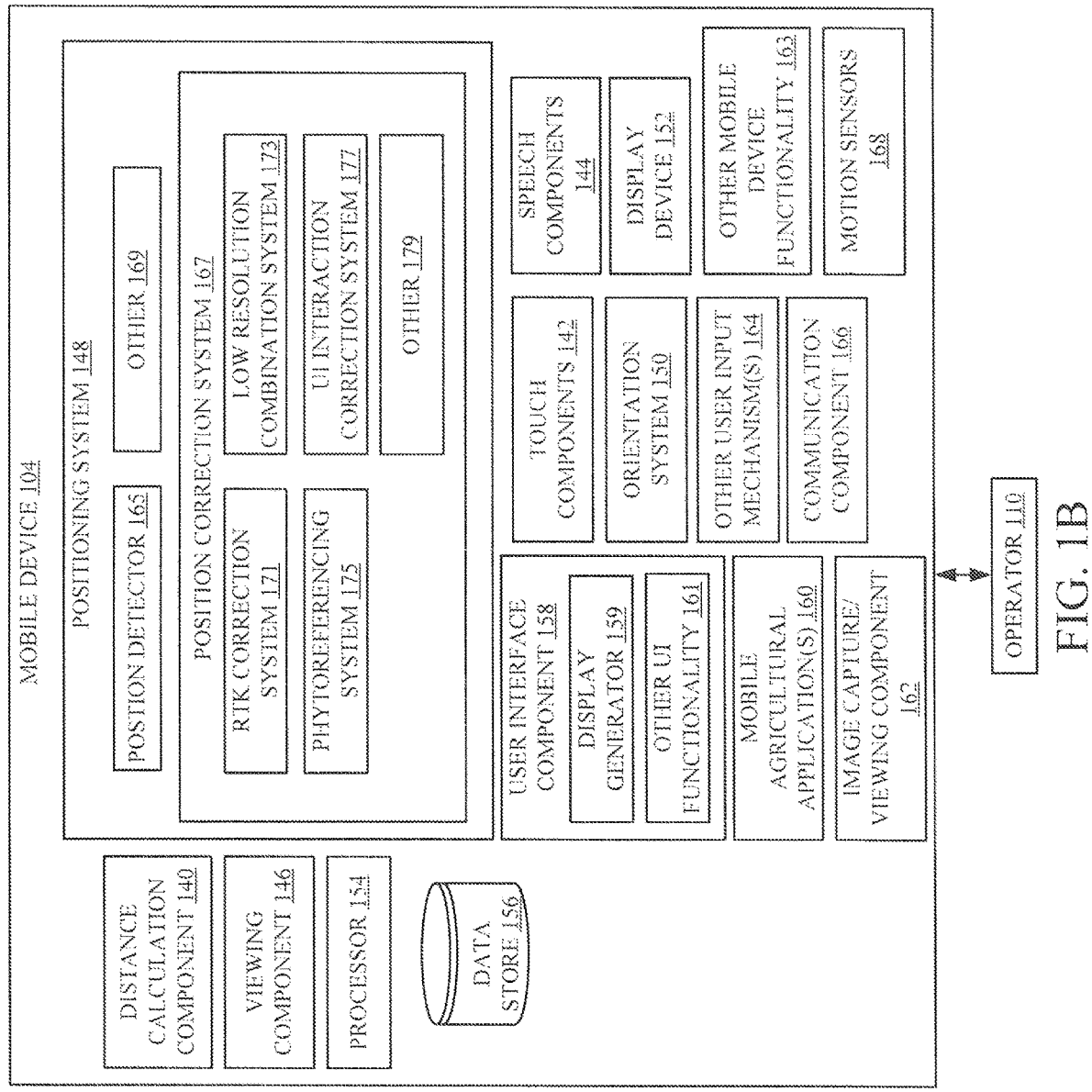
FIG. 1B shows one example of a block diagram of a mobile device, which may be on an agricultural machine or carried by an operator or in another system.

Mobile device 104 and display device 107 can take a wide variety of different forms, some of which are described below. In the present example, it is assumed that the mobile device 104 is used to generate an interactive data display. In the example shown in FIG. 1B, mobile device 104 illustratively includes distance calculation component 140, touch components 142, speech components 144, viewing component 146, positioning system 148, orientation system 150, display device 152, processor 154, data store 156, user interface (UI) component 158 (which can include display generator 159 and other UI functionality 161), one or more mobile agricultural applications 160, image capture/viewing component 162, user input mechanisms 164, communication component 166, and one or more motion sensors 168, and other mobile device functionality 163. Positioning system 148 can include a position detector 165, position correction system 167, and other items 169. Position correction system 167 can include RTK correction system 171, low resolution combination system 173, phytoreferencing system 175, UI interaction correction system 177, and other items 179.

Figure 1C:
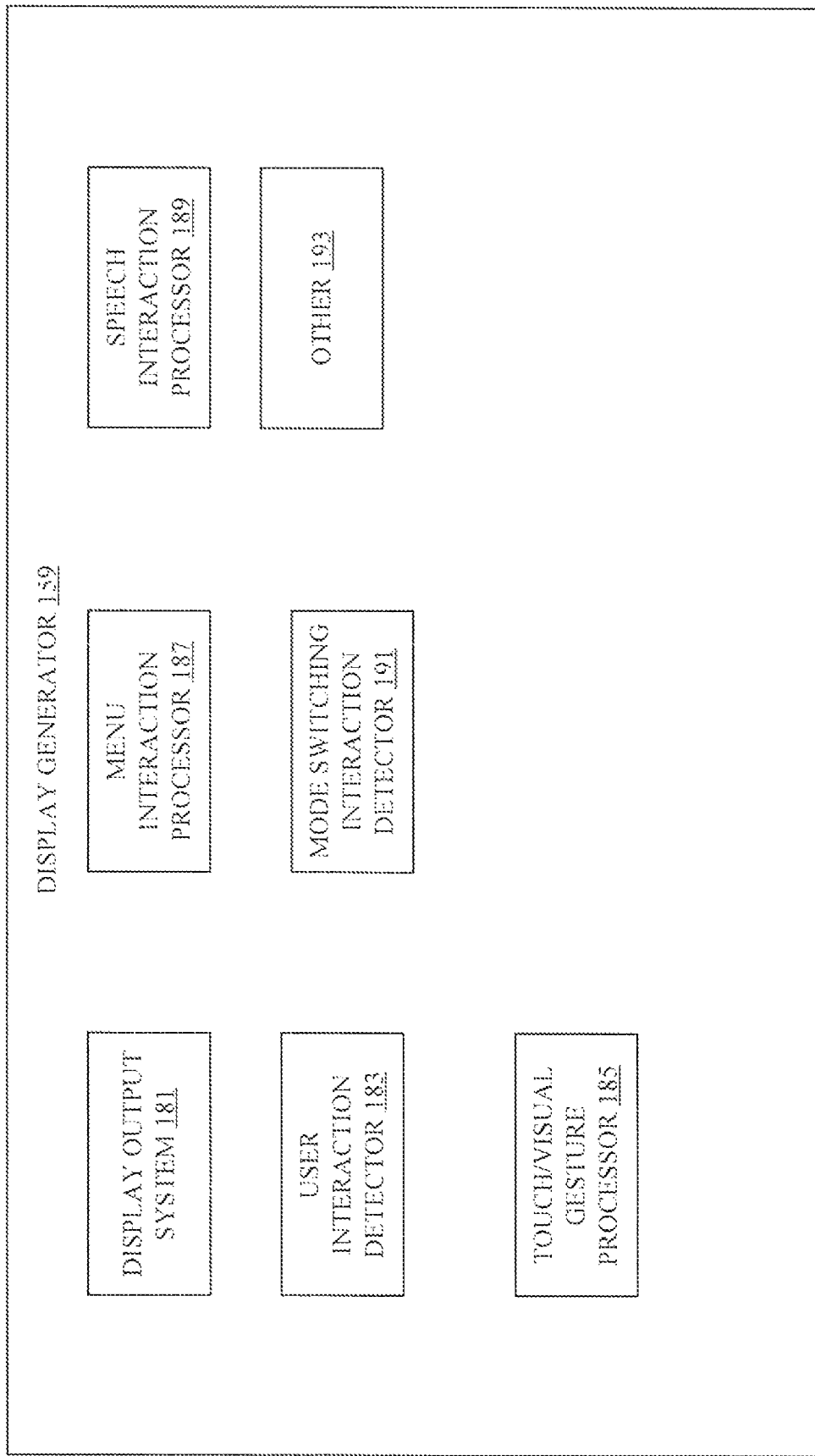
FIG. 1C is a block diagram of one example of a display generator.
Figure 1D:
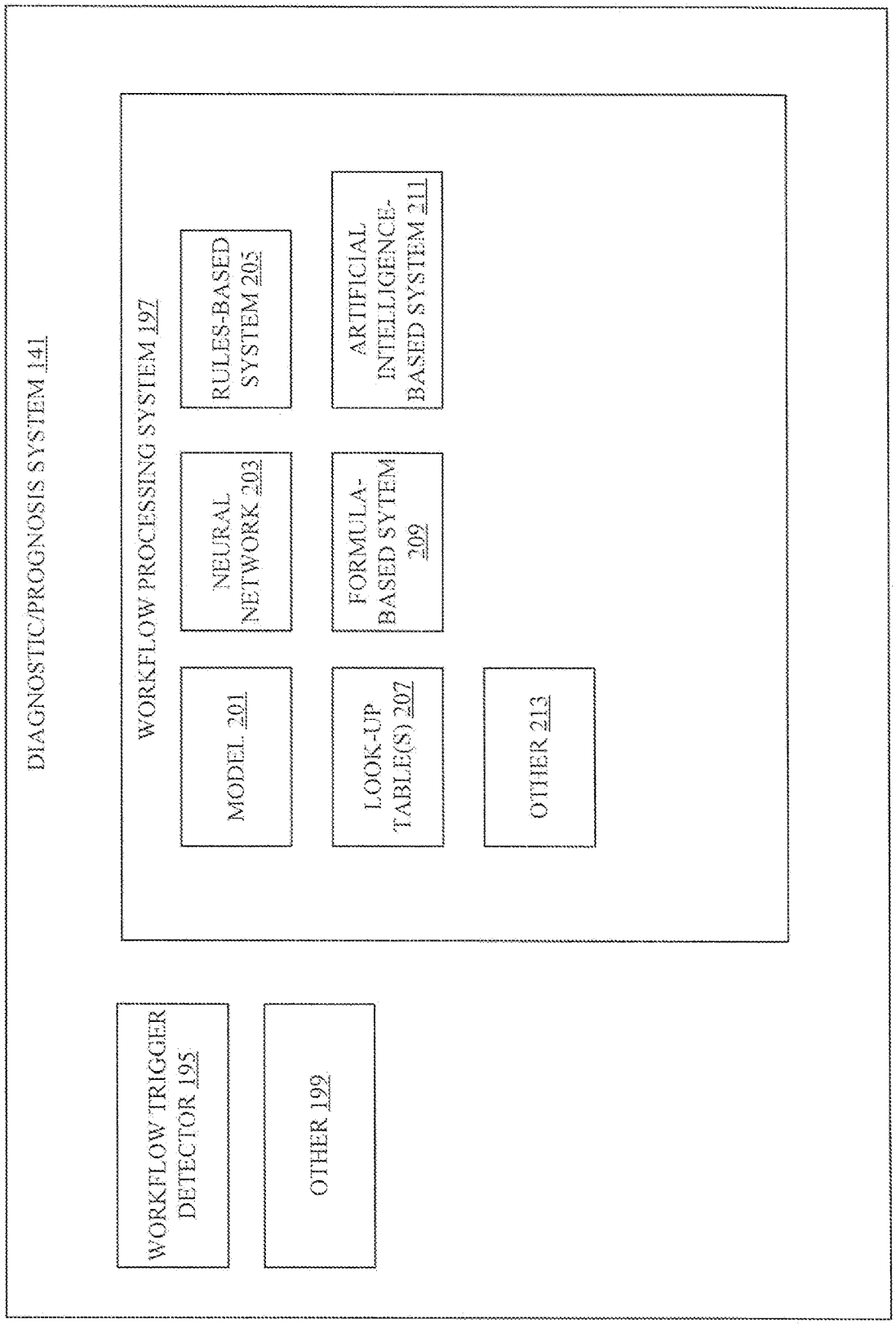
FIG. 1D is a block diagram of one example of a diagnostic/prognosis system.

FIG. 1C is a block diagram showing one example of display generator 159 (from mobile device 104 shown in FIG. 1B) in more detail. Display generator 159 can be a display generation system that includes display output system 181, user interaction detector 183, touch gesture processor 185, menu interaction processor 187, speech interaction processor 189, interaction mode switching detector 191, and other items 193. FIG. 1D is a block diagram showing one example of diagnostic/prognosis system 141 (from hosted agricultural data service 112 in FIG. 1A) in more detail. FIG. 1D shows that system 141 includes workflow trigger detector 195, workflow processing system 197 and other items 199. Workflow processing system 197 can include model 201, neural network 203, rules-based system 205, lookup tables 207, formula-based system 209, artificial intelligence-based system 211, and/or other items 213.

Before describing the overall operation of system 100 in more detail, a brief description of some of the items and components shown in FIGS. 1A, 1B, 1C, and 1D will first be provided. Hosted agricultural data service 112 is shown in a cloud computing architecture. In an example, cloud computing provides computation, software, data access and storage services that do not require end-user knowledge of the physical location or configuration of the system that delivers that service. In various examples, cloud computing delivers the services over a wide area network, such as the Internet, using appropriate protocols. For instance, cloud computing providers deliver applications over a wide area network and the applications can be accessed through a web browser or any other computing component. Software or components of system 100, as well as corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server or installed on client devices directly, or the components and functions can be provided in other ways.

The description is intended to include both public cloud computing and private cloud computing. Cloud computing (both public and private) provide substantially seamless pooling of resources as well as a reduced need, on the part of the entity using cloud computing, to manage and configure underlying hardware and software infrastructure.

A public cloud is managed by a vendor and typically supports multiple consumers using the same infrastructure. Also, a public could, as opposed to a private cloud, can free up the end-users from managing the hardware and software. A private cloud may be managed by the organization itself, and the infrastructure is not typically shared with other organizations. The organization still maintains the hardware, to some extent, such as installations and repairs, etc. In the example shown in FIGS. 1A-1D, all of the elements and data stores for hosted agricultural data service 112 are shown as being disposed in cloud 102. However, in another examples, portions of hosted agricultural data service 112, or the data sources that it maintains (such as data store 138), can be located outside of cloud 102, and accessed by service 112. For instance, the elements and data stores can be hosted at a remote site by a service, or provided as a service through a cloud, or accessed by a connection service that resides in the cloud. Similarly, items in mobile device 104 and service 112 and other items in system 100 can be distributed in other ways and reside on different items in system 100 or elsewhere. All of these architectures are contemplated herein.

In service 112, data crawler component 130 illustratively crawls various websites or data stores to obtain relevant data. Data crawler component 130 intermittently crawls the websites and data stores to obtain updated information, and indexes that data and loads it in pre-indexed, geo-tagged data store 138. A wide variety of different data can be loaded in data store 138. Some examples of this are discussed in greater detail below with respect to FIGS. 4 and 11 and other FIGS.

Also, additional data can be generated or derived from other data. For example, current runtime data can be obtained from agricultural machine 103 and other sources of data and compared or aggregated by processed/derived data generation system 139 and/or diagnostic/prognosis system 141. The comparison results or aggregations may also be geo-tagged by system 139 and/or system 141 and stored in pre-indexed, geo-tagged data store 138. Some more examples of data generation by system 139 and system 141 are described below.

Runtime search component 132 illustratively performs runtime searches for data which is not pre-indexed and stored in data store 138. Such data can also be processed by data generation system 139 and system 141. Mobile application server 136 illustratively serves the various mobile applications that are downloaded by the various mobile devices 104.

Diagnostic/prognosis system 141 can run workflows that perform diagnostic, operations and that perform prognosis operations. Workflow trigger detector 195 detects one or more triggers to launch diagnostic, prognosis, and/or other workflows. The workflows can be run by one or more of the components in workflow processing system 197. For instance, the workflow can be run using one or more models 201, neural network 203, rules-based systems 205, look-up tables 207, formula-based system 209, artificial intelligence (AI)-based system 211, or other items 213. The triggers can be detected based on different sensed variables, detected anomalies, or any of a wide variety of other items. Workflow processing system 197 runs workflows that can identify/diagnose problems and generate a corrective output. The corrective output can be surfaced to the operator 110 or can take the form of automated corrective action control signals to automatically control agricultural machine 103 or other items based on the diagnosis and/or prognosis.

On mobile device 104, viewing component 146 is illustratively any type of viewing component which operator 110 can use to obtain a view of his or her surroundings. For instance, when operator 110 is a farmer standing in a field or sitting in agricultural machine 103, viewing component 146 may be a camera lens, or another viewer, that allows the farmer to view an agricultural surface, such as a piece of ground in the field. Distance calculation component 140 illustratively calculates a distance between mobile device 104 and the piece of ground being viewed. Positioning system 148 calculates a position of mobile device 104. System 148 can include a position detector 165 that detects a geographic position (e.g., location and/or pose) of mobile device 104 and position correction system 167 can correct the detected position to make it more accurate. Real-time kinematic (RTK) correction system 171 can perform RTK-based correction. Low resolution combination system 173 can combine position signals from multiple lower resolution detectors 165 to obtain a higher resolution (more accurate) position. Phytoreferencing system 175 can detect phytoreferencing information to correct the position detected by detector 165. UI interaction correction system 177 can use information from operator interactions with a display to correct the position signal from detector 165. For instance, a display may show a field boundary overlayed over the field being viewed on the display. If the overlayed boundary does not match the actual boundary, operator 110 can interact with the display to move the overlayed boundary to the correct location over the boundary being viewed. This correction can then be used to correct the position signal from detector 165. Other logic 179 can correct the position signal from detector 165 in other ways, such as based on the position of other known items or markers, etc.

User interface component 158 includes display generator 159 and other UI functionality 161 that can be used to control various UI components on mobile device 104. One example of display generator 159 is described in greater detail with respect to FIG. 1C and illustratively generates user interface displays on display device 152 with user interaction mechanisms that operator 110 can interact with in order to control and manipulate mobile agricultural application 160 and other portions of mobile device 104.

FIG. 1C shows an example of display generator 159 which can be a display generation system that includes display output system 181, user interaction detector 183, touch gesture processor 185, menu interaction processor 187, mode switching interaction detector 191, speech interaction processor 189, and other items 193. Display output system 181 generates an output for the operator or user interface component 158. User interaction detector 183 detects user interactions with the output. For instance, the user interactions may be touch gestures and/or visual gestures that are detected by detector 183 and processed by touch/visual gesture processor 185. When the user inputs are interactions with menus, those interactions are detected by detector 183 and processed by menu interaction processor 187. When speech recognition/synthesis functionality is provided, speech interactions are detected by detector 183 and processed by speech interaction processor 189. The user interactions can begin in one mode (such as using touch gestures) and switch to a different mode (such as using speech interactions). The switch to a different mode may be detected by interaction mode switching detector 191. For instance, operator 110 may begin interactions using touch gestures and then speak a wake-up word (e.g., "Johnny") to trigger interaction mode switching detector 191 to enable speech interaction processor 189 to begin processing speech interactions. These are examples only.

Applications 160 are illustratively mobile applications that are downloaded from service 112 and that are served by mobile application server 136. In an example where the displays are generated on display device 107, which may be a mobile device, wearable device, or a different device, then the application need not be a mobile application but can be another application downloaded and run on agricultural machine 103. The interaction mechanisms illustratively allow operator 110 to interact with, and manipulate, service 112. Image capture component 162 can be a camera or other component that illustratively allows operator 110 to capture the image viewed through viewing component 146. Touch components 142 may be hardware components that illustratively allow the user interface displays displayed to operator 110 to be displayed on a display device that enable a touch sensitive display device. Touch component 142 may be capacitive or other sensors. Touch components 142 enable the user to provide user inputs through the user interface displays using touch gestures. Speech components 144 can include such things as a microphone, speaker, etc., and illustratively allow the user to provide inputs using speech. Orientation system 150 illustratively calculates the orientation of mobile device 104. For instance, orientation system 150 can include a compass, gyroscopes, inertial measurement unit(s), accelerometer(s), or other components that can be used to calculate the orientation or pose of the mobile device 104. Other user input mechanisms 164 can either be hardware or software user input mechanisms. For instance, mechanisms 164 can be hardware keypads or keyboards, a thumb pad, joysticks, buttons, switches, etc. In addition, mechanisms 164 can be virtual keyboards or keypads that are actuated using touch gestures. Mechanisms 164 can also be user actuatable display elements, such as icons, links, buttons, text boxes, check boxes, drop down menus, etc. Motion sensors 168 can be used to sense when mobile device 104 is being moved. For instance, accelerometers can detect whether a mobile device 104 is being panned, tilted or otherwise moved. Similarly, motion sensors 168 can include image analysis components that perform pixel-level image analysis on the image displayed by viewing component 146 to determine whether mobile device 104 is being panned to the right, to the left, upward or downward, or being moved in other ways.

Before providing a detailed description of the operations of system 100, a brief overview of the operation will be provided. It is first assumed that operator 110 is illustratively a farmer or other person holding mobile device 104 or having mobile device 104 mounted in the operator compartment of agricultural machine 103 and is in a field or over another agricultural surface or over a piece of agricultural terrain. Operator 110 first actuates mobile agricultural applications 160 which, themselves, enable the operator 110 to view an agricultural item (such as some portion of the field or agricultural surface, a plant, a weed, a pest, etc.) through viewing component 146 (such as through a camera lens). When operator 110 is viewing a desired agricultural item (such as a piece of ground, a plant, a pest, etc.) operator 110 illustratively actuates a user interaction mechanism generated by mobile agricultural application 160 to indicate that the operator wishes to obtain agricultural information from hosted service 112 about the viewed item (e.g., about the agricultural surface or piece of ground being viewed, the plant, pest, etc.). In response, and when desired, various components of mobile device 104 calculate the position of the viewed item both globally, and relative to mobile device 104, to identify the particular part of the agricultural surface or ground being viewed through viewing component 146.

Application 160 then generates a request for desired data to hosted agricultural data service 112. Mobile application server 136 first determines whether the requested data is in the pre-indexed data store 138. If so, server 136 provides that data back to mobile device 104. If not, server 136 uses runtime search component 132 to search for, and obtain, the desired data. Search component 132 then provides that data back to mobile application server 136.

In one example, mobile agricultural application 160 uses various components of mobile device 104 to display the received data. For instance, display generator 159 can generate a combined image of the data received from service 112 and the ground (or other agricultural surface or item) being viewed through viewing component 146. For instance, the data received from service 112 is indicative of a particular characteristic of the ground or plant or pest being viewed, and is used by display generator 159 to generate an overlay image that is rendered as an overlay on the image being viewed through viewing component 146.

As one specific example, where the operator (e.g., farmer) 110 is viewing a piece of ground in a field, the operator 110 may request the location of the drain tiles in that field. In that case, mobile application server 136 returns data indicative of the georeferenced drain tile location, relative to the piece of ground being viewed through viewing component 146. Mobile agricultural application 160 then controls display generator 159 to generate an enhanced display of the image, using the drain tile location information, to superimpose a visual indication of where the drain tiles reside, over the image of the piece of ground being viewed through viewing component 146. That is, an image of the drain tile is superimposed over the image of the ground to show the geographic correspondence between the location of the drain tile and the piece of ground being viewed. The operator 110 can then interact with the enhanced display in a variety of different ways. The user interactions can be detected by user interaction detector 183 and, depending on the type of interaction, be processed by one or more of processors 185, 186, 189, and 191 or other processors. This is only one example, and other examples are discussed below.

Figure 2:
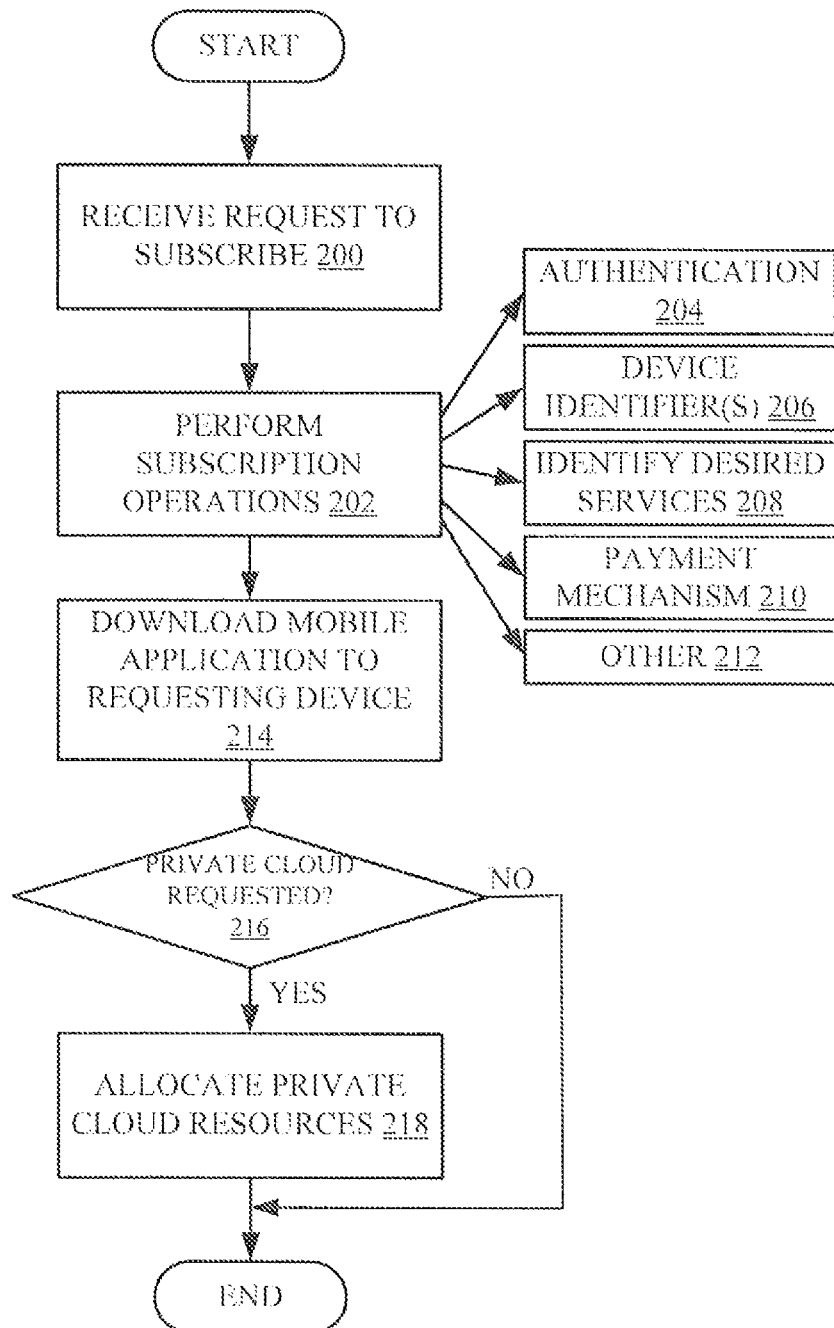
FIG. 2 is a flow diagram illustrating one example of the operation of the system shown in FIG. 1A in allowing mobile devices and other display devices to subscribe to a hosted data service.

It will be appreciated that subscription need not be used. However, FIG. 2 is a flow diagram illustrating one example of the operation of system 100 in allowing operator 110 to subscribe to hosted agricultural data service 112. In one example, subscription component 137 first receives a request from operator 110 (such as through a mobile device, a desktop computer, a laptop computer, etc.) that the operator wishes to subscribe to service 112. This is indicated by block 200 in FIG. 2.

Subscription component 137 then performs a variety of different subscription operations in order to have operator 110 subscribe to the service, as indicated by block 202. Such operations can include, for example, receiving authentication information 204 from operator 110. Such authentication information can include account information, a password, a username, etc. The subscription operations can also include receiving device identification information that uniquely identifies device 104 and associates it with the operator's subscription. This is indicated by block 206. The device identification information may also indicate whether device 104 is a smart phone, a tablet computer, or another device that has a different form factor for its display screen.

Subscription component 137 can also offer operator 110 a variety of different subscription levels. For instance, it may be that operator 110 can subscribe to obtain data from certain databases for one price, and subscribe to obtain other data, and additional services, for another price. Identifying the desired data and services that operator 110 wishes to subscribe to is indicated by block 208 in FIG. 2.

Subscription operations 202 may also include identifying a payment mechanism that operator 110 wishes to use to pay for the subscription (if they are sold). This is indicated by block 210 in FIG. 2. Of course, it will be noted that the subscription operations can include other operations as well, and this is indicated by block 212.

Once operator 110 has successfully subscribed to service 112, mobile application server 136 illustratively downloads one or more mobile agricultural applications 160 that are run on mobile device 104 in order for operator 110 to access service 112. Downloading the mobile applications is indicated by block 214 in FIG. 2.

In one example, operator 110 can elect to use hosted agricultural data service 112 to obtain data and services but maintain his or her data locally (such as on a mobile device 104, on a data store on agricultural vehicle 103, or the user's desktop or laptop, etc.). Alternatively, however, operator 110 can illustratively elect to have his or her data stored on a private cloud data store 128, that is accessible only by operator 110 or other authorized users. If the operator elects to use the private cloud data store 128, then mobile application server 136 illustratively allocates private cloud resources in data store 128 for operator 110. Having operator 110 elect to use the private cloud data store 128, and allocating the resources, are indicated by blocks 216 and 218 in FIG. 2, respectively.

Figure 3:
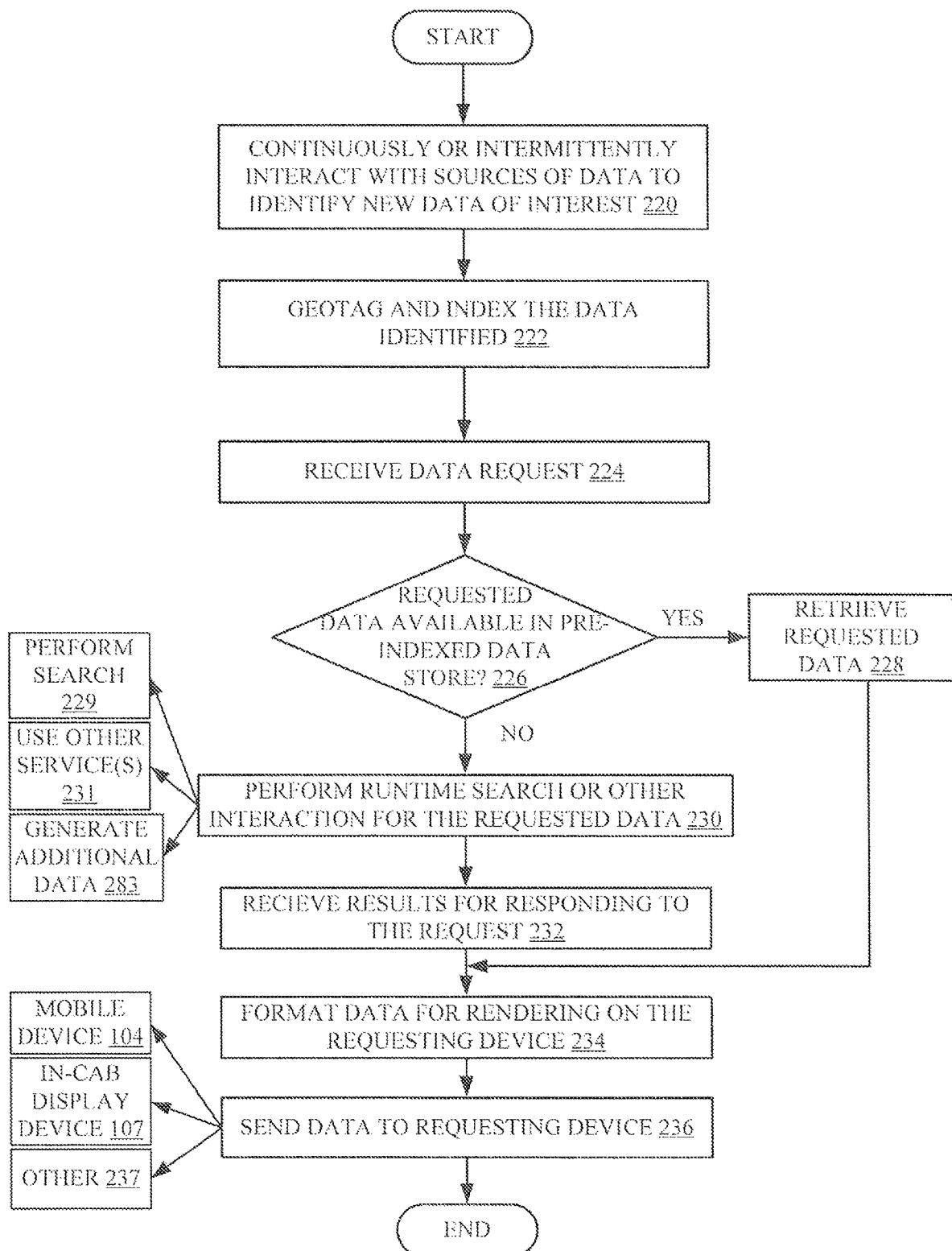
FIG. 3 is a flow diagram illustrating one example of the operation of the system shown in FIG. 1 in providing data to a requesting device.

After subscribing, operator 110 can use service 112 to obtain data and services. FIG. 3 is a flow diagram illustrating one example of the operation of hosted agricultural data service 112 in obtaining and/or generating pre-indexed data for store 138, and in responding to data requests from a mobile device 104. In one example, service 112 illustratively includes data obtaining component 130. Component 130 can be a crawler which continuously, or intermittently, crawls and pre-indexes a variety of data sources to identify new data that might be of interest to various operators 110 or other users. This data can illustratively be accessed by operator 110, given their particular subscription. The data sources crawled by the crawler component may be data sources stored and serviced in cloud 102, such as data sources 114 or 116, or they can be data stores hosted at other websites, or otherwise accessible by component 130, through cloud 102. Such data stores are indicated by data stores 118, 120, and 122.

In another example, component 130 is an upload component that receives data uploaded by the farmer (or other user), by crowd-sourced entities, or by other servers or data stores. Component 130 can obtain data in other ways as well.

It will also be noted that component 130 can obtain data through a variety of services. For instance, a number of different services may be accessed to identify weed varieties, pest identities, seed information, or other information. Such services can include image processing services, speech or pattern recognition services, database services, etc. In addition, various services provide weather information, soil type information, and a whole host of other information. Services and processed/derived data generation system 139 can also be used to perform analysis on data that is collected and sent to those services. Diagnostic/prognosis system 141 can perform analysis or data and generate additional data, control outputs, or other outputs. Different kinds of data are described in more detail below with respect to FIGS. 4 and 11.

Hosted agricultural data service 112 can obtain information from services that are hosted in cloud 102 (such as services 124) or those that are hosted elsewhere, and are accessible by service 112 (such as other services 126). Interacting with the data sources or data services to identify new data of interest is indicated by block 220 in FIG. 3.

Component 130 also illustratively includes an indexer and a geotagger. The indexer indexes the newly obtained data identified or obtained by component 130 and the geotagger tags the newly obtained data with geographic information, when it has none and when the geographic information is available or can be generated for the newly obtained data. Component 130 then stores the newly obtained data in pre-indexed, geo-tagged data store 138, as indicated by block 222. By way of example, where weather data is pre-indexed, the weather data will illustratively be specific to various different geographic locations. The weather data is therefore tagged with the geographic information so that the weather data can be retrieved based on geographic locations of interest. The same can be true for weed data, pest data, soil type data, and a wide variety of other types of data as well. The data can be indexed in many different ways.

At some point, mobile application server 136 illustratively receives a request for information from mobile device 104. Receiving a data request is indicated by block 224 in FIG. 3. As is described below, the data request will illustratively include a variety of information, such as the geographic location of the image of the agricultural surface or item being viewed at mobile device 104, perhaps the image itself, and other information.

Mobile device application server 136 illustratively uses the information in the request to determine whether the requested data is available in the pre-indexed, geo-tagged data store 138. This is indicated by block 226. If so, server 136 retrieves the requested data from data store 138, as indicated by block 228. If not, server 136 illustratively prepares a search request for runtime search component 132 or obtains data in other ways as indicated by block 230. Component 132 may be a browser, or a search engine, or another component that receives a query, as an input, and searches various websites, data stores, services, etc. to obtain relevant search results. Performing a runtime search for the requested data and receiving the search results is indicated by blocks 229. It will be appreciated that server 136 can search one or more caches for the requested data as well.

Also, server 136 may obtain the requested data in other ways as well. For instance, where the data received in the request is an image of a plant or pest and the requested data is to identify some attribute of the image (such as to identify the plant or pest or to determine whether the plant is as mature as it should be) the image may be sent to another entity for a response. For instance, an image of a pest may be sent to an agronomist for identification. An image of a plant may be sent to a seed company to identify whether the plant is healthy and whether it is maturing properly. An image may be sent to an automated image processing system for recognition. Data from the request may be sent to other services as indicated by block 231. These are examples only.

Also, in one example, data generation system 139 and/or diagnosis/prognosis system 141 receives information (such as the request from the operator or data from different services or external sites) and generates additional data as indicated by block 233. For instance, data generation system 139 can get the location of the operator, as well as information from a fertilizer company, and generate a suggested fertilizer application map that can be downloaded for use by the user, or that can be automatically downloaded to the user's fertilizer equipment and used by that equipment. In another example, diagnosis/prognosis system 141 may receive an image or data from the request and identify a problem and for a remedy based on the received image or data. This can be used to send data for surfacing to the operator on an enhanced display or to generate control signals. These are only examples. Receiving the results for responding to the request is indicated by block 232.

Regardless of how the requested data is obtained (whether from data store 138 or by running a search or by generating it using data generation system 139 or system 141 or otherwise) the data can be formatted for rendering on the particular requesting device 104. For instance, if the mobile device 104 is a smart phone, where the display real estate that can be used to generate a display is relatively small, the information may be formatted in one way. However, if the mobile device 104 is a tablet computer, with a larger display area, the data may be formatted in a different way. Formatting the data for rendering on the requesting device is indicated by block 234 in FIG. 3.

It should also be noted that formatting the data for proper rendering can be performed at a wide variety of different locations, and at a wide variety of different times. For instance, when data is stored in data store 138, the data can be stored in different formats, so that it is readily accessible for returning (in proper format) to different types of display devices. That is, the same data can be stored in store 138 in a format that is suitable for rendering on a smart phone, in another format that is suitable for rendering on a heads up display, in another format that is suitable for rendering on a tablet computer, and in yet another format that is suitable for rendering on a laptop or desktop computer, and in yet another format suitable for rendering on a wearable display, etc. In the alternative, the data can simply be provided back to the particular requesting device 104, and that device 104 can be responsible for formatting the data for proper rendering on its own display screen. The formatting can be performed at other locations and at different times as well, and those discussed here are discussed for the sake of example only. In any case, the requested data is eventually sent back to the requesting display device, as indicated by block 236 in FIG. 3. The requesting display device can be a mobile device 104, an in-cab display device 107, or another display device 237.

Figure 4A:
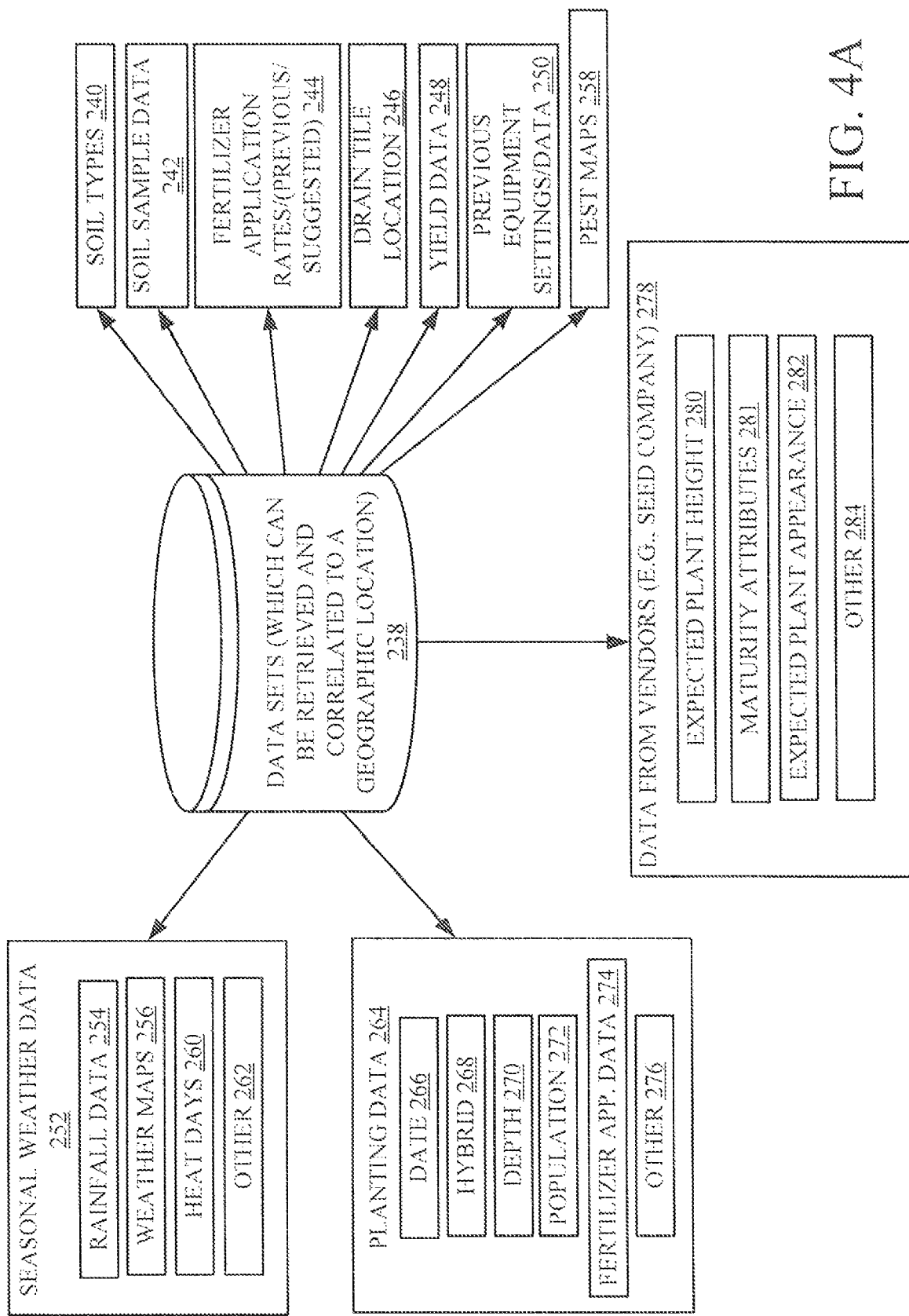
FIG. 4A is a block diagram illustrating one example of some data sets that can be served by the hosted data service shown in FIG. 1.

Before describing the operation of mobile device 104 and other items in system 100 in more detail, some example data sets will be described. FIG. 4A shows one example of a number of different data sets that can be obtained by data obtaining component 130 and generated by data generation system 139 and diagnostic/prognosis system 141 and stored in pre-indexed, geo-tagged data store 138, or that can be retrieved during runtime by runtime search component 132 or by server 136 or other components in other ways (such as crowd sourcing, independent uploading, etc.). The data sets are indicated generally by number 238 in FIG. 4A.

Some of the data sets can include soil types 240. By way of example, soil samples can be obtained and soil types can be analyzed and stored for a variety of different geographic locations. Some databases currently exist which already contain geographically indexed information that indicates the various soil types located in different locations. Soil type data 240 can be generated in other ways as well. The soil types can include, for instance, clay, loam, sand, silt, peat, saline, etc. The soil types can be identified by their contents, by their pH and mineral levels, by their physical qualities (such as color and consistency), or in other ways as well.

Some data stores can also include soil sample data 242. By way of example, it may be that a farmer has already taken soil samples from various locations in the field of interest (the field being viewed). Those soil samples can be analyzed to determine a great deal of information (represented by sample data) about the individual sample of soil that has been taken. The soil sample data are illustratively correlated to the geographic location from which the samples have been taken, and the sample data can be stored for access by hosted agricultural data service 112.

The data sets 238 can also include fertilizer application data 244, such as the fertilizer application rates which have been previously used. The data 244 can also include fertilizer content and application rates that are suggested under the current conditions of the field being viewed by operator 110.

The data sets 238 can also include drain tile location 246, historical yield data 248, and previous equipment settings or data about previous equipment that has been used to farm the field of interest, on previous occasions, as indicated by block 250. The previous equipment settings and equipment data 250 can include a wide variety of different information. For instance, data 250 can include last year's combine settings, the down force used by the seed drill in order to plant the seed, or a wide variety of other equipment settings and data. In some examples, the previous equipment settings/data 250 or any other data in data sets 238 may be georeferenced, date-stamped, or time-stamped.

Data sets 238 can also include pest maps 258. By way of example, the pest maps 258 can include data indicative of common pests in the geographic region, pests that have been detected there, or other information. The data can also include images of pests or pest image classifiers that can be used to identify pests that the farmer has found and other information.

Data sets 238 can also illustratively include seasonal weather data 252. The weather data can include rainfall data 254, weather maps 256, heat days 260, and other weather information 262.

Data sets 238 can include planting data 264. The planting data can include, for instance, the date 266 of previous plantings, the particular hybrid 268 that was planted, the depth 270, the population 272, the fertilizer application data 274, and a wide variety of other planting data 276.

Figure 4B:
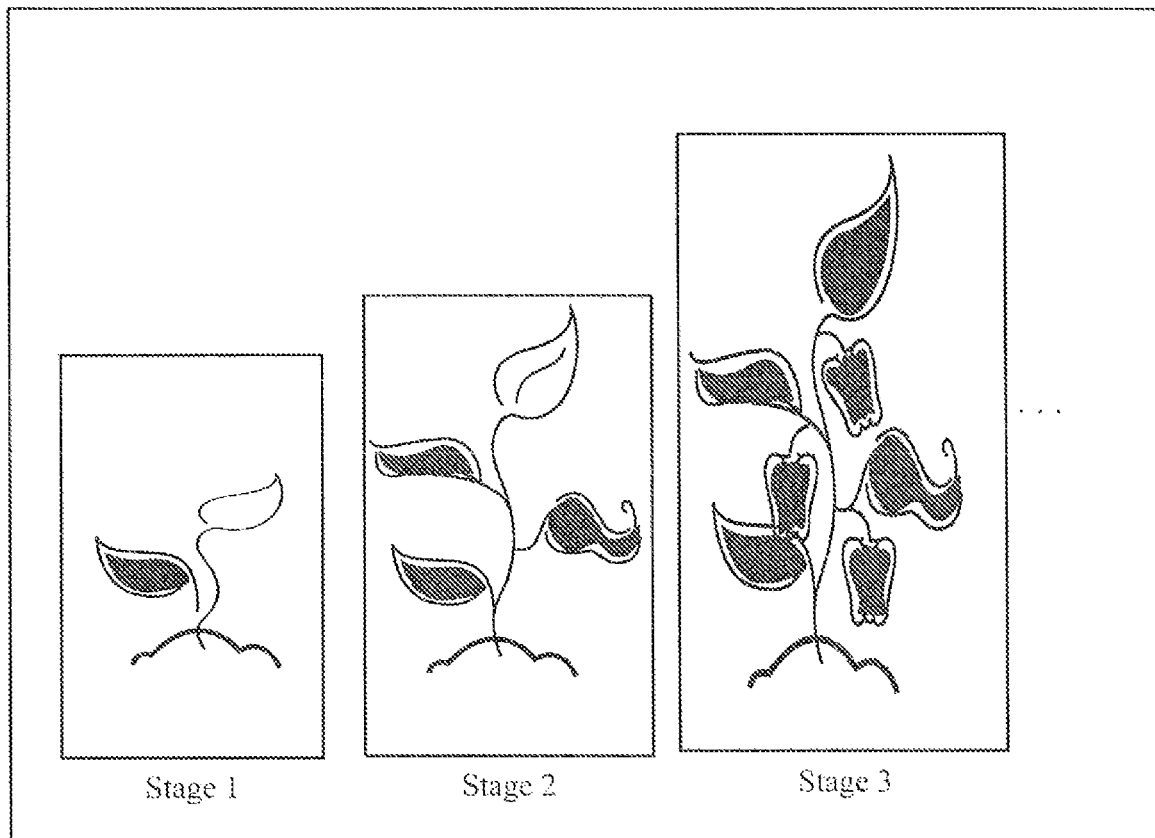
FIG. 4B shows one example of images.

In addition, data sets 238 can include data from vendors 278. The vendors can include a wide variety of different vendors, such as seed companies, fertilizer companies, equipment manufacturers, and other vendors. Where the vendor is the seed company, for instance, the data can include information that can be accessed to determine whether the crop is developing as expected, under the circumstances. By way of example, the seed company may take into account the location of the agricultural surface or item being viewed by the farmer, the soil type, the weather data, and fertilizer data for that geographic location, and estimate the expected plant height 280 or other plant maturity attributes 281, under all relevant conditions. The data can also include expected plant appearance 282, and a wide variety of other data 284. As one example, maturity attributes 281 can include images of a given hybrid in various stages of growth. FIG. 4B, for instance, shows images of a particular plant in three different growth stages. The stages can correspond to different times after planting, considering different weather conditions, different soil types and all other relevant information corresponding to the location of the plant. A farmer may request data that shows what that particular plant should look like, given all the other data for the piece of ground that the farmer is viewing. The system can access a mapping between the growing conditions (e.g., weather, soil type, fertilizer history, etc.) and images of the plant at different maturity levels, and an image of the particular growth stage can be returned to the farmer based upon all the information. For instance, if the plant is a hybrid A and it is located in a given soil type, where the weather has often been cool and a first level of fertilizer has been applied, the image returned may be the stage 1 image. However, if the plant is hybrid A, but it is in a location with a different soil type, and where a second level of fertilizer has been applied, the returned image may be the stage 3 image. The same can be done for pest infestation. For instance, the farmer may send a request that has an image of a plant with certain characteristics indicative of a pest. The image can be compared to stored images of plants that have been affected by various pests to identify a similar image to the one submitted by the farmer. This can be used to indicate that the plant is being affected by the given pest, and that certain pesticides should be applied. These are examples only and others are described below. It will be noted that while the data from vendors 278 has been provided with respect to the vendor being a seed company, or a fertilizer company, the data will vary based upon the particular vendor. It can also come from universities, agronomists, or others.

Figure 5A:
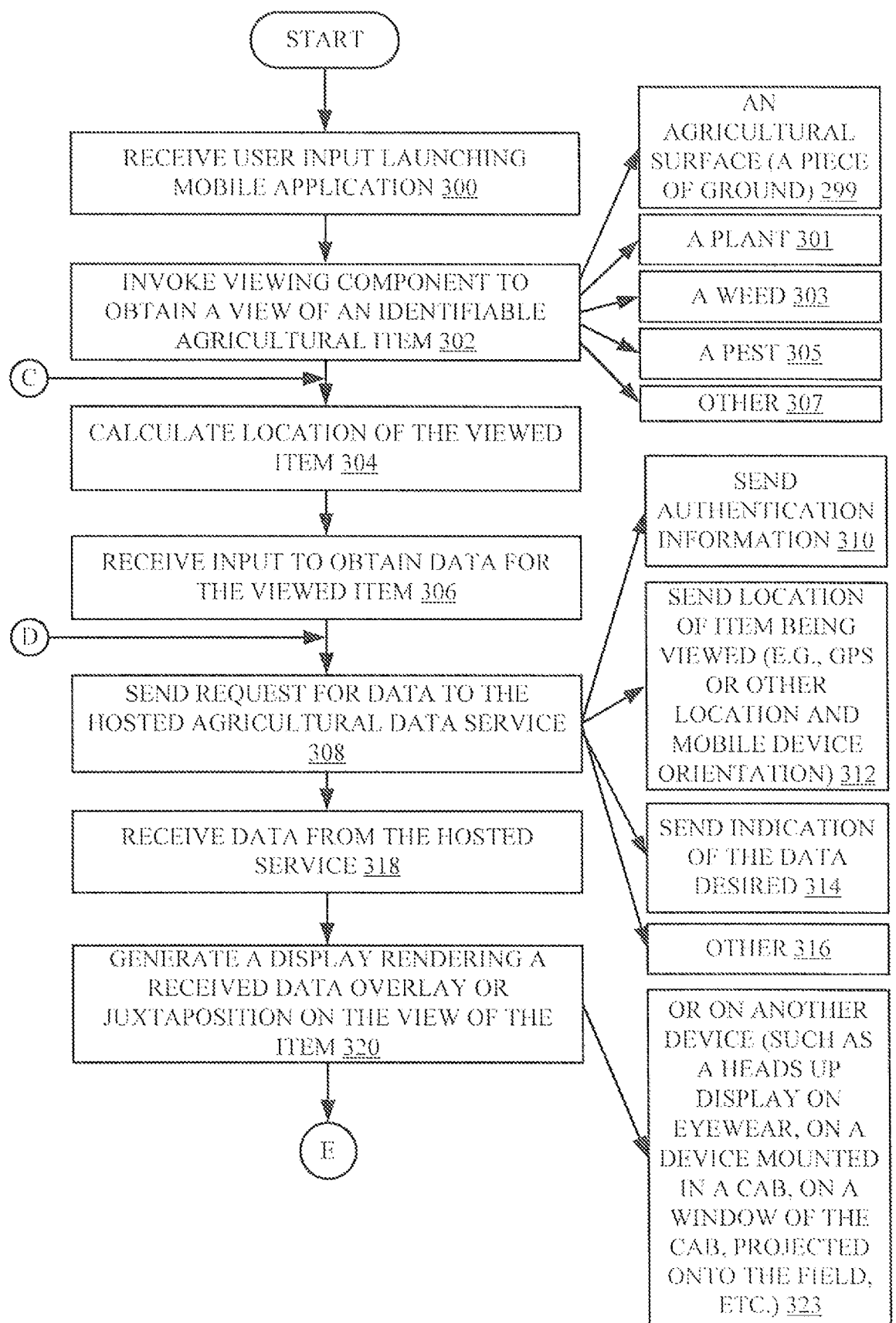
FIGS. 5A-5B (collectively referred to as FIG. 5) show a flow diagram of one example of a display device in obtaining data and rendering a combined view.
Figure 5B:
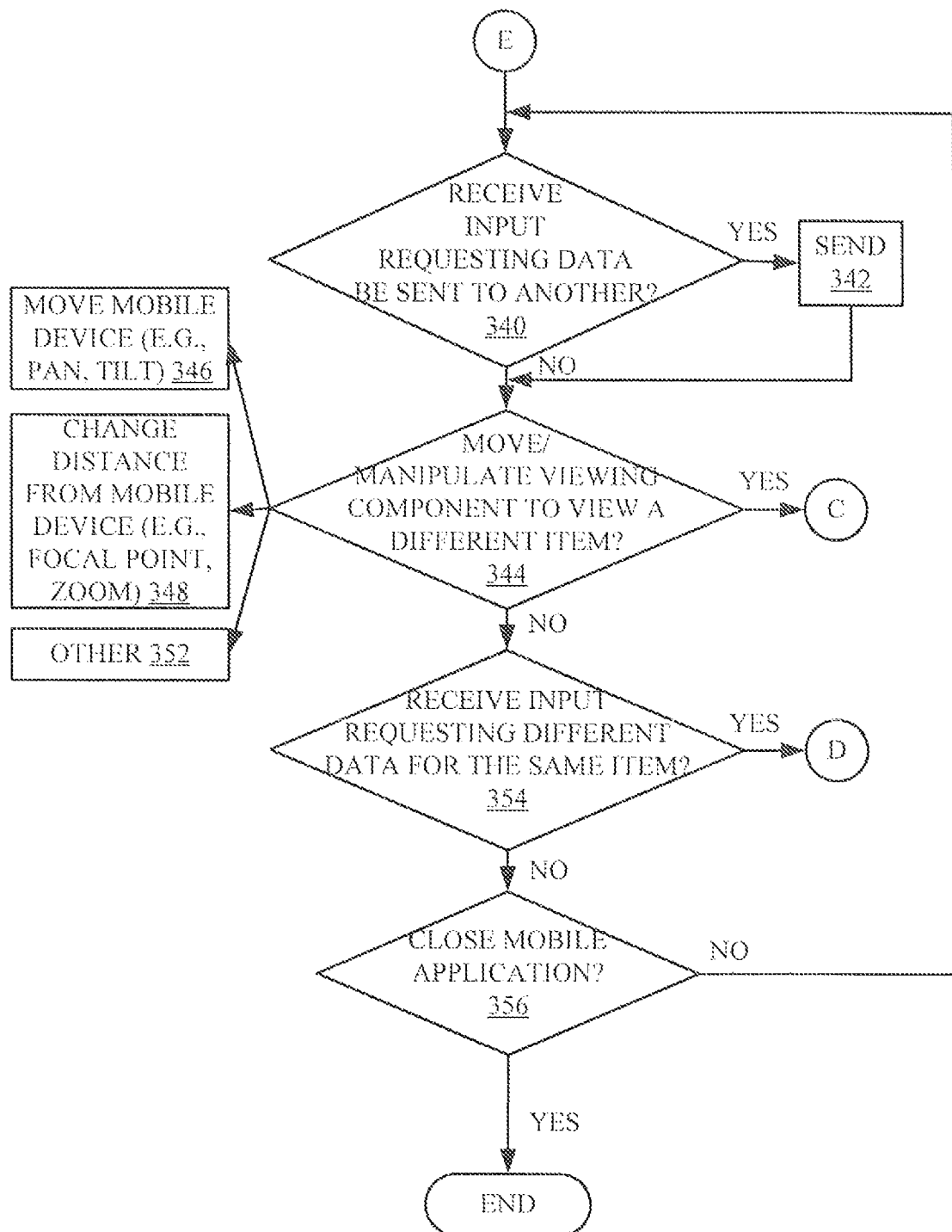

FIGS. 5A and 5B (collectively FIG. 5) show a flow diagram illustrating one example of the overall operation of architecture 100 (and more specifically of mobile device 104) in generating an enhanced view of an agricultural surface by superimposing visual indicia over that view, based upon the data received from hosted agricultural data service 112. It will be noted that the generated enhanced view could also be a plant that the farmer is looking at, and the superimposed information can be an image of a plant as described above. Also, it will be noted that the enhanced view can be generated as a heads-up display on a window of machine 103 or the enhanced view can be generated as a projected view or in other ways, but it is being described as an enhanced view on mobile device 104 for the sake of example.

Mobile device 104 first receives an input from operator 110 launching one or more of the mobile agricultural applications 160. This is indicated by block 300 in FIG. 5.

Operator 110 then provides inputs to invoke viewing component 146 to obtain a view of an identifiable agricultural item (such as an agricultural surface or piece of ground 209, a plant 301, weed 303, pest 305, or other item 309) near which the operator 110 is standing. This is indicated by block 302. This may be done, for instance, by the operator actuating the image capture functionality (e.g., the camera functionality) on mobile device 104. In that case, the view through the lens is illustratively displayed on a display device 152 (such as a display screen) on mobile device 104, so that operator 110 can see the agricultural surface (e.g., piece of ground) or plant through the lens of the image capture component 162.

When the piece of ground (or plant or other image) is being viewed, application 160 illustratively controls distance calculation component 140 and positioning system 148 to calculate a location of the piece of ground being viewed, as indicated by block 304. One example of how this is done is described in greater detail below with respect to FIG. 6.

Operator 110 then provides a user input to mobile device 104 indicating that the operator 110 wishes to obtain data for the piece of the ground (or plant or other image) that is being viewed. This is indicated by block 306. By way of example, it may be that application 160 provides a set of user interaction mechanisms that are displayed to operator 110 on display device 152. The user interaction mechanisms can allow the user to navigate through menus or other user input mechanisms in order to select data that the user wishes to see. Application 160 can, for instance, display buttons or icons that correspond to drain tile data, weather data, planting data, plant image data, pest image data, or any of the various data sets described above with respect to FIG. 4A and those described below with respect to FIG. 11. When the user actuates one of those user interaction mechanisms (such as with a touch gesture), application 160 generates a request for that data, along with the location of the piece of ground (or plant or pest, etc.) being viewed, and sends the request to the hosted agricultural data service 112. Sending the request is indicated by block 308 in FIG. 5.

The request, itself, can include a variety of different things. For instance, it can illustratively include authentication information that identifies operator 110 to hosted agricultural data service 112, as indicated by block 310. The location information can also include the location of the agricultural surface or ground being viewed, as indicated by block 312. The location can be identified using GPS coordinates, other location information (such as a location derived from a dead reckoning system, a cellular triangulation system, or a LORAN system), and the location information can also illustratively include the mobile device orientation. The request will also illustratively include an indication of the data that is being requested, as indicated by block 314. The location information can include other information 316 as well.

Hosted agricultural data service 112 receives the request and obtains the requested data and sends it back to mobile device 104. Service 112 does this, for example, as described above with respect to FIG. 3.

Mobile device 104 then receives the requested data from hosted service 112, as indicated by block 318 in FIG. 5. Application 160 then uses user interface component 158 to generate an enhanced display that renders an image indicative of the received data (received from hosted service 112) superimposed over the view of the agricultural surface or item (e.g., piece of ground or plant or other image) being viewed through viewing component 146. This is indicated by block 320 in FIG. 5. It will be noted that the view need not be superimposed but simply displayed in any way. The view can also be displayed on a separate display device 107 (such as one mounted in the cab of a piece of agriculture equipment, eyewear, a heads up display on eyewear, a heads up display on a window of the cab, a projected display that is projected on the field, or otherwise) as indicated by block 323.

Generating the enhanced display can be done in a variety of different ways. For instance, the user interface component 158 can generate the enhanced image as a composite image, or as two separate images, one being overlaid over the other. UI component 158 can generate the enhanced images in other ways as well. The actual rendering of the enhanced image can use the inputs from the various sensors and components on mobile device 104 to accurately render a depiction of the enhanced image indicative of the received data being overlaid or superimposed over the image being viewed.

By way of example, the orientation sensing system 150 can sense whether the mobile device 104 is being tilted downward or upward, or to the right or to the left. Motion sensors 160 can determine whether the device is being moved (such as panned to the left or to the right, or otherwise). Distance calculation component 140 can identify the focal point of the image capture component (such as the focal point of the camera lens) to determine how far the piece of ground is from mobile device 104 (and hence operator 110). This can be used to provide a perspective for rendering the superimposed data. In examples where agricultural machine 103 is teleoperated, the orientation sensing system may also send control signals to sensors 111, related to or proportional to the pitch, roll, and yaw of mobile device 104.

Taking the drain tile example, application 160 uses the various components of mobile device 104 to accurately superimpose the location of the drain tiles over the view of the ground being displayed to operator 110. The superimposition can be done using proper perspective, so that the visual indicia indicating where the drain tile resides relative to the agricultural surface will be accurately located with respect to the image being displayed. Taking the plant image example, application 160 illustratively displays the image of the plant received from service 112 over the top of, side-by-side with, or otherwise juxtaposed to the image of the plant being viewed.

Figure 5C:
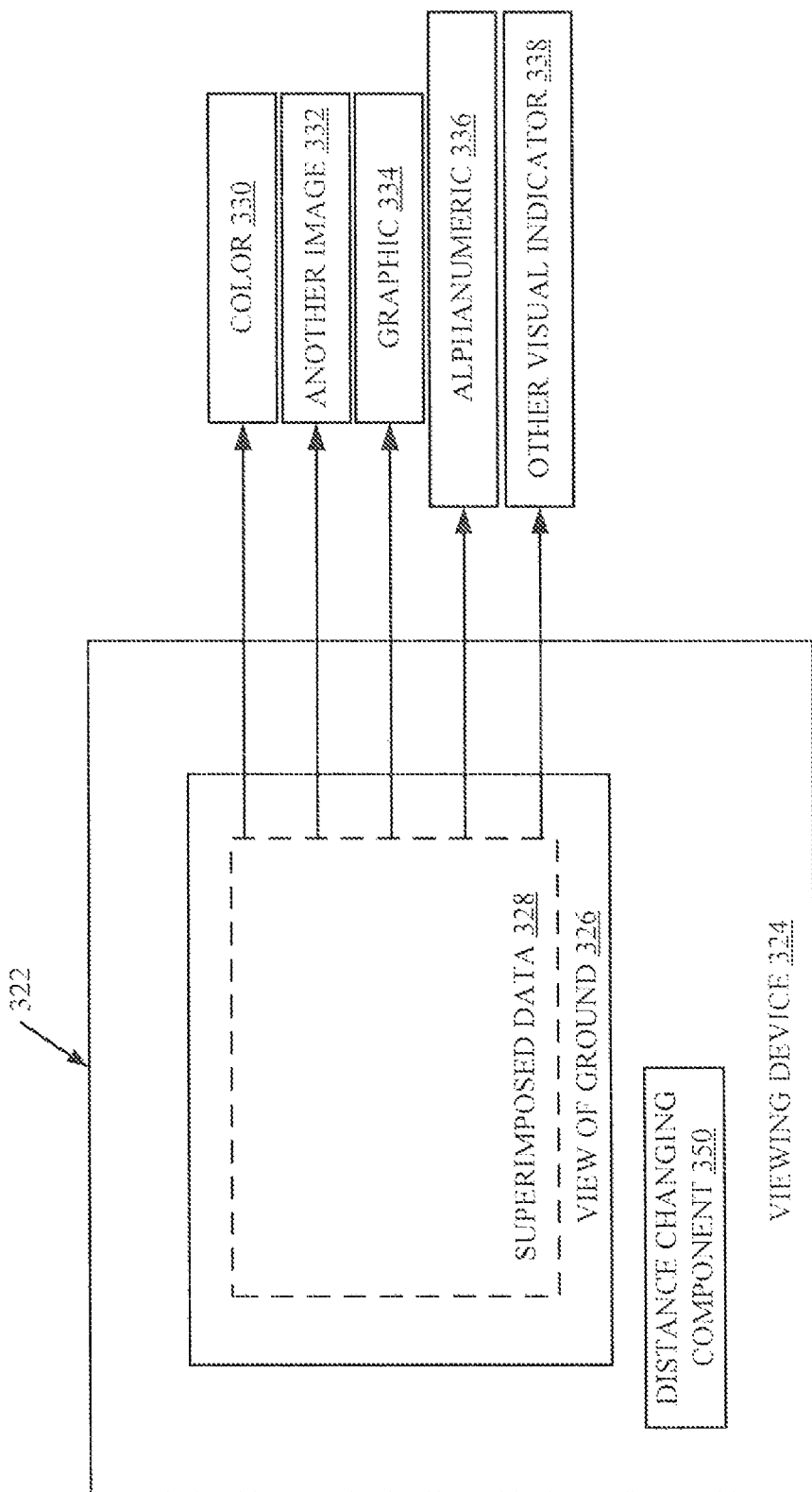
FIG. 5C is a block diagram of one illustrative combined view.

FIG. 5C is a block diagram of one illustrative user interface display 322. In the example shown in FIG. 5C, user interface display 322 is shown on a viewing device 324. Viewing device 324 may illustratively be an LCD display (or other display device) that displays the view from a camera lens or other image capturing component 162 on mobile device 104. The enhanced image illustratively includes a view of the agricultural surface (e.g., ground) 326 that is being viewed through the viewing device 324, along with a visual indication showing an image indicative of the data received from service 112 superimposed or otherwise displayed on the view of the ground 326. The superimposed data is indicated by 328 in FIG. 5C.

Figure 5D:
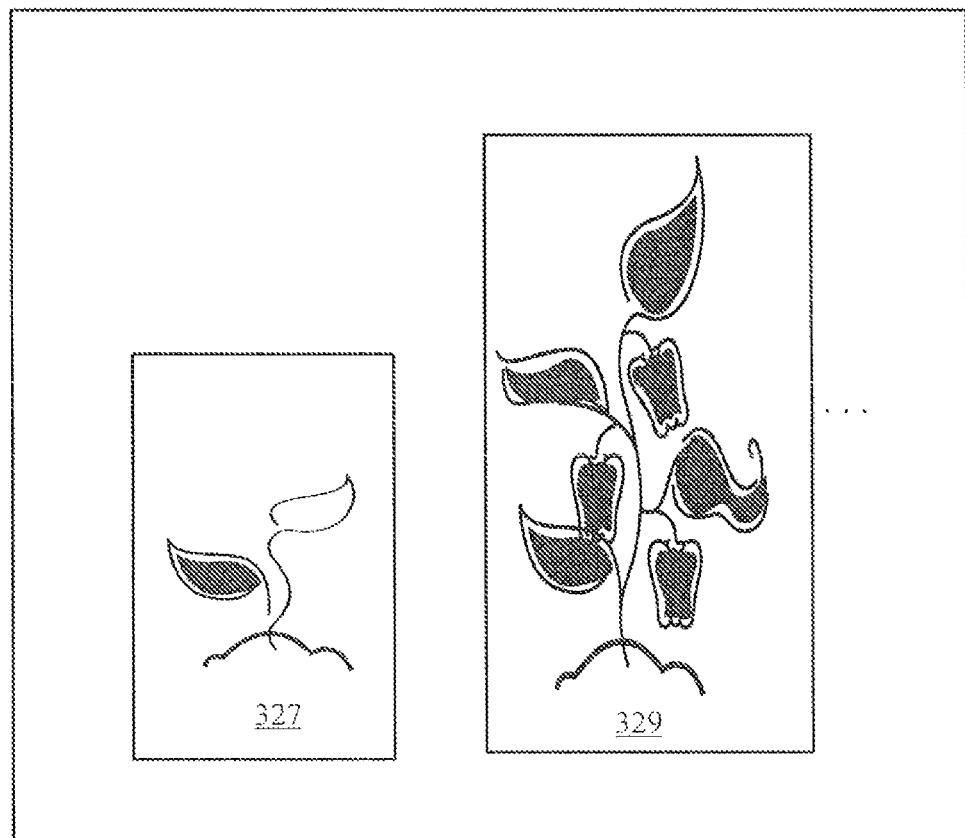
FIG. 5D is one illustrative set of images.

FIG. 5D shows another example. In FIG. 5D an image 327 of a plant being viewed by the user is shown in juxtaposed relation to an image 329 received from service 112. Image 329, for example, shows an image of a plant, as the seed vendor or agronomist believes it should look, given all the information for the location of the plant. If the two are not the same, the user can also request suggestions, such as different fertilizer rates, pesticides, etc. Similarly, as discussed below, processed/derived data generation system 139 includes an anomaly identification system that compares expected data to actual data to identify anomalies which can be surfaced for operator 110 or other users or systems and/or can be used for control. Similarly, diagnostic/prognosis system 141 can generate information indicative of a probable cause for the anomaly, or other information.

The superimposed (or juxtaposed) data can be displayed in a wide variety of different ways. For instance, the data can be used to shade the view 326 in varying colors 330, based upon the particular data being displayed. By way of example, if the data being displayed over the view of the ground is soil type, then different colors can be used to indicate different soil types that are located on the ground being viewed. Of course, colors can be used to indicate other things as well, such as estimated soil moisture, the fertilizer application locations and rates that have been used (or that are suggested) at the various locations, the types of pests or weeds that have been identified or that are expected on that piece of ground, etc.

The superimposed data can be generated in the form of another image 332 as well. For instance, the drain tile location (or plant growth stage) can be represented by a dashed line or another image that resembles an actual drain tile (or plant). The superimposed data 328 can be shown as a computer generated graphic 334, or as alphanumeric information 336. For instance, the alphanumeric information 336 can be a numeric indicator identifying a planting depth as it varies across the ground being viewed. The alphanumeric information can be used to indicate many other things as well. Of course, the superimposed data 328 can be a graph (bar graph, pie graph, histogram, etc.), an icon, tiles, different shapes, or other indicia. The indicia can be centered on plants or rows or furrows and can be indicative of a nozzle spray width, estimated root zone, or comprised of other visual indicators 338 as well.

At any time while operator 110 is viewing the view of the ground along with the superimposed data, operator 110 can provide an input requesting that information representing the view and superimposed data be sent to another person or sent off to storage. This is indicated by block 340 in the flow diagram of FIG. 5. For example, operator 110 can indicate that the combined image be e-mailed to an agronomist, the seed company, or anyone else. When this is done, application 160 illustratively interacts with communication component 166 to send the image, as desired, as indicated by block 342.

Operator 110 can also illustratively move mobile device 104 to change the view of the agricultural surface such as the ground (or plant) in the generated image, as indicated by block 344 in FIG. 5. By way of example, operator 110 can move the mobile device 104 by panning it to the right or left or tilting it upwardly or downwardly in order to view a different piece of ground, as indicated by block 346.

Also, operator 110 can change the distance from mobile device 104, of the piece of ground being viewed, as indicated by block 348. In order to do this, operator 110 can illustratively change the focal point of the image capture component 162 that is being used to generate the image. For instance, when the image includes a piece of ground that extends from approximately ten feet away from the mobile device 104 to approximately forty feet away from the mobile device 104, the operator 110 can illustratively touch the touch sensitive display screen on a portion of the image to shift the focal point of the camera to the touched location. This can have the effect of moving the location of the ground being viewed from a place closer to the operator 110 to a point further distant from the operator, or vice versa.

In another example, application 160 displays a distance slider on the display screen that can be manipulated by operator 110 using touch gestures (or otherwise) to indicate a distance from mobile device 104, for which data is being sought. For instance, it may be that data is being sought for the piece of ground closely adjacent operator 110. The operator 110 may then wish to retrieve data for a piece of ground further away. The operator 110 can actuate the slider to indicate that he or she wishes to retrieve data for a piece of ground an ⅛ of a mile away from the operator, etc. These measurements are given for the sake of example only. Distance changing component 350 is shown on the user interface display of FIG. 5C to represent the slider, or other touch sensitive distance changing mechanisms that can be used to change the distance by zooming in or out. Of course, the distance changing mechanisms can be manipulated using a joystick, a thumbswitch, or other mechanism other than touch gestures.

Referring again to the flow diagram of FIG. 5, operator 110 can move or manipulate the viewing component in other ways as well. For instance, the operator can simply walk through the field so that the image of the ground or plants being viewed changes. Moving the viewing component in other ways is indicated by block 352 in FIG. 5.

While operator 110 is viewing a piece of ground or plants, operator 110 can also provide an input requesting different data for the same piece of ground or plants, as indicated by block 354 in FIG. 5. For instance, the operator 110 may first request that the drain tile data be superimposed over the image of the ground. Operator 110 may next request that the fertilizer application rate data be superimposed over the viewed ground. Operator 110 may then request that soil type data be superimposed over the image of the ground. Operator 110 may then request that an expected plant maturity image be displayed. All of these images can be accumulated to generate an enhanced view of the ground with multiple sets of data superimposed over it, or each set of superimposed data can be erased when a new one is requested. In any case, when the new information is requested at block 354 in FIG. 5, processing reverts to block 308 where a request for the new data is sent from mobile device 104 to hosted agricultural data service 112.

It should also be noted that, at any point, operator 110 can provide a user input to close the mobile agricultural application 160, as indicated by block 356 in FIG. 5. When that happens, the application may be closed.

Another feature should also be mentioned. At any point when the operator is viewing the information, the operator can provide a user input to save that information to the operator's stored agricultural data. If the user is using private cloud store 128, then when the storage input is received from the operator, application 160 provides the information to mobile application server 136 in hosted data service 112 for storage in the operator's private cloud store 128. If the operator is storing the information locally, or on a different store, then application 160 sends the information for storage at that location.

The information is illustratively stored along with a time stamp so that it can be retrieved later, at any point in time. This allows operator 110 or another service to perform historical analysis with respect to the captured image and superimposed data.

Figure 6:
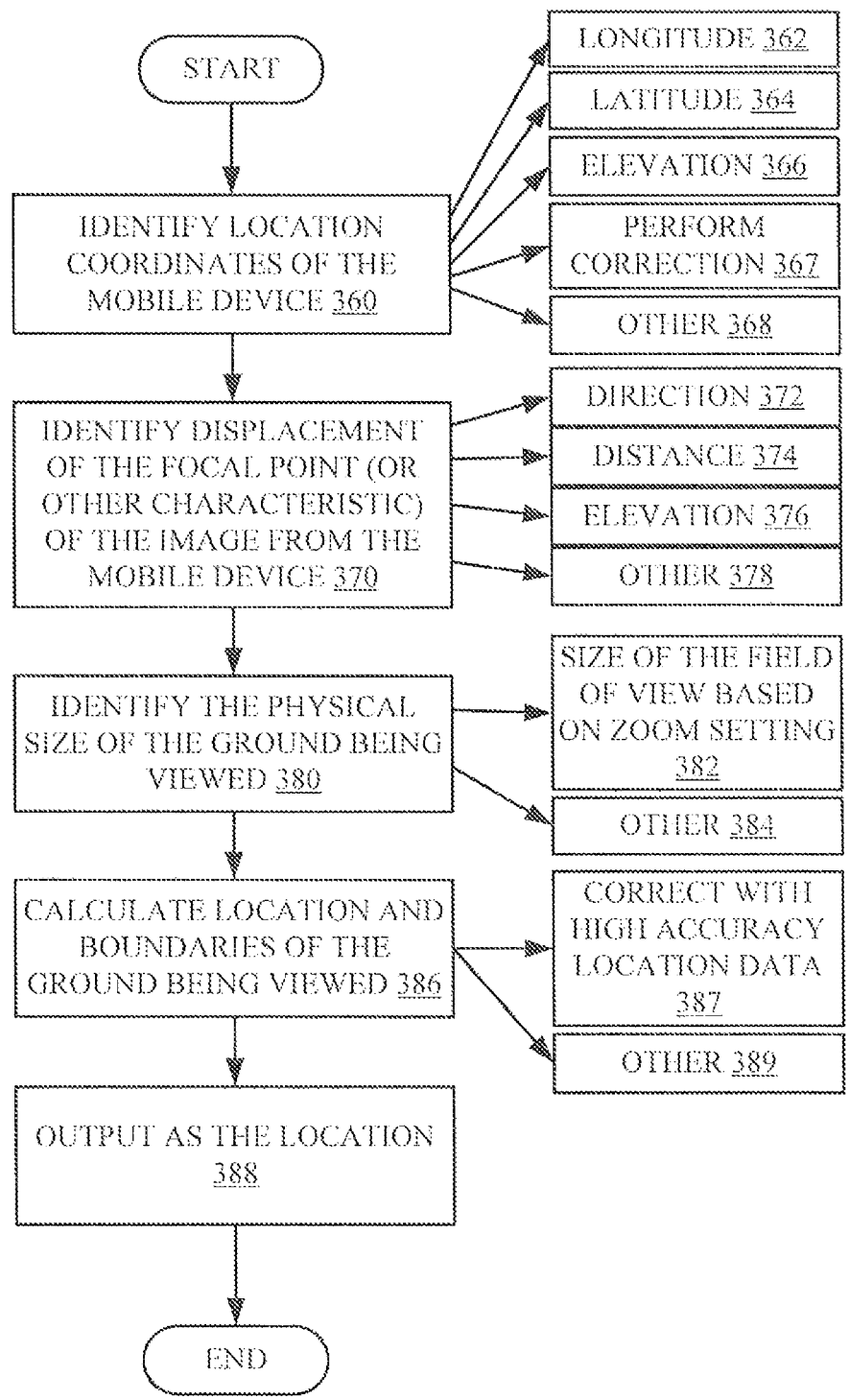
FIG. 6 is a flow diagram illustrating one example of calculating a location of the ground or agricultural surface being viewed.

FIG. 6 shows one example of the operation of distance calculation component which can be used by application 160 in order to obtain a measure of the position of the piece of ground or item being viewed, and to generate an enhanced image that shows it in perspective, relative to the position and orientation of mobile device 104. It will be noted that this can be done in a wide variety of different ways and the one described with respect to FIG. 6 is only one example.

Application 160 illustratively identifies the location coordinates of mobile device 104 using positioning system 148, as indicated by block 360 in FIG. 6. The location coordinates illustratively include a longitude 362, a latitude 364, an elevation 366, and it can include other information as well, as indicated by block 368. The location coordinates can be obtained using a variety of different position detectors 165. For instance, the location coordinates can be obtained using a global positioning system (GPS), using a long range aide to navigation (LORAN) system, using any of a variety of dead reckoning systems, using a cellular tower triangulation system, or using other systems. The detected location can also be corrected by position correction system, as indicated by block 367.

Once the location of mobile device 104 is identified, application 160 uses distance calculation component 140 to identify a displacement of the focal point (or the ground being viewed as identified by another characteristic) from mobile device 104, as indicated by block 370 in FIG. 6. In one example, the distance is characterized in terms of its direction from mobile device 104, as indicated by block 372. The distance is also characterized by the distance 374 from mobile device 104, any change in elevation (such as if the user is pointing the camera in mobile device 104 slightly upwardly or downwardly to accommodate terrain, etc.) as indicated by block 376, and the displacement can be calculated using other information 378 as well.

Application 160 also illustratively identifies the physical size of the ground being viewed. This can illustratively be determined based upon the zoom setting of the view finder (or camera) being used to generate the view of the ground. By way of example, if the zoom setting is set on 1×, then the size of the ground being viewed can be calculated as a first size. If the zoom setting is set on 5×, then the size of the ground can be calculated as a different size. Identifying the physical size is indicated by block 380. Identifying the size of the field of view based on the zoom setting is indicated by block 382. Calculating the physical size of the ground being viewed can be performed in other ways as well, as indicated by block 384.

Once all of this information is received, distance calculation component 140 illustratively calculates the location and boundaries of the agricultural surface or ground being viewed in the displayed image, as indicated by block 386 in FIG. 6. In one example, the location signal identifying the location and boundaries of the ground being viewed may be generated by a GPS receiver on the mobile device 104. In one example, position correction system 167 can obtain high accuracy location data which can be used to correct the GPS signal or other position signal detected by position detector 165. For instance, during planting, high accuracy (e.g., RTK corrected data) may be generated for the locations where the individual plants are located. If the plants have emerged, the high accuracy location of the plants in the view can be used to correct the lower accuracy GPS signal from the GPS receiver on the mobile device 104. Correcting the GPS signal is indicated by block 387. Other corrections 389 can be performed as well, as discussed elsewhere. All of this information, or a subset of it, can be output as the location of the ground being viewed, as indicated by block 388. Again, it will be noted that the particular location, boundaries and orientation of the ground being viewed can be calculated in other ways as well, and the description with respect to FIG. 6 is only one example.

Figure 7:
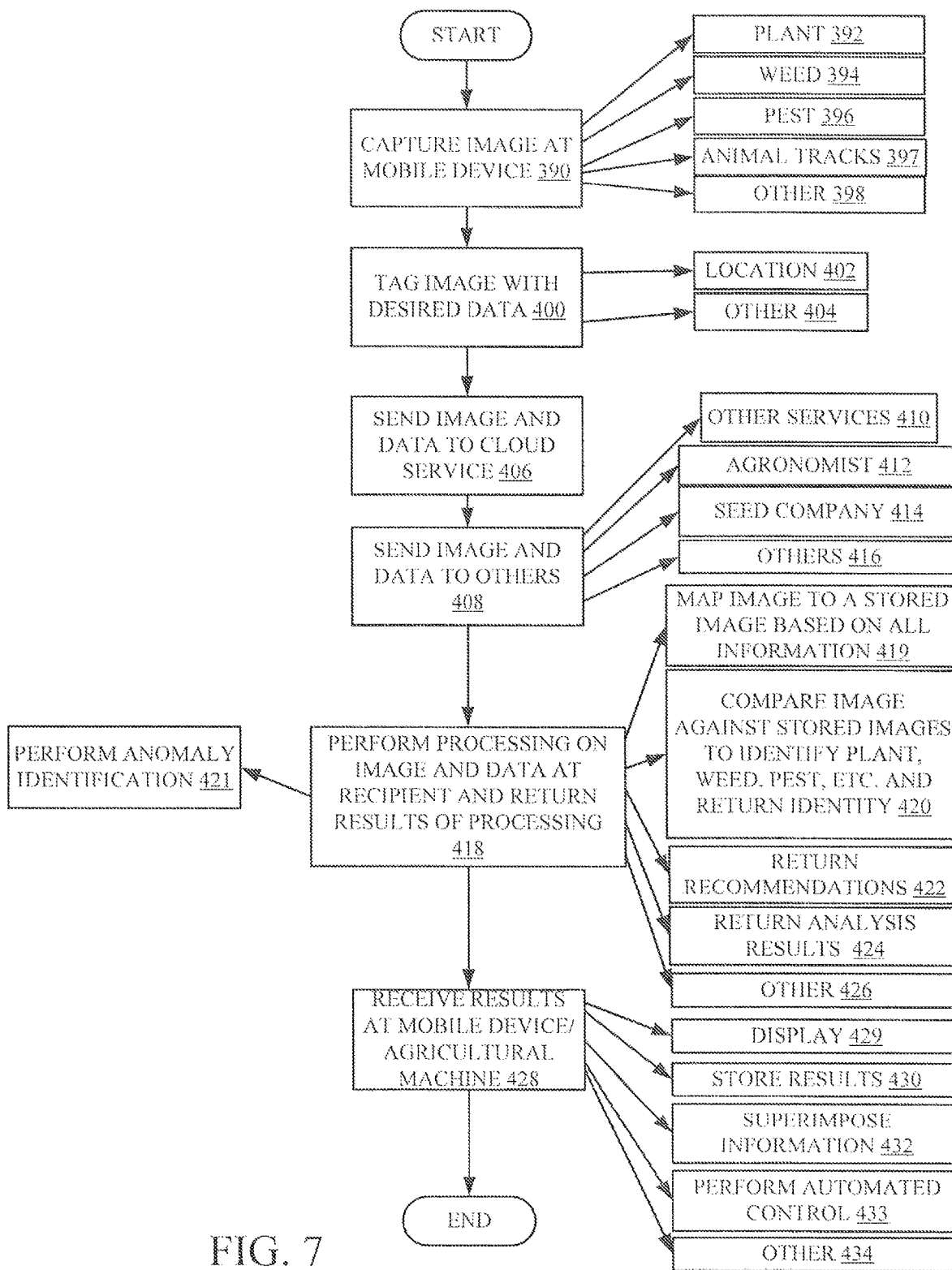
FIG. 7 is a flow diagram illustrating one example of the operation of capturing an image and corresponding data and sending the image and/or data to a cloud-based service to obtain analysis results.

Operator 110 can also use mobile device 104 to capture images or other data and send it to service 112 for storage or analysis. FIG. 7 is a flow diagram illustrating one example of the operation of mobile device 104 in capturing data (such as an image or other data) and sending it to hosted agricultural data service 112 for analysis, or storage. In the example shown in FIG. 7, operator 110 first uses image capture component 162 to capture an image at mobile device 104, as indicated by block 390 in FIG. 7. The image can be of an agricultural surface such as the ground (as discussed above) or it can be an image of a plant 392, a weed 394, a pest 396, animal tracks 397, or any of a wide variety of other information 398.

Application 160 illustratively tags the image with desired data, as indicated by block 400 in FIG. 7. By way of example, the image can be tagged with time, date and location information as indicated by block 402. Or the image can be tagged with other information as indicated by block 404.

The image and added data (if any) are then sent to hosted agricultural data service 112 in cloud 102. Sending the image and data to service 112 is indicated by block 406 in FIG. 7.

As discussed above, operator 110 can illustratively request that the information be sent on to others. If so, the information can be sent directly by mobile device 104 using communication component 166, or the information can be sent by hosted agricultural data service 112. Sending the image and/or data on to others is indicated by block 408 in FIG. 7. Sending the information (image and/or data) to other services 124 or 126 is indicated by block 410. The information can also be sent to an agronomist 412, to the seed company 414 (or other vendors), or to other people 416 as well.

Hosted agricultural data service 112, such as processed/derived data generation system 139 and/or diagnostic/prognosis system 141, can then perform processing on the image and data that it has received. Also, any other recipient of the information can perform processing and return results of that processing, as indicated by block 418. This processing can take a wide variety of different forms. For instance, in one example, operator 110 captures an image of a plant, and appends the location of that plant. The image and location are then sent to a seed company or an agronomist which compares the stored image against an image that shows the expected maturity of the plant (as shown above in FIG. 4B), at that location, given the hybrid, the weather data, soil type information, fertilizer information, and other information that has been appended to or otherwise corresponding to the image. The seed company can then illustratively send back a comparison image showing the expected maturity of the plant (e.g., what the plant should look like under these circumstances as shown in FIG. 5D) and superimposed over the image of the actual plant that was sent by operator 110. The seed company can also send back recommendations (such as to increase or decrease fertilizer application, etc.).

The image and/or data can also be automatically mapped to other stored images. For instance, if the image is a plant, the service returning the data can take the location of the plant, the weather data and soil data for that location, the fertilizer and tillage history, the herbicide or insecticide or other chemical application, the particular hybrid, and map to an image of the plant at an expected maturity, given all of the information. Mapping the image and/or data against stored images is indicated by block 419. The image and/or image can also be automatically compared against libraries of other images and/or data or examined by consultants for purposes of identification. For instance, where operator 110 captures an image of a weed, it can be viewed by a consultant or compared against other images or classified using neural networks at a weed identification service, to identify the weed and send the weed identification back to operator 110. The same can be done for various pests and other information. Comparing the image against stored images and returning the results is indicated by block 420 in FIG. 7. System 139 can compare the actual image and/or data to an expected image and/or data to identify anomalies, as indicated by block 421.

The recipient that receives the information can also return recommendations for how to proceed, as indicated by block 422. For instance, diagnostic/prognosis system 141 can run a workflow based on the image and/or data, based on a comparison with expected data, or based on other criteria. The workflow can generate an output suggesting or automatically making control operations. By way of example, if the image is a pest, the recommendations may include pesticides to apply. If the image is a diseased plant, the recommendations may include treatment options for treating the disease. These are examples only. The diagnostics/prognosis system 141 or other systems can return analysis results of various kinds, and this is indicated by block 424. Of course, the systems can return other information as well, and this is indicated by block 426.

Mobile device 104 and/or agricultural machine 103 receives the results and can perform a variety of different actions. Receiving the results is indicated by block 428 in FIG. 7. The information can be displayed on device 104, on a heads up display on agricultural machine 103 or in other ways, as indicated by block 429. Mobile agricultural application 160 can simply store the results, as directed by operator 110, as indicated by block 430. Again, the results can be stored locally, at a variety of different locations, or in private cloud store 128. Mobile device 104 and/or display device 107 on agricultural machine 103 can generate the superimposed or juxtaposed (augmented reality) image and superimpose or juxtapose the information received over the image being viewed as discussed above, as indicated by block 432. Mobile device 104 and/or control system on agricultural machine 103 can perform automated control of machine 103 or other items, as indicated by block 433. Of course, mobile device 104 and/or agricultural machine 103 and/or other systems can perform other operations as well, as indicated by block 434.

Figure 8:
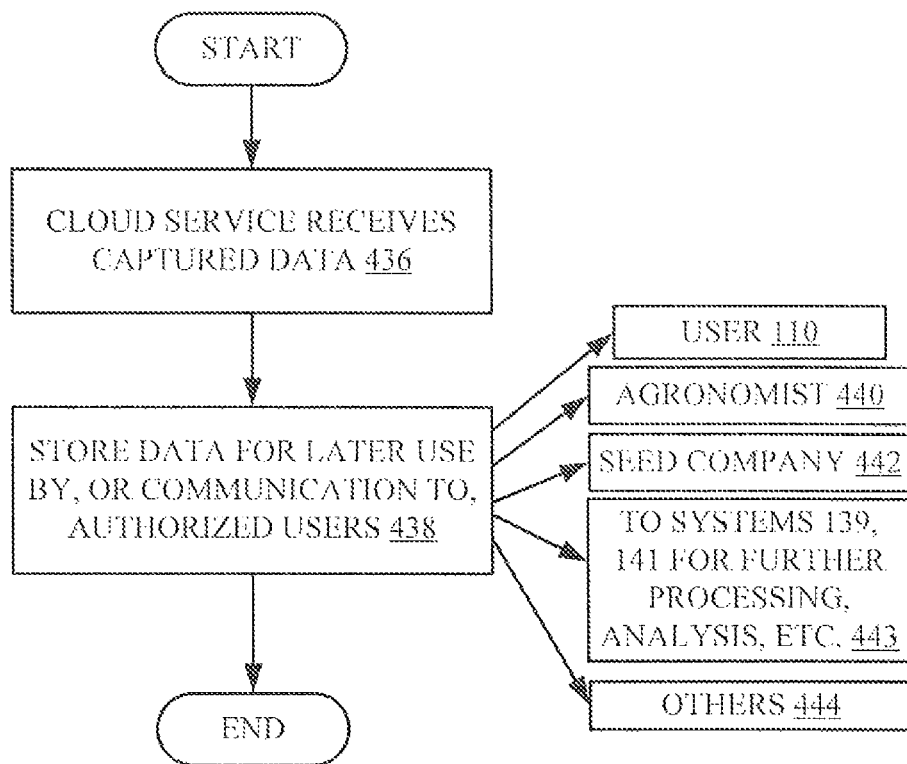
FIG. 8 is a flow diagram illustrating one example of receiving captured data at the cloud-based service.

FIG. 8 is a flow diagram illustrating one example of the operation of hosted agricultural data service 112, when it receives information from mobile device 104. Service 112 first receives the captured data (the image and/or any other data) from mobile device 104, as indicated by block 436 in FIG. 8.

Service 112 then stores the data for later use by, or communication to, other authorized users or systems, as indicated by block 438 in FIG. 8. By way of example, the information can be stored for later access by operator 110. The image and/or data can also be stored for later access or provided for immediate analysis by an agronomist identified by operator 110, as indicated by block 440 in FIG. 8. The image and/or data can be stored for access by other systems, such as processed/derived data generation system 139, diagnostic/prognosis system 141, etc., for further processing and analysis to generate additional data, as indicated by block 443. The image and/or data can be stored, or sent to a vendor, such as the seed company, the fertilizer company, etc., as indicated by block 442. The image and/or data can also be stored or sent to other services or data stores or entities as well, as indicated by block 444.

Figure 9A:
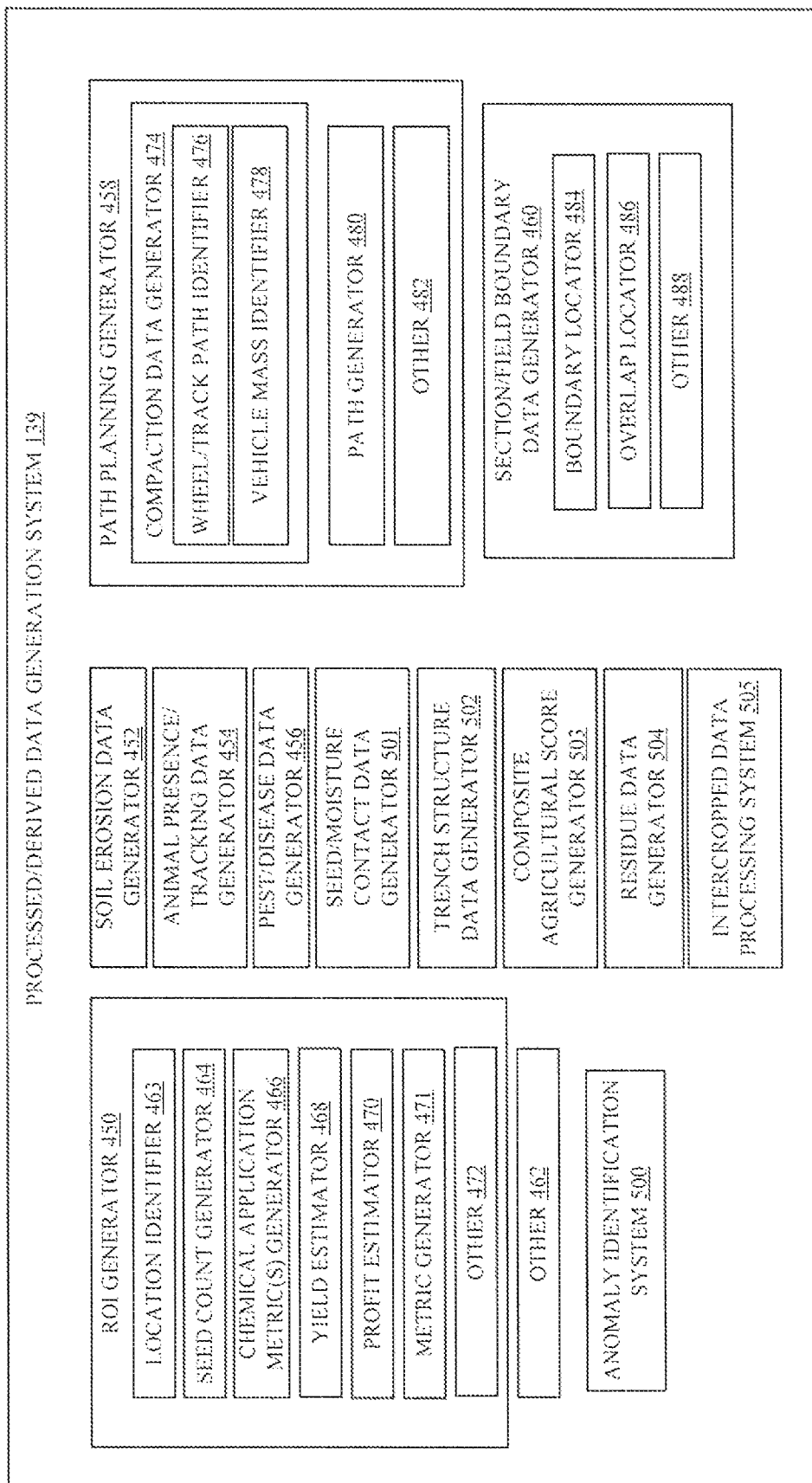
FIG. 9A is a block diagram of one example of a processed/derived data generation system.

FIG. 9A is a block diagram showing one example of processed/derived data generation system 139 in more detail. In the example shown in FIG. 9A, data generation system 139 includes return on investment (ROI) generator 450, soil erosion data generator 452, animal presence/tracking data generator 454, pest/disease data generator 456, path planning generator 458, section/field boundary data generator 460, anomaly identification system 500, seed/moisture contact data generator 501, trench structure data generator 502, composite agricultural score generator 503, residue data generator 504, intercropped data processing system 505, and other items 462. ROI generator 450 can include seed count generator 464, chemical application metric generator 466, yield estimator 468, profit estimator 470, and other items 472. Path planning generator 458 can include compaction data generator 474 (which, itself, can include wheel/track path identifier 476 and vehicle mass identifier 478), path generator 480, and other items 482. Section/field boundary data generator 460 can include boundary locator 484, overlap locator 486, and other items 488. ROI generator 450 can generate an ROI metric indicative of the financial productivity of a portion of a field. The portion may be a square foot, multiple square feet, a row, a section, or other geographic areas of a field. ROI generator 450 illustratively identifies the location for which the ROI metric is to be generated and then aggregates data corresponding to that location.

For example, location identifier 463 receives a location identifier (that identifies a geographic location under analysis) in a request from a mobile device or other display device requesting that the ROI metric information corresponding to the location under analysis be sent for display. Seed count generator 464 accesses the particular individual seed locations within the area for which the ROI is being considered. In one example, the ROI for an entire field may be considered and then the ROI metric for individual portions of that field may be broken out so that they can be displayed. Chemical application metric generator 466 obtains the discrete spray location or other chemical application locations to identify the quantity of chemical that have been applied to the location for which the ROI generator is generating the ROI metric. Yield estimator 468 generates a yield estimate for that location. Yield estimator 468 may generate a yield estimate based on historic yield estimates or based upon current plant development information or based on other criteria. Profit estimator 470 obtains cost information corresponding to the seeds, corresponding to chemicals applied to the location, corresponding to fuel and labor costs, and any other information that is to be used in generating an ROI metric. Metric generator 471 obtains the information generated or obtained from seed count generator 464, chemical application metric generator 466, yield estimator 468, and profit estimator 470, and generates an ROI metric indicative of the ROI for the geographic location under analysis.

Soil erosion data generator 452 can receive an image of the geographic location under analysis and compare it to a prior image of the location under analysis to identify soil erosion. Soil erosion data generator 452 can generate a soil erosion metric indicative of the soil erosion that has occurred. The soil erosion metric may be a quantifier indicative of a quantity of soil that has eroded, a severity level indicative of the severity of the soil erosion that has occurred, or any of a wide variety of other metrics.

Animal presence/tracking data generator 454 may illustratively receive an image of the geographic location under analysis. The image may include one or more animal tracks that can be compared against a library of images of animal tracks to identify a particular animal that made the tracks. Similarly, pest/disease data generator 456 can receive an image of a pest or a diseased plant. The image can be compared by an image processor against a library of pests or diseased plants to identify the pest or diseased plant. Pest/disease plant data generator 456 can then generate an output identifying the pest or disease and also identifying a recommended treatment (e.g., chemical application, etc.) to address the pest or disease. Similarly, the identity of the pest or disease can be provided to diagnosis/prognosis system 141 which can identify and output a treatment for automatic or manual implementation.

Path planning generator 458 can generate a path that can be automatically downloaded into agricultural machine 103 so that agricultural machine 103 can automatically follow the path, or the generated path can be displayed to operator 110 so that the operator 110 can control agricultural vehicle 103 to follow the path, or the path can be used in other ways. The path can be generated based on a wide variety of different criteria. In one example, the path may be generated to avoid undue compaction in certain areas or to avoid driving on crops or in muddy areas or to direct driving in other ways. Therefore, wheel/track path identifier 476 illustratively obtains the dimensions of agricultural machine 103 to identify where the wheels and tracks are relative to the position sensor on mobile device 104 or another GPS or location sensor on agricultural machine 103. Wheel/track path identifier 476 then identifies the particular path that the wheels or tracks or other ground engaging elements on agricultural machine 103 are taking as machine 103 moves through the field. Vehicle mass identifier 478 identifies the mass of agricultural machine 103 at different geographic locations in the field. The vehicle mass may be constant except for the change in fuel level in the machine. Therefore, vehicle mass identifier 478 can detect the fuel level in the machine and adjust the mass of the vehicle based upon the fuel level. In other examples, where agricultural machine 103 is a sprayer, then as material in the sprayer is dispersed, thus lowers the mass of the machine, as the machine operates. Also, if agricultural machine 103 is a planting machine, then as seeds are planted, the mass of the vehicle may change as well. If agricultural machine 103 is a harvester, then the mass of the machine 103 increases between unloading operations. Therefore, vehicle mass identifier 478 can detect the application spray rate or the seeding rate or yield to identify how the mass of the vehicle is changing. Vehicle mass identifier 478 can identify the vehicle mass in other ways as well.

Other criteria detector 482 can identify other criteria that may be used to generate a path. Based upon the criteria detected by various criteria identifiers in path planning generator 458, path generator 480 generates a path output indicative of a path that agricultural vehicle 103 has taken or a path that is recommended for agricultural vehicle 103, or both. In addition, path planning generator 458 can receive an input from operator 110 indicating the criteria that operator 110 has specified for use in identifying the path. The criteria may be time, fuel efficiency, compaction criteria, and/or other criteria. Path planning generator 458 generates an output indicative of the path based upon the desired criteria.

Section/field boundary data generator 450 can identify the boundaries of the field in which agricultural machine 103 is traveling, the boundary of the rows in the field, or the boundary of machine sections, or other boundaries. Overlap locator 486 identifies when different sections or row units are operating to determine when there has been overlap. For instance, if a planter can be turned on and off in sections, it may be that during one pass one or more sections plant seeds that overlap with seeds planted during a previous pass so the overlapping portion of the field is double planted. This overlap can be identified by overlap locator 486. Section/field boundary data generator 460 can generate an output indicative of other section or field boundaries as well.

Anomaly identification system 500 (which is described in greater detail below with respect to FIG. 9B) identifies expected data (such as an expected condition or state) based on a prior state and a prior condition and compares that expected condition or state to the actual sensed data (an actual sensed condition or state) to determine whether an anomaly exists. The anomaly can be any of a wide variety of different anomalies, such as a difference between the expected state of development of a plant and its actual state of development; the state of a weed which has already been sprayed, and the actual state of the weed; the difference between expected soil moisture and actual soil moisture; among a wide variety of other anomalies.

Seed-to-moisture contact data generator 501 generates data indicative of the quality of contact between the seed and moist soil. For instance, the seed may have good seed-to-soil contact, but the soil may not be moist in which case the seed-to-moisture metric may be relatively low compared to a scenario where the seed-to-soil contact is good and the soil has a desired moisture level. The seed-to-moisture contact metric may be used by itself, or it may be used to generate other data, such as estimated plant development, estimated yield, estimated emergence data, etc. In order to generate a seed-to-moisture metric, the seed-to-moisture contact data generator 501 may receive a sensor signal indicative of the seed-to-soil contact (such as an image of the seed when it is placed in the furrow, information indicative of the quality of the furrow, among other things), as well as a soil moisture metric indicative of soil moisture, and calculate the seed-to-moisture contact metric based upon that information or other information.

Trench structure data generator 502 may receive data indicative of the trench formation and generate a trench structure metric that indicates the quality of the trench structure. For instance, a visual or optical sensor may generate a signal showing the trench, or furrow, as it is generated. The quality of the sidewalls, the trench depth, the trench shape, among other characteristics of the trench can be extracted from the image using image processing and used by trench structure data generator 502 to generate a metric indicative of the trench quality.

Composite agricultural score generator 503 can obtain a wide variety of different types of information and generate a composite agricultural score based on that information. For instance, a composite planting score may be generated as a function of the seed-to-moisture metric, the trench structure metric, one or more residue coverage metrics (described below), the as-planted soil temperature (which may be sensed or estimated during planting), the quality of the as-planted fertilizer or pesticide application or other chemical application, a planter bounce metric indicative of whether the planter row unit is bouncing during planting, a planter speed metric indicative of planter speed during planting, and/or any of a wide variety of other metrics.

Composite agricultural score generator 503 can use a function that weights the various inputs to the function or other mechanisms for generating the composite agricultural score. The score can be georeferenced to a particular geographic location and used in an augmented display, or it can be pre-indexed or tagged in other ways as well.

Residue data generator 504 can receive sensor signals indicative of residue on an agricultural surface and generate any of a wide variety of different types of residue data. For instance, residue data generator 504 can process an image showing residue to identify a residue coverage metric indicative of the percent of the field that is covered by residue. Residue data generator 504 can generate a metric indicative of the uniformity with which reside covers the field, different residue coverage metrics for different geographic locations, a metric indicative of how likely it is that residue will interfere with crop emergence at different geographic locations, or a wide variety of other residue data. The residue data can be used to generate other information, it can be used in an augmented reality display, or in other ways.

Intercropped data processing system 505 can obtain and process information indicative of an agricultural field on which intercropping occurs. The intercropping can include a crop that is planted in the field which also has a cover crop planted (such as corn planted into rye, as a cover crop), fields that have multiple crops therein in alternating geographic areas (such as corn intercropped with soybeans, crops planted with a weed suppression cover crop, crops planted along with a tillage crop such as radishes, etc., or other intercropping scenarios. Intercropped data processing system 505 can generate metrics indicative of the effectiveness of a cover crop, the effectiveness of a tillage crop, the effectiveness of weed suppression crop, the soil attributes based upon living sensor information from the cover crop or other crop, various productivity characteristics (such as yield) for the multiple crops, and a wide variety of other information. The intercropped data can be used to generate additional information, it can be used on an augmented reality display, or it can be used in other ways as well.

Figure 9B:
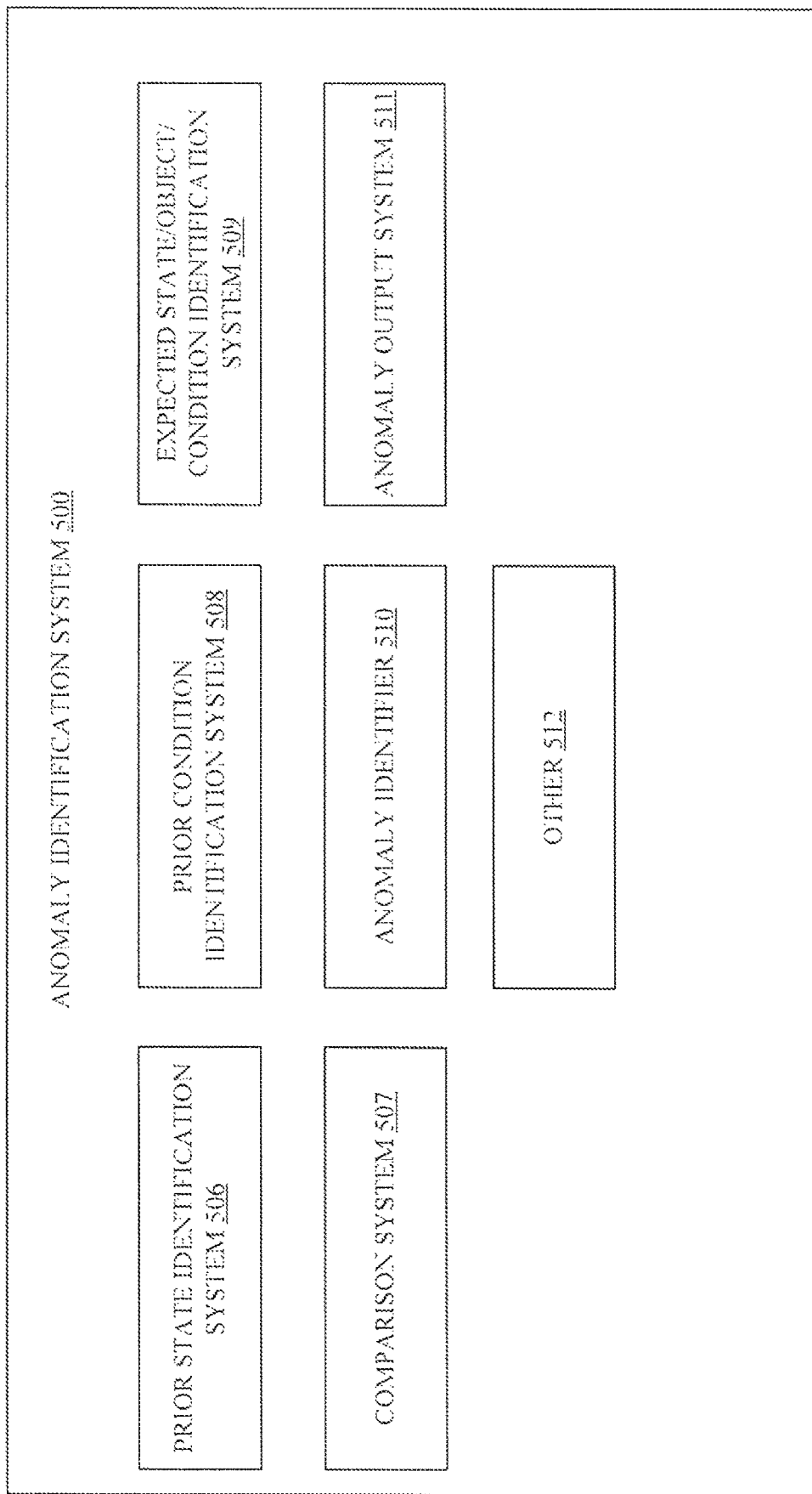
FIG. 9B is a block diagram of one example of an anomaly identification system.

FIG. 9B shows a block diagram of one example of anomaly identification system 500 in more detail. FIG. 9B shows that anomaly identification system 500 can include prior state identification system 506, prior condition identification system 508, expected object/condition identification system 509, comparison system 507, anomaly identifier 510, anomaly output system 511, and other items 512. Anomaly identification system 500 first identifies an expected object or condition based on a prior state and/or a prior condition and compares the expected object or condition with a current object or condition or state to determine whether an anomaly exists. An anomaly is a difference between what is expected (based upon prior information) and what is actually occurring. The difference may be quantified and compared to a threshold to determine whether the anomaly exists, the state or the severity of the anomaly, etc. The anomaly can be output along with any other desired data (such as the magnitude of the anomaly, etc.) for further processing, for providing automated control, for surfacing recommendations to one or more other users or for other reasons. The anomaly can also be georeferenced to a particular geographic location in the agricultural field, or indexed or referenced to other data as well.

More specifically, prior state identification system 506 identifies a prior state upon which an anomaly is to be identified. The prior state may be indicative of a prior state of a geographic location of a field, a prior state of a plant (such as a weed or crop plant), a prior state of soil (such as a prior moisture content), a prior compaction level, a prior slope or elevation, a prior nutrient level, or another prior state. Prior condition identification system 508 may identify a prior condition, such as prior weather conditions, prior characteristics or conditions corresponding to a plant or the field, prior location of weeds, rocks, obstacles, etc., or any other prior condition. Expected state/object/condition identification system 509 generates an expected state, object, and/or condition. The expected state, object, or condition can be obtained from another data store, or it can be derived using a model, a look-up table, a machine learned system, a rules-based system, an artificial intelligence system, a neural network, Bayesian classifier, etc., based on the prior information from systems 506 and 508, or it can be derived in combination with additional information as well.

For instance, a prior state may be identified as a prior developmental state of a particular plant. A prior condition may be indicative of the weather that has occurred since the prior developmental state of the plant was identified. The expected state generated by expected state identification system 509 may be a currently-expected developmental state of the same plant generated by a plant development model, given its prior state and the intervening prior whether conditions. The expected state, object, or condition may be the expected state of a weed when its prior developmental state is known and the prior condition indicates that it was sprayed with a herbicide. The expected state, object, or condition may be the state of erosion of a geographic location of a field generated by a soil erosion model, given the prior state of the terrain at that location and given the prior weather conditions, such as the prior precipitation, etc. These are just some examples of an expected state, object, or condition, and how they can be generated.

Comparison system 507 receives information from expected state/object/condition identification system 509 that identifies the expected state, object and/or condition. Comparison system 507 also receives data indicative of a current state, object, and/or condition. The current state, object, and/or condition may be represented by a current sensor signal, by currently derived data, or it may be obtained in another way. By way of example, where the expected state output by system 509 is the expected developmental state of a plant, then the current state of the plant may be a sensor signal indicative of the current developmental state of the plant (such as a developmental state of the plant identified by an image processor based on a current image of the plant, etc.). Comparison system 507 compares the two items of data (the expected state and the current state) and generates an output indicative of the difference. Anomaly identifier 510 receives the comparison output from system 507 and identifies an anomaly based upon that information. The anomaly identifier 510 then generates an output indicating the type of anomaly. For instance, in the example in which the expected and actual state is the plant development state, the anomaly identifier may indicate that a plant is less developed than expected. In an example where the expected and current state are the presence or absence of an obstacle, the anomaly identifier may identify the anomaly as one in which an obstacle exists (such as a rock or other obstacle) where none was expected. If the expected and actual state are the state of erosion, the anomaly identifier may identify an anomaly as one in which a trench (or other erosion effect) exists where none was expected. In an example where the expected and current state are the state of a weed, the anomaly identifier may identify an anomaly as one in which a weed exists where it had already been sprayed. These are examples of the types of outputs that can be generated by anomaly identifier 510.

Anomaly output system 511 then generates an output indicative of the identified anomaly, a severity level of the anomaly, etc. The output can be used to display or otherwise surface the anomaly for a user, to generate control signals for performing automated control based on the anomaly, or to display the anomaly on a screen as part of an augmented reality display, or in any of a wide variety of other ways.

In identifying anomalies, the prior state and prior action can be used to generate predictive information indicative of anomalies (such as unexpected objects or conditions) which can be used for visual augmentation. The predictive information used to generate the anomalies may be relative to imagery or data from a current time or relative to data, including imagery, collected at a pass time. In the latter case, there may be a predictive image or map layer from the past and an actual image from the present. These two data sets may be analyzed to identify objects (such as weeds or other objects) or other features, such as crop development or other features, as anomalies where the predictive and actual data differs by a threshold amount. The anomalies may be visually highlighted and the workflow can pursue further description, diagnosis and/or prognosis of the condition.

Where anomalies exist, different workflows may be launched depending on the particular anomaly. For instance, a workflow related to a diagnosis may be triggered when an anomaly is identified that indicates the weeds are present where a spring operation has already occurred. In such an example, a workflow may relate to a diagnosis that the weeds are glyphosate resistant. In another example, the workflow may perform a diagnosis to identify that the weeds are untreated due to a faulty spray nozzle. These are examples only.

Figure 9C:
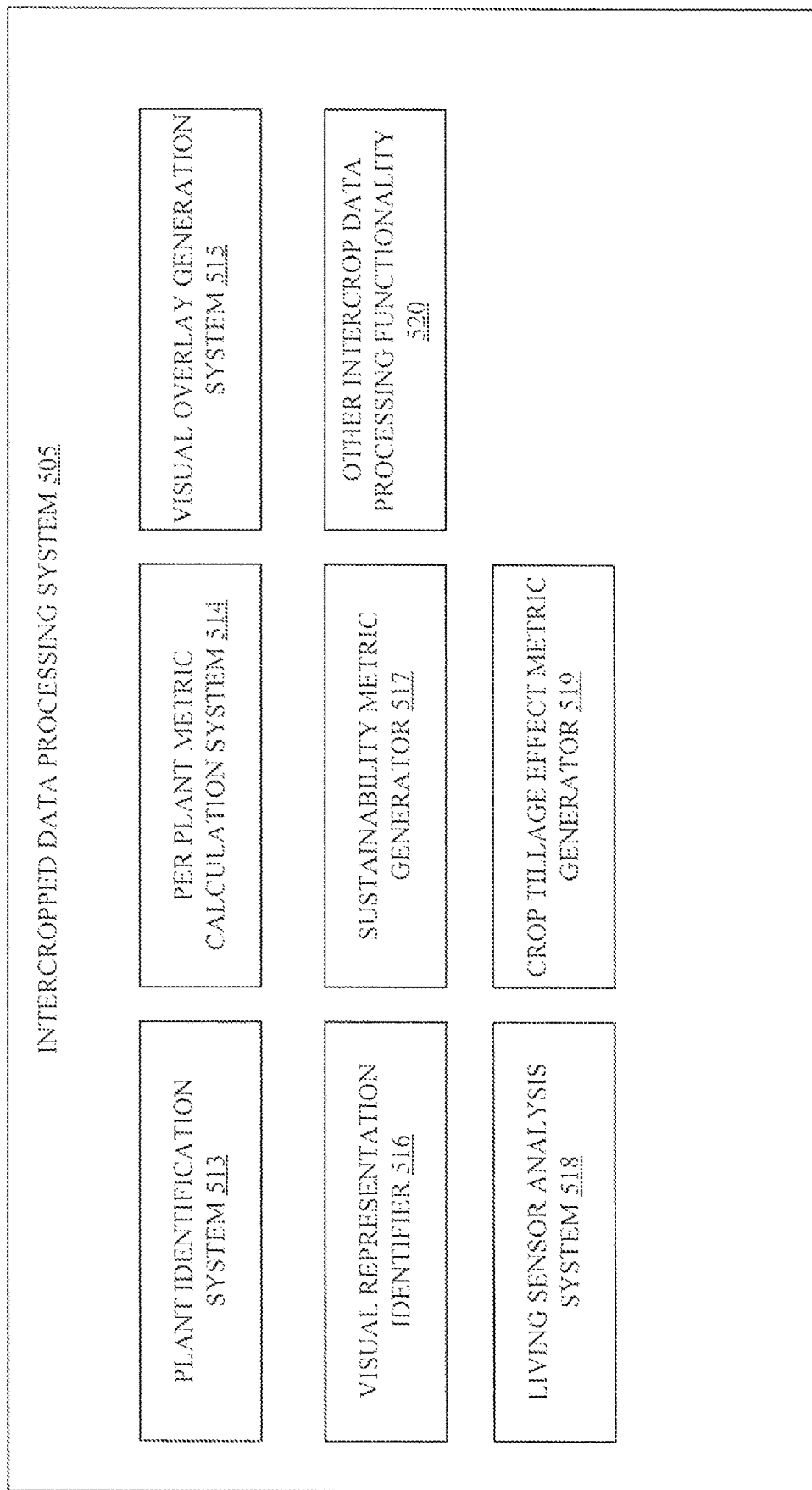
FIG. 9C is a block diagram of one example of an intercropped data processing system.

FIG. 9C is a block diagram showing one example of intercropped data processing system 505 in more detail. System 505 can include plant identification system 513, per-plant metric calculation system 514, visual overlay generation system 515, visual representation identifier 516, sustainability (e.g., nitrogen/carbon/other) metric generator 517, living sensor analysis system 518, crop tillage effect metric generator 519, other intercrop data processing functionality 520.

Plant identification system 513 illustratively processes video images, or receives the result of such processing, and identifies plants in the different crops in an intercropped field. System 513 can compare the characteristics of crops identified in an image against those for the different intercropped plants planted in the field to identify which are which or identify the plants in other ways. Per-plant metric calculation system 514 can illustratively perform processing to identify per-plant metrics for each of the plants in the different intercropped systems. The per-plant metrics can be such things as a per-plant yield, estimated forage biomass, etc. A wide variety of other per-plant metrics can be calculated as well.

Sustainability metric generator 517 can also receive information indicative of the intercropped varieties and generate a variety of different sustainability metrics such as an estimate of carbon credits, carbon credits by species, nitrogen credits, among other things.

Living sensor analysis system 518 analyzes living sensors and generates an output indicative of that analysis. For instance, plants may have different colors based upon their vigor, based upon the various nutrients that are accessible to the plant, or nutrients that are unavailable to the plant, soil ph level, based upon the moisture in the soil, or based on a wide variety of other criteria.

Visual representation identifier 516 identifies a particular visual representation for each of the different types of crops in the intercropped field. Therefore, the visual representation can be overlayed, over a display in an augmented reality display showing where the different crops will emerge, showing the different crop populations, or showing different properties or characteristics corresponding to the crops. Visual overlay generation system 515 can generate an overlay indicative of any of the items or metrics calculated by the various systems and items in intercrop data processing system 505, over the field as an augmented reality display.

Crop tillage effect metric generator 519 generates a crop tillage effect metric that indicates a tillage effect that some crops may have had on the soil. For instance, radishes or other such plants may be planted in order to perform a tillage operation. A metric indicative of the effectiveness of the tillage operation can be generated by crop tillage effect metric generator 519.

A wide variety of intercrop data can be generated by other intercrop data processing functionality 520 as well.

In one example, different tile or plant icon attributes may be used to designate different plant varieties or species in the displayed image. In other examples, the augmented display may depend more heavily on the plant species or function. For instance, if corn and soybeans are intercropped, the augmented display may annotate corn plants with estimated per-plant yield, while annotating beans with an areal yield in two square meter segments (or in other segments). In another example, where corn is intercropped with a cover crop, then the corn may be annotated for estimated per-plant yield and the cover crop may be annotated for estimated forage biomass at a present time or at a future point in time such as after corn harvest. Other cover crop data may include such things as grain yield; biomass; nitrogen credit for legumes; carbon credit for species, vigor, or living roots; tillage effect from crops such as radish vigor and size; weed suppression effectiveness; soil attributes based on analysis of living sensors; and other information.

In addition, precision multi-intercrop planters may collect location information for each seed of each species. In performing analysis, the intercropped data processing system 505 can generate the overlays, thresholds (such as planting depth error discussed above), formulas (such as crop stage as a function of planting and growing degree days), uniquely relative to each plant type. Different crops may have different overlays.

Similarly, a single crop from an intercrop mix may be augmented or depicted. For instance, where corn is intercropped with soybeans or cover crops (such as rye, vetch, radish, etc.), the other crops may be subtracted from the augmented display to provide greater clarity of the corn data. The subtraction may be performed by intercropped data processing system 505 by subtracting plant data in the image and replacing it with an artificial background (such as black pixels), a corresponding actual background (such as a soil surface image for the field collected at planting time), a pseudo-realistic background (which can be actual or synthesized pixels for the local soil type), among others. Further, the subtraction and optional replacement discussed above may be performed in mono-cropped images to highlight individual rows, groups of plants, individual plants, weeds, etc.

It will also be noted that the augmented displays may be related to sustainability parameters, such as net carbon footprint, a crop input carbon footprint, gross carbon sequestration, or other sustainability parameters. The crop input carbon footprint may be the per-plant sum of carbon emissions associated with the seed, applied fertilizer, equipment operations and the like. Carbon sequestration on a per-plant basis may be estimated from crop and soil attributes, current growing environment, future growing environment, cultivation history, etc. The net carbon footprint may be the difference between the crop input carbon footprint and carbon sequestration.

Similarly, these values can be calculated based on area, where different crops have different levels of carbon footprint and carbon sequestration. In other examples, instead of a per-plant or area-based calculation, the environmental impact values can be calculated based on bushels, tons, or other metric of removed material. The impact of livestock grazing may be considered, such as manure, biomass consumption/removal, root system carbon storage impacts and other information.

Figure 10:
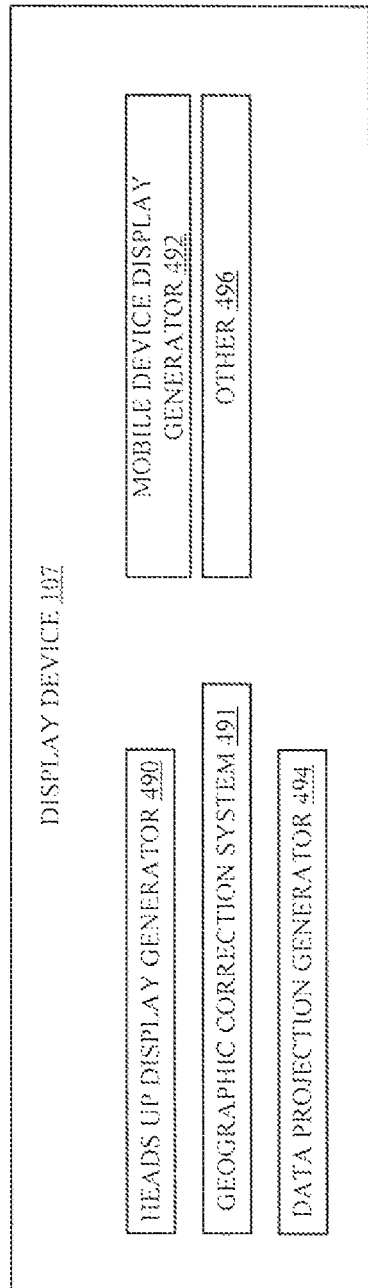
FIG. 10 is a block diagram of one example of a display device.

FIG. 10 shows a block diagram of one example of a display device 107. Display device 107 can include heads up display generator 490, geographic correction system 491, mobile device display generator 492, data projection generator 494, and any of a wide variety of other display devices 496. Heads up display generator 490 can generate a heads up display on wearable vision equipment (such as glasses), on the front windshield of the agricultural machine, on the front or side windows of the agricultural machine, and/or on the rear windows of the agricultural machine.

FIG. 10 is a block diagram showing one example of display device 107 (which can be similar to or different from display generator 159 which can generate a display on mobile device 104) in more detail. Display device 107 includes heads up display generator 490, geographic correction system 491, mobile device display generator 492, data projection generator 494, and other items 496. Heads up display generator 490 can be used in the operator compartment of agricultural machine 103 to generate a heads up display. The heads up display may be generated on the windshield of agricultural machine 103, on one or both of the side windows, and/or on the rear window, or on other surfaces. For instance, the heads up display may generate a display on the front windshield of agricultural machine 103 displaying alphanumeric, color coded, bar graph, or other metrics overlayed over different geographic locations ahead of machine 103 to show the different metrics or graphics georeferenced to those locations. Some examples will be described in greater detail below with respect to FIGS. 15-24. In another example, heads up display generator 490 can generate a heads up display on the rear window of a tractor or other towing vehicle that is towing an implement such as a planter with row units. The heads up display may superimpose, over each row unit, various information corresponding to that row unit, such as the seeding rate, downforce, ride quality, or any of a variety of other metrics for the particular row unit. In that way, when operator 110 turns around to view the towed implement, operator 110 can easily see a wide variety of different information corresponding to each of the row units on the implement. The same can be done for other implements, such as tillage implements, spraying implements, harvesting implements, or other implements. In some examples, heads up display generator 490 may comprise sensors which locate the eyes of operator 110 and then adjust the image generation to account for their location relative to the display and items on the display. Heads up display generator 490 can also be used to generate a heads up display on a wearable display device, such as smart glasses or an optical head-mounted display mechanism, or in other ways.

Geographic correction system 491 can be used to correct the geographic position signal indicative of the geographic location of machine 103 or display device 107. Such correction can be performed to more accurately display the georeferenced data. Some examples of geographic correction are described elsewhere herein.

Mobile device display generator 492 may be a display generator on mobile device 104, where mobile device 104 is mounted in, or otherwise resides in, the operator compartment of agricultural machine 103. For instance, the mobile device display generator 492 may be one or more of the components or items described above with respect to the mobile device 104 shown in FIG. 1B, or other display generators.

Data projection generator 494 illustratively projects visual indicia onto the field or other surface over which agricultural machine 103 is traveling. For instance, data projection generator 494 may be laser units mounted within or near the headlights of agricultural machine 103. The projection may be a color projection, an alphanumeric projection, a graphical projection, or another projection that is indicative of georeferenced metrics corresponding to the geographic location over which the projection is displayed.

Figure 11:
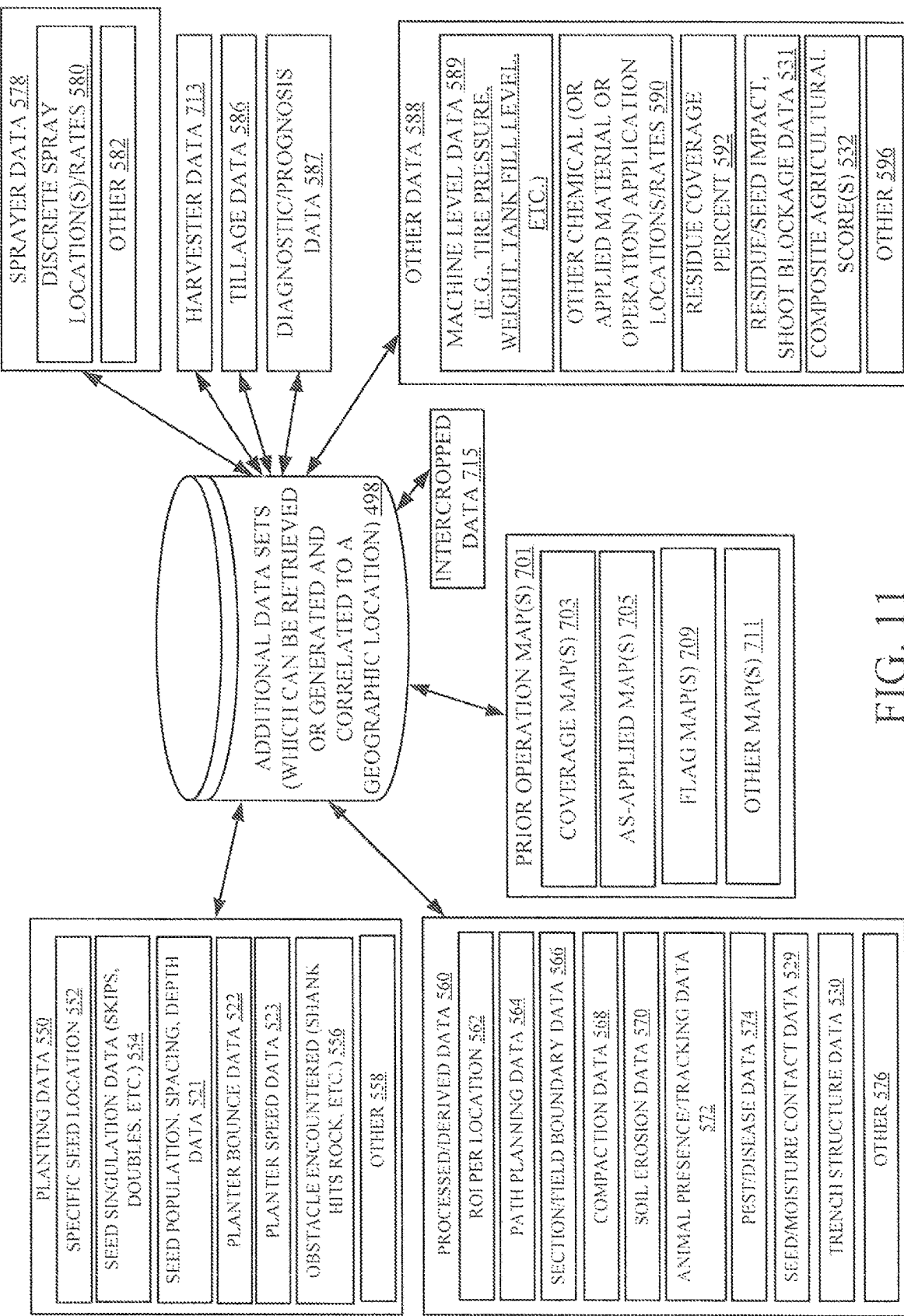
FIG. 11 is a block diagram illustrating an example of additional datasets that can be generated and/or saved by the hosted data service shown in FIG. 1.

FIG. 11 is a block diagram, similar to FIG. 4, except showing additional operational data sets 498 which can be retrieved and/or generated and correlated to a geographic location and stored in pre-indexed geo-tagged data store 138, or elsewhere. In one example, the additional datasets 498 can include georeferenced planting data 550. The georeferenced planting data 550 can include specific seed location data 552, seed singulation data 554, seed population/spacing/depth data 521, planter bounce data 522, planter speed data 523, obstacle encountered data 556, and other data 558. The specific seed location data 552 can be generated based on data from the planting machine. The specific seed location data 552 can indicate the individual seed locations detected during planting and transmitted back to hosted agricultural data service 112 where they can be stored in pre-indexed geotagged data store 138 and/or used by data generation system 139 or other items to generate additional data.

Seed population/spacing/depth data 521 can indicate the seed population over a particular geographic area of a field, the seed spacing over that area or a different area, and seed depth data indicating the depth at which a seed at a particular geographic location was planted. Data 521 can be sensed from a planter, during the planting operation, it can be estimated before or after the planting operation, or it can be obtained in other ways.

Planter bounce data 522 may be indicative of the ride quality of a row unit of a planter, or other data indicative of whether a planter was bouncing excessively (such as to come out of the ground or compromise the desired planting depth, etc.) during the planting operation. The planter bounce data can be sensed by a sensor 111 which may be an accelerometer, inertial measurement unit, or another sensor that can sense the ride quality of a row unit or other planter mechanism.

Planter speed data 523 can be sensed during the planting operation from a ground speed sensor which may be embodied at one of sensors 111 on agricultural machine 103. The speed sensor may sense the ground speed of machine 103, or a planting mechanism on machine 103. The speed sensor may also sense the speed of a seed delivery system, a seed metering system, or the speed of other parts of a planter or planting implement.

Seed singulation data 554 can be indicative of seed skips or doubles or other singulation events that are sensed in the seeding machines during the seeding operation. The singulation data 554 can identify when a singulation event occurred and the precise geographic location of that singulation event.

The obstacle encountered data 556 can indicate the geographic location where machine 103 encountered an obstacle. The obstacle can be detected using a mechanical deflection sensor, a torque sensor, an accelerometer, or another sensor indicating that the planter or a row unit or another machine or implement has encountered an obstacle. For instance, some planting mechanisms have a shank or other item that opens a furrow. When the shank encounters a rock or other obstacle, this may impart force into the shank that can be sensed by a sensor. The geographic location of that encounter, along with an indicator indicating what the encounter was (such as hitting a rock or another obstacle, etc.) can also be sent to hosted agricultural data service 112 from agricultural machine 103.

Additional datasets 498 can also include processed/derived data 560. Data 560 can include ROI per location data 562, path planning data 564, section/field boundary data 566, compaction data 568, soil erosion data 570, animal presence/tracking data 572, pest/disease data 574, seed-to-moisture contact data 529, trench structure data 530, or other processed or derived data 576. Generation of each of the items of data 562-574 was described above with respect to FIG. 9A. The geographic location of each of the metrics generated and reflected in data 562-574 can be sent from machine 103 to hosted agricultural data service 112 for storage in data store 138, or for additional processing or for storage elsewhere.

Additional datasets 498 can also include sprayer data 578. In one example, a sprayer has components that can recognize weeds and spray individual weed locations or other plant locations or pest locations that are detected by the sprayer during runtime. Thus, sprayer data 578 can include discrete spray locations and rates 580 that identify the individual locations where chemicals were sprayed, the content of the chemical, the rate at which the chemical was sprayed (or the amount sprayed at each location), and/or a wide variety of other data 582.

Additional datasets 498 can include harvester data 584 which can include yield, crop moisture, crop quality (such as whether the harvested material is clean, cracked, etc.), and any of a wide variety of other harvester data 584. The harvester data 584 can be correlated to one or more geographic locations and sent from the harvester to hosted agricultural data service 112 for storage and/or further processing.

Additional datasets 498 can include tillage data 586 which may include the tillage depth, various soil characteristics sensed during tillage, contour data that reflects the contour of the field after tillage, and a wide variety other tillage data. Data sets 498 can include diagnostic/prognosis data 587 generated or used by diagnostic/prognosis system 141.

Additional data sets 498 can also include prior operation maps 701. Such maps can include coverage maps 703 which indicate the coverage of a particular agricultural operation over a field. As-applied maps 705 may be maps of material, such as chemical, herbicide, pesticide, fertilizer, etc., as it was applied. As-applied maps may indicate the geographic location where material was applied, the amount applied, the rate at which it was applied, among other things. Flag maps 709 may map items that are of particular note to the operator or other user. For instance, the flag maps may be maps of the location of rocks or other obstacles, drain tile inlets, or other locations that should be flagged for particular attention. The prior operation maps 701 can include other maps 711 that are generated during prior operations through the field as well.

Additional data sets 498 can also include intercropped data 433 which may show maps where multiple crops in a field were planted, estimated yield for the individual crops, the nitrogen and/or carbon and/or other chemical credits for the individual crops, the per-plant yield or other per-plant characteristics for the intercropped field, the tillage effect, forage biomass, or other information for the intercropped field, or any of a wide variety of other data for an intercropped field.

Additional datasets 498 can also include a wide variety of other data 588. The other data 588 can include machine level data 589 (which can be such things as tire pressure, machine mass or weight, tank fill level(s), etc.), other chemical (or applied material/or operation) application locations and rates 590, residue coverage percent 592 which indicates the percent of a particular geographic area that is covered by residue, and soil temperature data 594. The other data 588 can also include residue/seed impact, shoot blockage data 531. Data 531 may be a metric or other indication of how the residue at a particular geographic location may affect seed development. For instance, if the residue is heavy, it may affect the ground temperature or the ground moisture, it may physically block emergence of shoots or plants, or it may impact the seed development in other ways as well. Data 531 can be data that is geographically referenced to a field and it may include one or more different indicators that indicate the impact of residue on a seed. Other data 588 can also include one or more composite agricultural scores 532. Some examples of how to generate composite agricultural scores 532 is discussed elsewhere herein and any of a wide variety of other georeferenced data 596.

Figure 12:
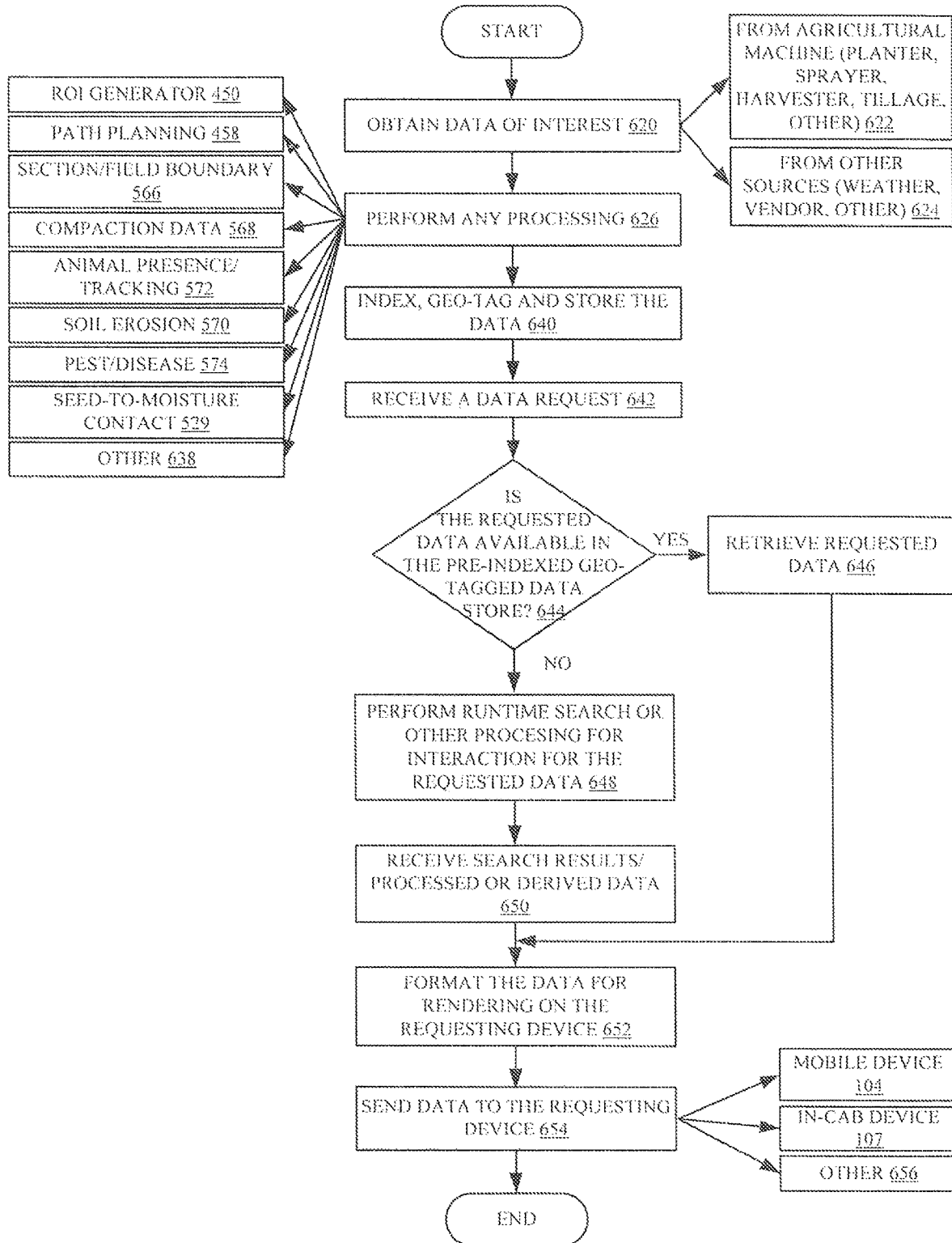
FIG. 12 is a flow diagram illustrating one example of the operation of the system shown in FIG. 1.

FIG. 12 is a flow diagram illustrating one example of the operation of agricultural system 100 in generating geotagged data, receiving a data request or other data of interest from mobile device 104 or agricultural machine 103, or another requesting device, and providing responsive data, that is responsive to the request, or that is otherwise based upon the received data. It is first assumed that hosted agricultural data service 112 obtains data of interest to the service, as indicated by block 620 in the flow diagram of FIG. 12. The data of interest can be obtained, as discussed elsewhere, from a wide variety of sources. For instance, the data can be obtained from sensors 111 on agricultural machine 103, which may be a planter, a sprayer, a harvester, a tillage implement or other tillage equipment, a scouting robot, or a wide variety of other machines, as indicated by block 622. The data can be obtained from other sources, such as weather or vendor sources, or other data sources or services as well, as indicated by block 624.

Hosted agricultural data service 112 can then perform any desired processing on the data, as indicated by block 626. The processing can be performed by processed/derived data generation system 139 or diagnostic/prognosis system 141 or other systems or components. For instance, the data may be processed by ROI generator 450 anomaly identification system 500, soil erosion data generator 452, animal presence/tracking data generator 454, pest/disease data generator 456, seed/moisture contact data generator 501, trench structure data generator 502, composite agricultural score generator 503, residue data generator 504, intercropped data processing system 505, path planning generator 458, or section/field boundary data generator 460, or other data generator 462. The data can be processed to obtain section/field boundary data 566 or compaction data 568. The data can be animal presence/tracking data 572, soil erosion data 570, seed-to-soil contact data 529, or pests/disease data 574. The data can be processed by a wide variety of other components and can include other data 638, some of which is shown above in FIGS. 4 and 11 and/or elsewhere herein.

Data generation system 139 then pre-indexes and geo-tags the data and stores it in data store 138, as indicated by block 640 in the flow diagram of FIG. 12.

At some point, hosted agricultural data service 112 will receive a data request from a requesting device, such as mobile device 104, display device 107, another component of agricultural machine 103, etc. The data request may be a request for data that can be displayed, or it may include an image that is to be identified or otherwise processed wherein the processed data is to be sent back to the requesting device. Receiving a data request is indicated by block 642 in the flow diagram of FIG. 12.

Application server 136 receives the request and determines whether the requested data is already in pre-indexed, geo-tagged data store 138, as indicated by block 644. If so, the data is retrieved, as indicated by block 646 so that it can be formatted and sent to the requesting device. If the requested data is not already in data store 138, but needs to be obtained from another source, then runtime search component 132 generates a search request and performs a runtime search to obtain the data from another source. Processed/derived data generation system 139 can also perform additional processing to obtain the requested data as well. Further, diagnostic/prognosis system 141 can perform other processing and generate diagnostic and/or prognosis data as well. Performing a runtime search or other processing or interaction to obtain the requested data is indicated by block 648 in the flow diagram of FIG. 12. Application server 136 receives the responsive data (search results or processed or derived data) as indicated by block 650 and formats that data for rendering on the requesting device, as indicated by block 652. Application server 136 then sends the data to the requesting device, as indicated by block 654. The requesting device may be mobile device 104, an in-cab display device 107, or any of a wide variety of other devices 656.

Figure 13:
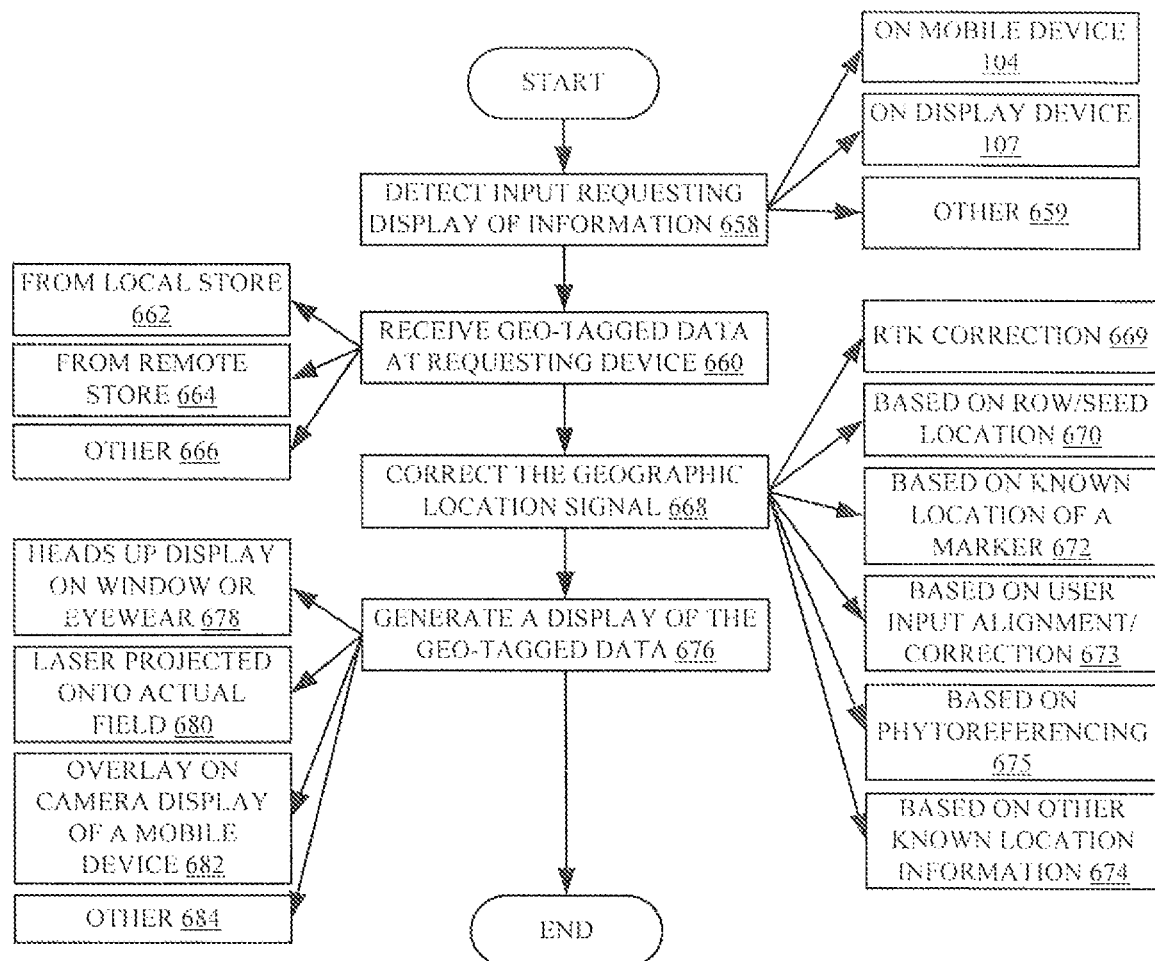
FIG. 13 is a flow diagram showing one example of receiving and displaying data.

FIG. 13 is a flow diagram illustrating one example of how the requesting device processes data, requested by an operator and received from application server 136, or in another example, obtained from a local data store that is local to the requesting device. It is first assumed that the requesting device detects an operator input requesting display of information, as indicated by block 658 in the flow diagram of FIG. 13. The input can be a touch gesture, a menu driven input, or speech input, or another input on a device, requesting display of data. In one example, the data that is requested is geo-tagged data so that it can be displayed over terrain, for viewing by an operator. The requesting device (which can be display device 107, mobile device 104, etc.) or another device 659 then receives the geo-tagged data as indicated by block 660. The geo-tagged data can be obtained from a local data store, as indicated by block 662, or from a remote store, such as from hosted agricultural service 112, as indicated by block 664, or in another way, as indicated by block 666.

In one example, the display generator uses geographic correction system 491 (on display device 107) or position correction system 167 (on mobile device 104) to correct the geographic information identifying the location of the display device. For instance, where the display device is mobile device 104, then the geographic location of that device may be identified using a relatively imprecise GPS receiver or other location system. That imprecise location can be corrected using other, higher accuracy data, such as RTK data. Correcting the geographic location signals is indicated by block 668 in the flow diagram of FIG. 13 and using RTK data is indicated by block 669. The higher accuracy location data may be, for instance, based on row or seed location where that location was generated during planting or at another time by a higher accuracy positioning system. Correcting the geographic location signal of the display device based on higher accuracy row/seed location information is indicated by block 670 in the flow diagram of FIG. 13. The correction may be based upon a known location of a marker that is already in the field, as indicated by block 670. The correction may be based on a user correction or alignment inputs as indicated by block 673. For instance, a field boundary may be overlayed on a display of a field boundary. However, the overlayed boundary may be misaligned with the actual field boundary. The operator may then drag the overlayed boundary so that it aligns on the display with the actual field boundary. Based on the re-alignment input by the operator, the correction system 491 or 167 can determine the magnitude and direction of the misalignment and use that information to correct the location of other displayed items as well. The correction can be based on other known location information, as indicated by block 674. Further, the position correction can be performed using phytoreferencing in which, during planting a controller controls a device to vary an attribute of a plurality of individual plants (such as plant spacing, plant location—e.g., a distance by which seeds are laterally offset from a row, etc.) so as to form a pattern of location correction information or other information.

The requesting device then generates a display of the geo-tagged data, as indicated by block 676. Heads up display generator 490 may generate a heads up display on a window or eyewear as indicated by block 678. Data projection generator 494 may generate a laser projected image (or projection generated in another way) onto the actual field, or another projection, as indicated by block 680. Mobile device display generator 492 may generate an overlay on a camera viewer of the mobile device 104, as indicated by block 682. The geo-tagged data can be displayed in other ways as well, as indicated by block 684.

Figure 14A:
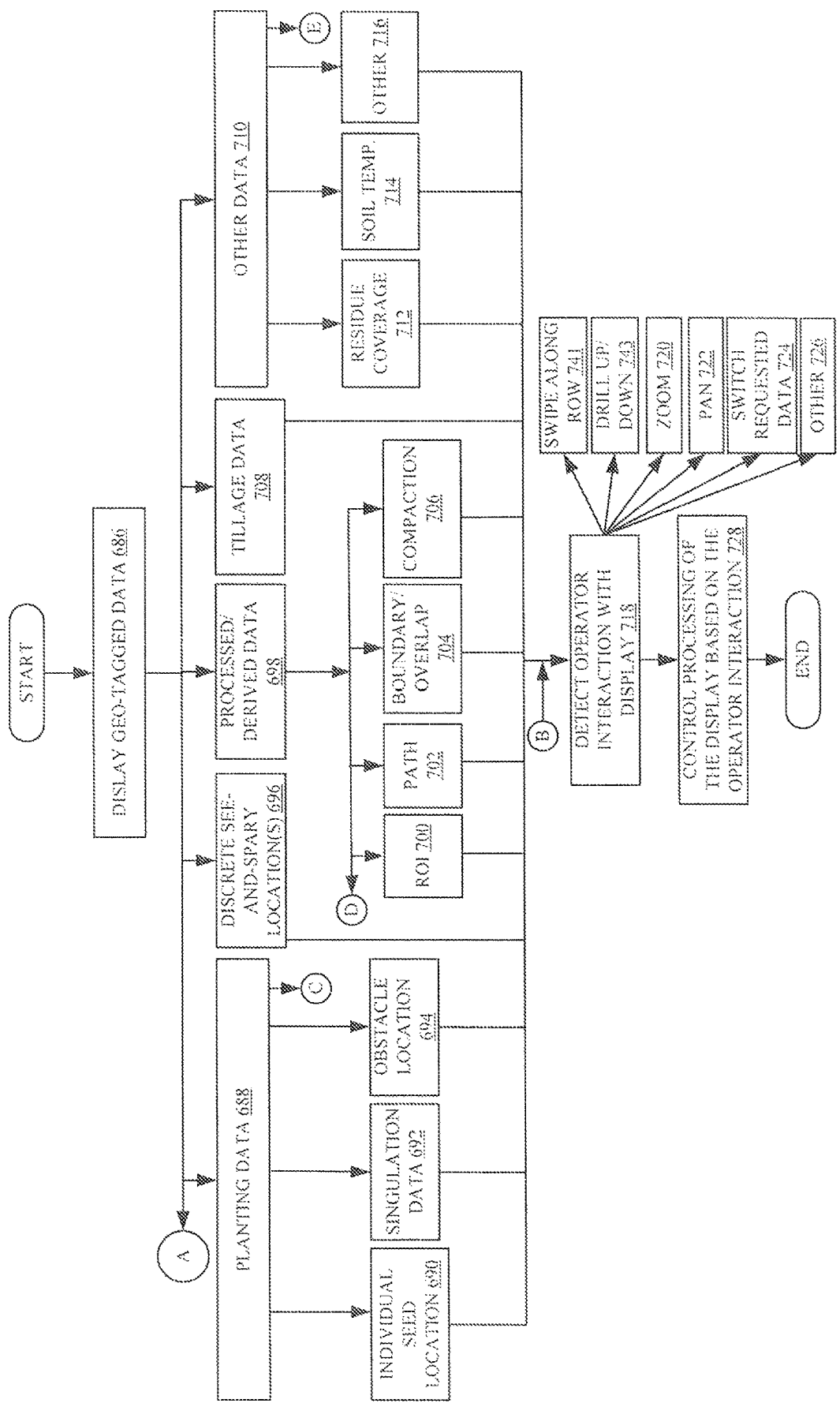
FIGS. 14A and 14B show a flow diagram showing one example of different kinds of data that can be displayed.
Figure 14B:
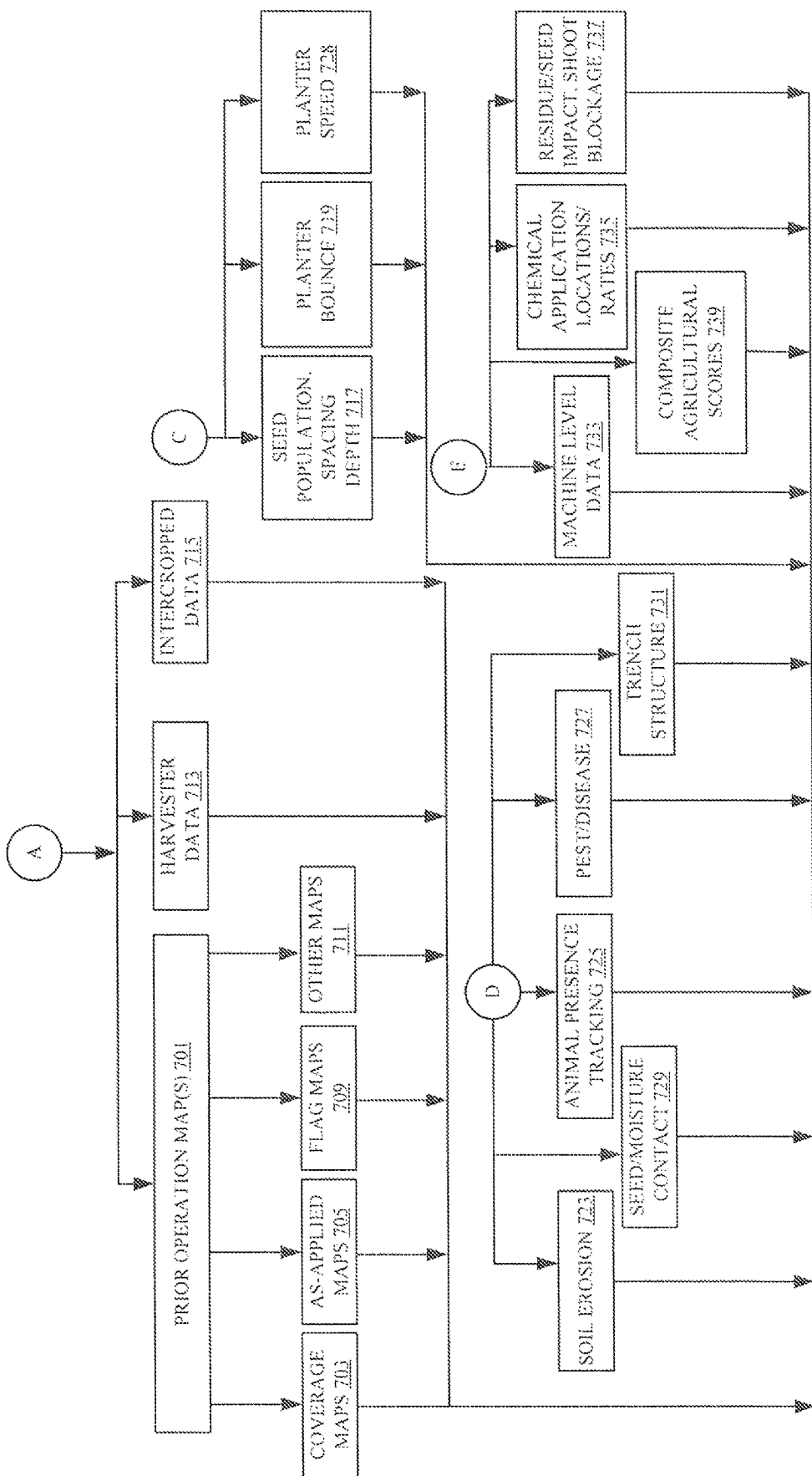

FIGS. 14A and 14B show a flow diagram illustrating, in more detail, different ways that the geo-tagged or georeferenced data may be displayed. The various data and display items shown in FIGS. 14A and 14B can be similar to that shown in FIGS. 4 and 11 above or different. It is numbered differently as an example only. Displaying the geo-tagged data, in general, is indicated by block 686 in the flow diagram of FIG. 14A. The displayed data can be planting data 688. For instance, the individual seed location may be displayed in a geo-referenced way so that, as the operator is viewing the data through some type of viewer (a heads up display device, a camera view finder device, etc.), the individual seed locations are marked over the terrain that the operator is viewing. Displaying the individual seed location is indicated by block 690.

Instead of the individual seed location, or in addition to that location, singulation data may be displayed indicating locations of doubles or skips that were encountered during the seeding process. Displaying singulation data is indicated by block 692.

Obstacle location data can be displayed to indicate the geographic location where an obstacle was encountered by the planter, as indicated by block 694. Other planting data can be displayed in a georeferenced fashion as well.

The planting data 688 can also include machine level data 733, chemical application locations and rates 735, residue/seed impact, shoot blockage information 737, and composite agricultural score 739. Some examples of these are described in greater detail above with respect to FIG. 11.

In another example, see and spray vehicles identify weeds or pests or disease or other indicia that indicate that a chemical should be sprayed, as the vehicle is traveling through the field, and then sprays the identified weeds, pests, disease, or other locations. The specific location where the chemical was sprayed or otherwise administered (the discrete see and spray locations) is logged, and the discrete see and spray locations can be displayed in a georeferenced way, as indicated by block 696.

In another example, the georeferenced data that is displayed in a georeferenced manner can be processed or derived data generated by processed/derived data generation system 139, as indicated by block 698 in the flow diagram of FIG. 14A. The processed data can be ROI data 700, path data 702, boundary/planting overlap data 704, compaction data 706, or a wide variety of other processed or derived data 698. The process/drive data 698 can also, as shown in FIG. 14B, include data indicative of soil erosion 723, data indicative of animal presence or tracking 725, data indicative of pests or disease 727, data indicative of seed-to-moisture contact 729 and data indicative of trench structure 731. In another example, the displayed georeferenced data can be tillage data 708.

The georeferenced data that can be displayed in a georeferenced fashion can be any of a wide variety of other data 710, such as residue coverage data 712, soil temperature data 714, or other data 716. The other data 710 can include machine level data 733, chemical application locations and rates 735, residue/seed impact, shoot blockage data 737, and composite agricultural scores 739.

In some examples, the display can be generated in an interactive way so that the operator can interact with the display. For instance, the display may be generated with user actuatable mechanisms, such as links, buttons, icons, or other mechanisms. Those mechanisms can be actuated by the operator to interact with the display. Detecting operator interaction with the display is indicated by block 718 in the flow diagram of FIG. 14A. Some interactions include a swipe touch input 141 in which the operator swipes along a displayed row of crop. The interaction can include a drill up/down interaction 743 in which the operator provides an interaction to drill down to show additional detailed information or an interaction to drill up to show less detailed (more general) information. FIG. 14A, the operator interactions also include a zoom interaction 720 to zoom the view of information in or out, respectively. Another interaction may be a pan interaction 722 where the view can be panned in a side-to-side or up and down fashion. In yet another example, the interaction may be to display a menu or other selector. The operator can actuate one of the input mechanisms to switch the requested data that is georeferenced and displayed on the georeferenced display. For instance, the operator may elect to switch from displaying georeferenced seed location to displaying georeferenced downforce. The operator may elect to aggregate the display to show both downforce and seed location, or to switch the requested data in other ways. Detecting an operator interaction to switch the requested data is indicated by block 724 in FIG. 14A. Other interactions can be detected as well, as indicated by block 726.

The display is then processed by the display generator based upon the detected operator interaction, as indicated by block 728. By way of example, the display generator can switch the display to show a display based on a swipe input, drilled up/down information, a zoomed in or zoomed out version, a panned version, different data, etc.

Figure 15:
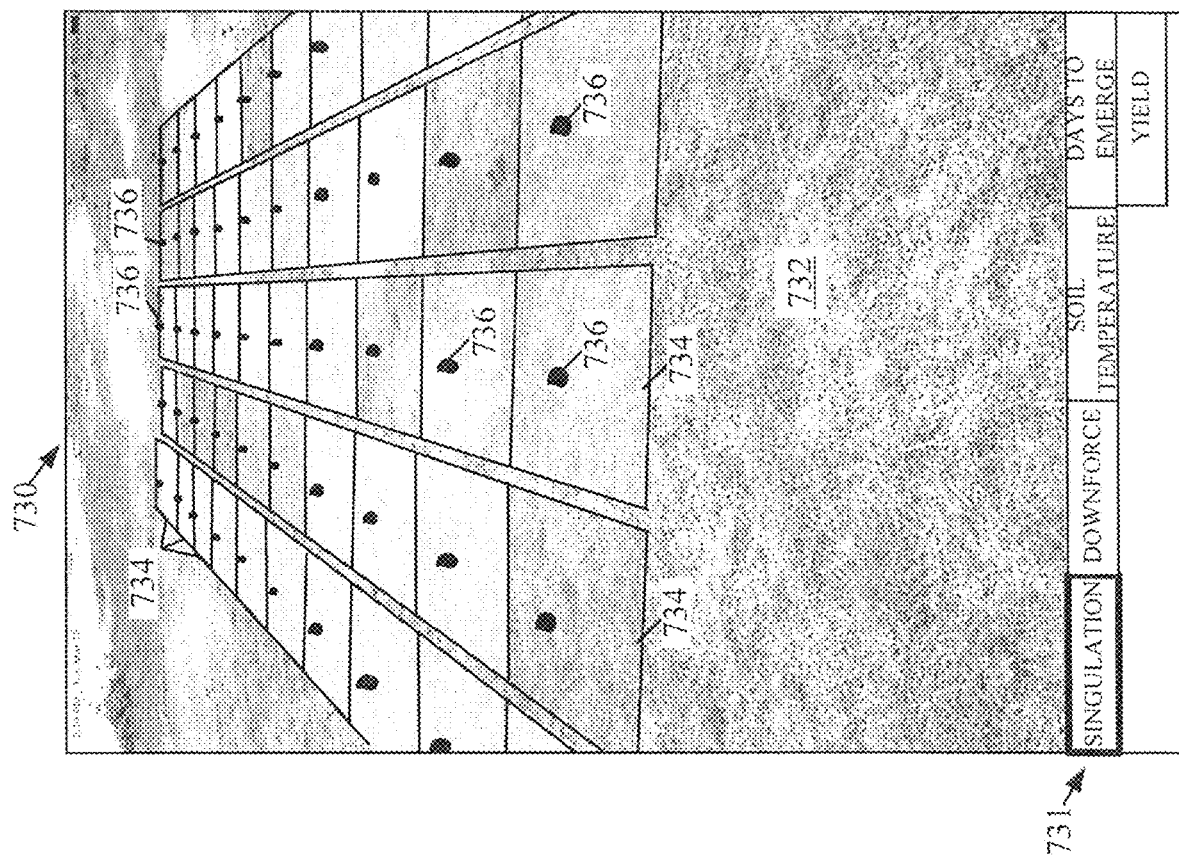
FIGS. 15-24 show examples of displays.

FIGS. 15-24 show different examples of georeferenced, augmented reality (or enhanced) displays that can be generated for an operator on a display device, such as on a mobile device 104 or another display device 107. FIG. 15 shows an enhanced display 730 that shows terrain 732 with a plurality of different grid segments 734. Each grid segment 734 may be color coded or shaded, or otherwise visually distinguishable from other grid segments 734 to identify a particular metric represented by the grid section. FIG. 15 also shows a set of actuators shown generally at 731 that can be actuated by the user in order to choose the metric that will be represented by the various grid segments 734. For example, in FIG. 15 the actuator labeled "singulation" has been actuated so that the grid sections represent singulation data indicating whether skips, doubles, or singles have been planted in those grid segments. The other actuators 731 include "downforce", "soil temperature", "days to emergence", and "yield". The actuators 731 shown in FIG. 15 are only examples and other metrics or data can be represented by the actuators so that when an actuator is actuated, the corresponding data can be displayed as augmented reality data on display 730.

In the example shown in FIG. 15, the display 730 also shows a plurality of individual seed locations 736. The segments 734 represent singulation data. Therefore, display 730 is displaying a singulation metric as well as the individual seed locations on the terrain 732 being shown on the display. Different shades or other visual indicia of the segment 734 may indicate whether the singulation events occurred and whether those events are skips, doubles, etc. Of course, singulation data is just one example of the metric that may be georeferenced and displayed, and many others may be displayed as well.

Figure 16:
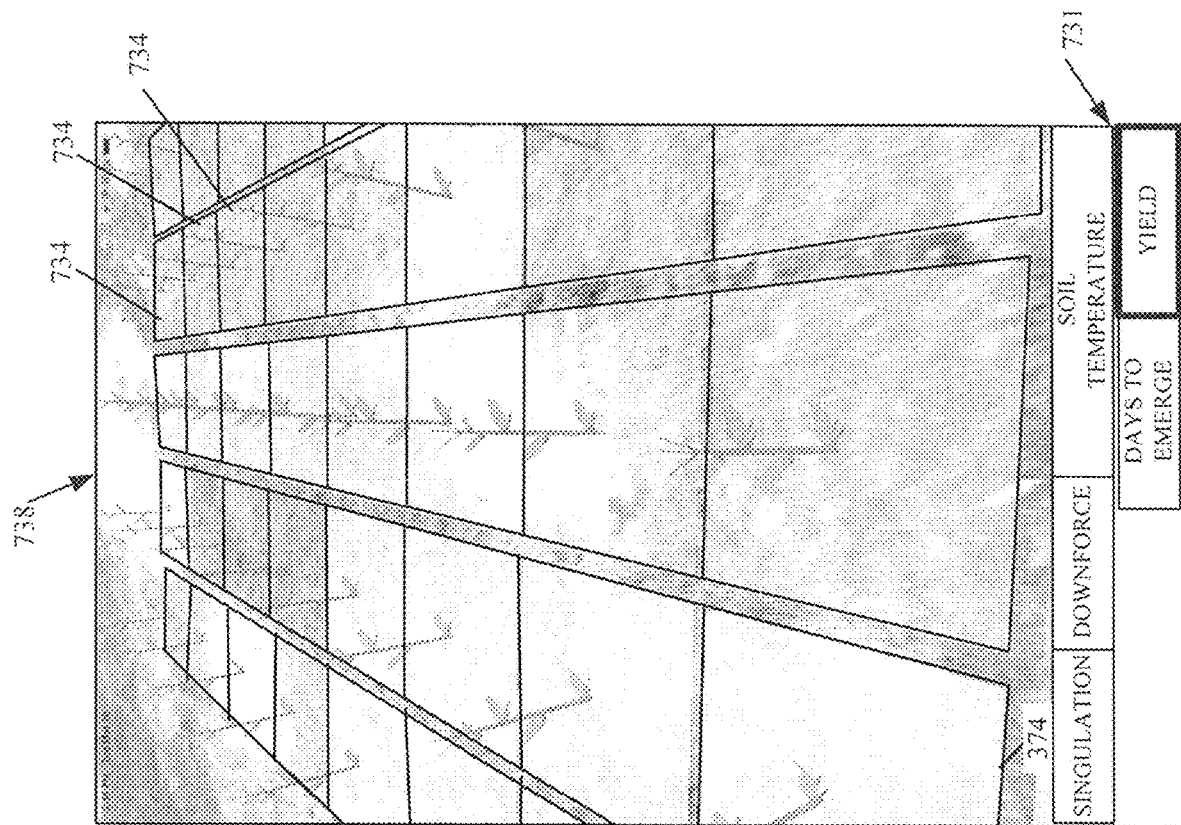

FIG. 16 is an enhanced display similar to FIG. 15, and similar items are similarly numbered. In FIG. 16, the actuator 731 that has been selected by the operator is the "yield" actuator so that the grid segments 734 shown in FIG. 16 represent yield values corresponding to those grid segments. Thus, the display 738 shows that the augmented reality tiles represent a per-plant metric in which the per-plant metric is a per-plant yield metric. Unlike FIG. 15, in the example shown in FIG. 16, the grid segments 734 are displayed relative to already emerged plants which are shown in display 738. Thus, the grid segments may represent yield expected at the locations of the grid segments, soil temperature, downforce, planting depth, or metrics or different combinations of different metrics.

Figure 17:
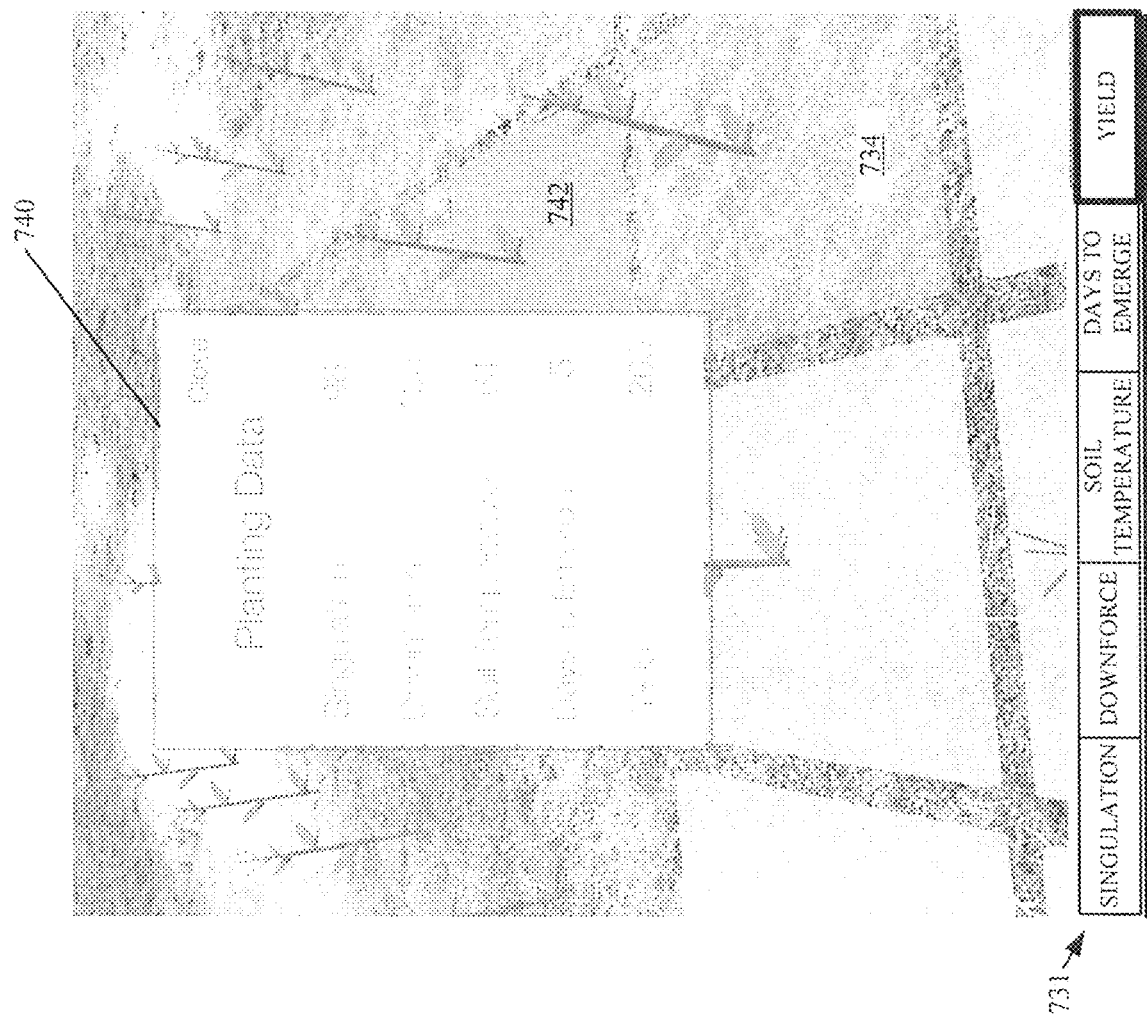

FIG. 17 shows an example of an enhanced display that is similar to FIG. 16 and similar items are similarly numbered. In FIG. 17, the user has actuated the "yield" actuator but has also provided a drilldown input requesting more detailed information be shown so that data display 740 be shown to display the values for all of the metrics (singulation, downforce, soil temperature, days of emergence, and yield) corresponding to a selected grid section 742. Therefore, each grid section 734 is visually used to display the yield metric corresponding to that grid section, and the data display 740 shows values for a particular, selected grid section 742. Also, FIG. 17 shows that the view has been zoomed in.

Figure 18:
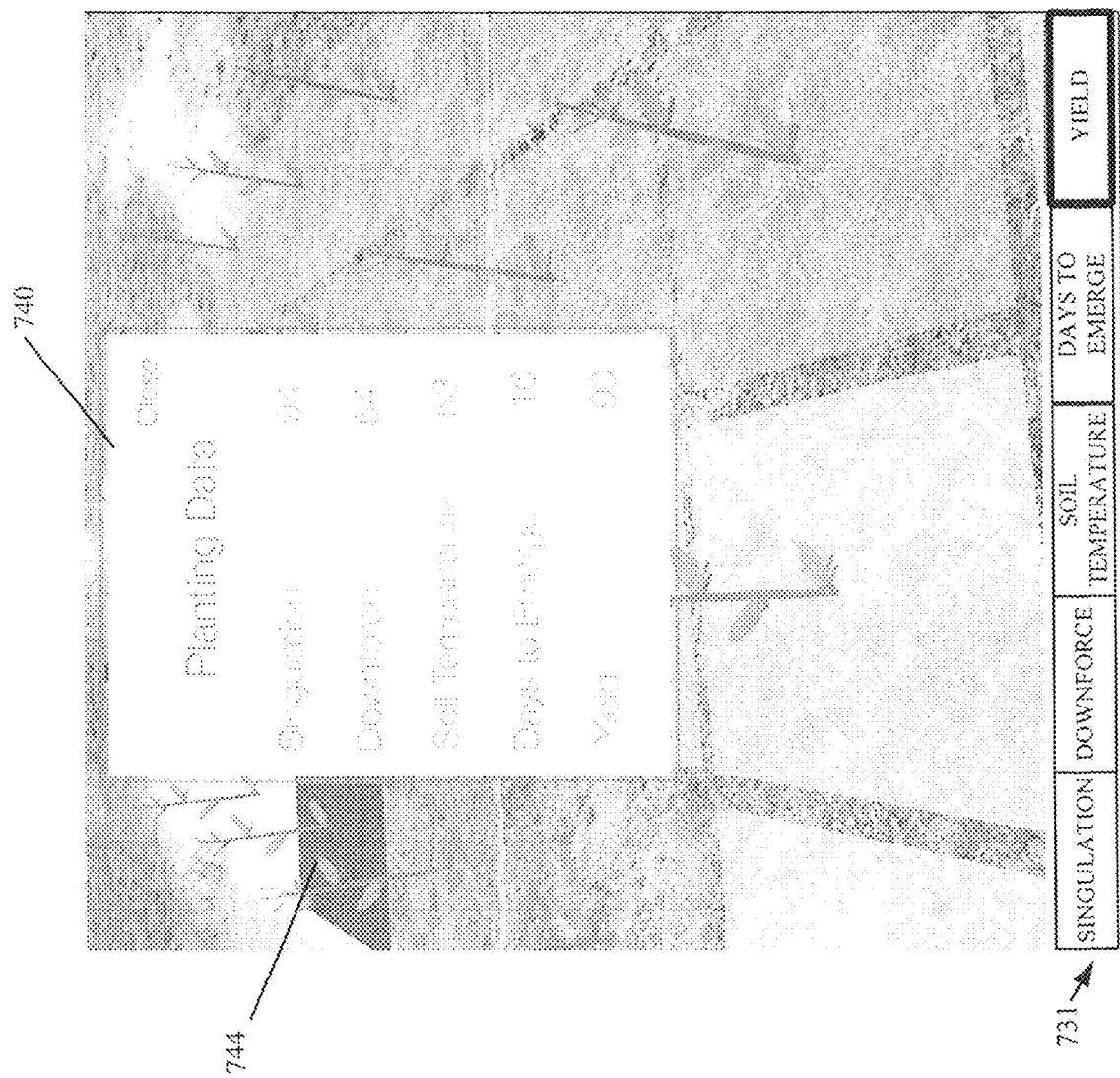

FIG. 18 is an enhanced display similar to FIG. 17 and similar items are similarly numbered. However, in FIG. 18, grid segment 744 has been selected by the operator (through a user interaction such as tapping the grid segment 744, clicking on it, or other interactions) so the values in data display 740 are updated to show the values corresponding to grid segment 744.

Figure 19:
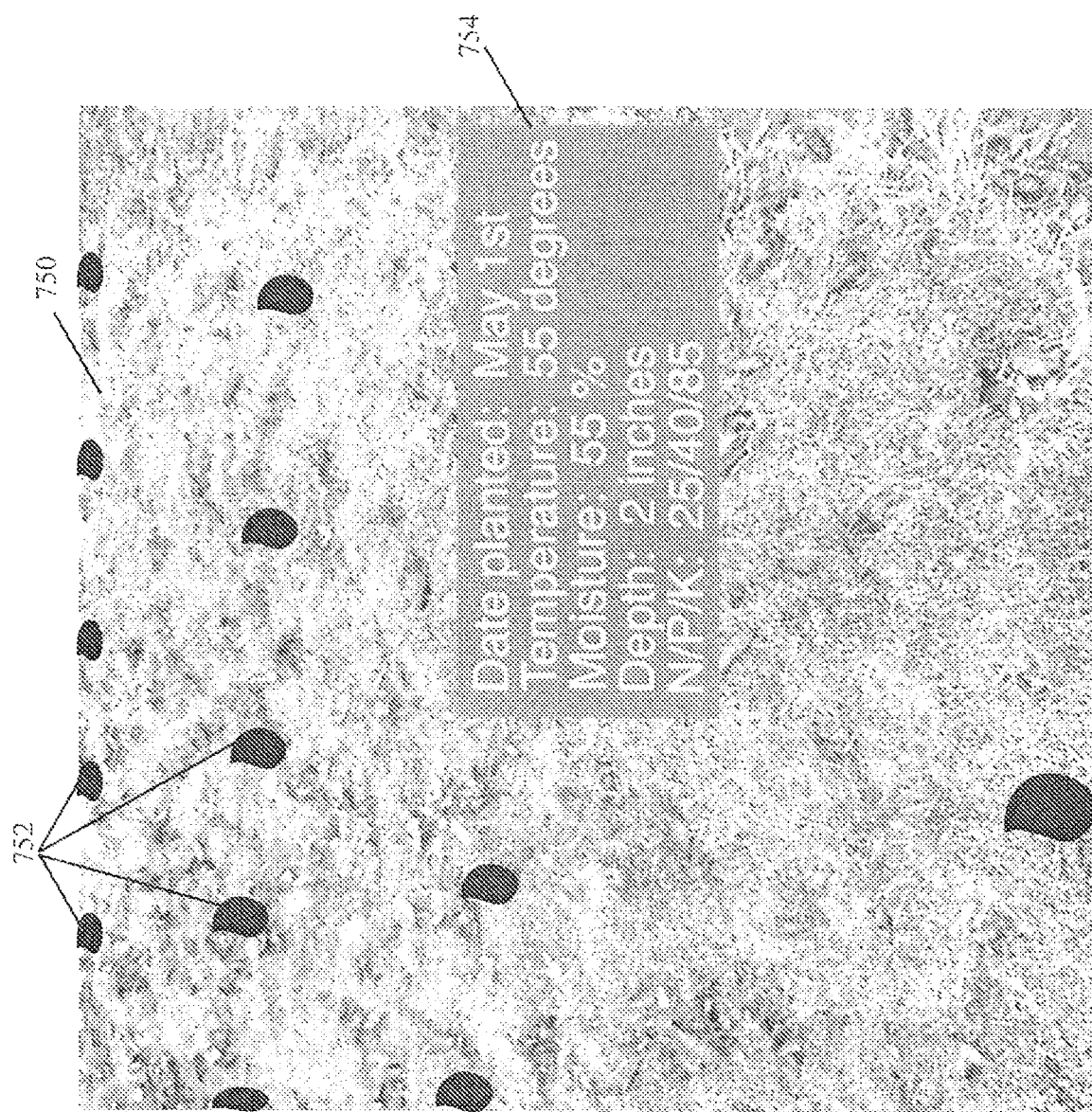
Figure 20:
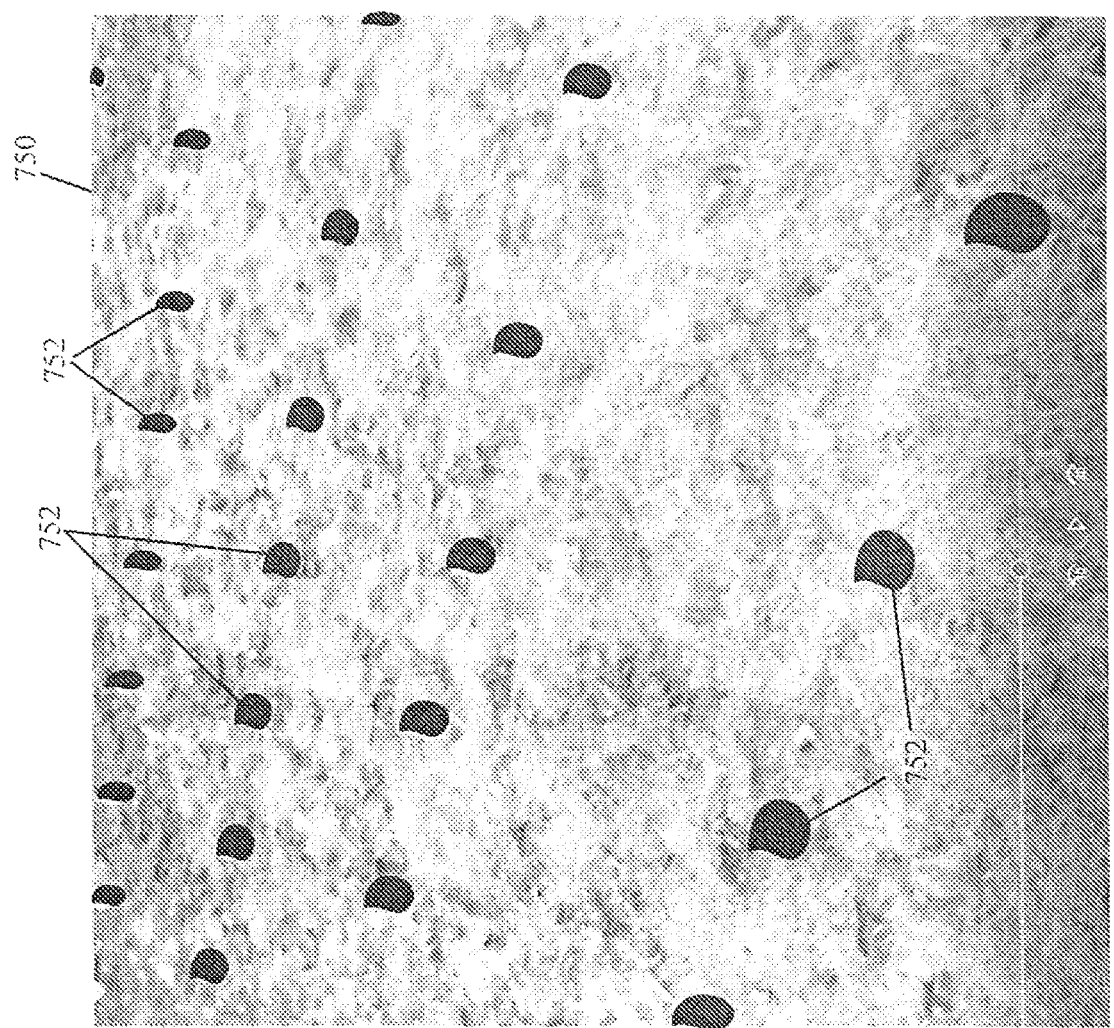

FIG. 19 shows another enhanced display 750 that displays georeferenced information in a different way Enhanced display 750 displays the individual seed locations 752 as well as an information display 754 that shows planting information, such as the data planted, the temperature when planted, the soil moisture level, the planting depth, and the fertilizer composition that was used during planting. FIG. 20 is an enhanced display similar to FIG. 19, except that FIG. 20 shows a wider view (zoomed out) and the data display 754 has been removed.

Figure 21:
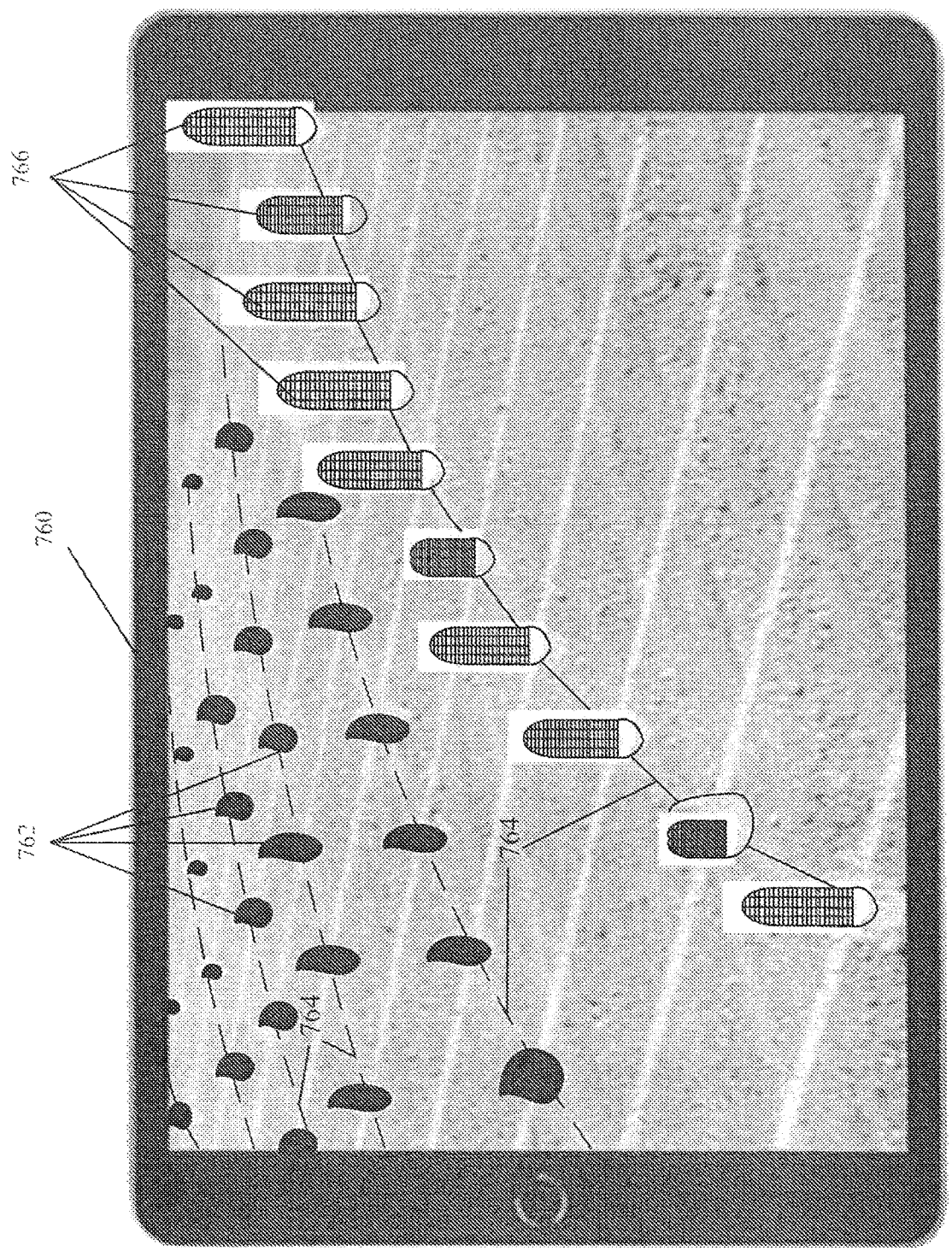

FIG. 21 shows an enhanced display 760 in which individual rows of seeds 762 are shown and all rows are indicated by alignment projections 764. The graphical display elements 766 are displayed in an augmented reality display, over the top of seeds in the rows. The graphical display elements 766 identify, visually, the per-plant projected yield for the seeds over which they are displayed. The projected yield can be based on a wide variety of criteria, such as seed-to-moisture contact, moisture availability, trench structure (which may include seed-to-soil contact, compaction, etc.), residue coverage that may impact soil temperature or shoot blockage, the quality of as planted fertilizer and pesticide application, planter bounce, planter speed, or other items.

As can be seen, the height and/or color of the graphical display element 766 (or visual characteristics or visual indicia) can be proportional to or otherwise correlated to a plant metric, such as plant height, plant vigor (e.g., an NDVI value corresponding to the plant), estimated per-plant yield, etc.

Figure 22:
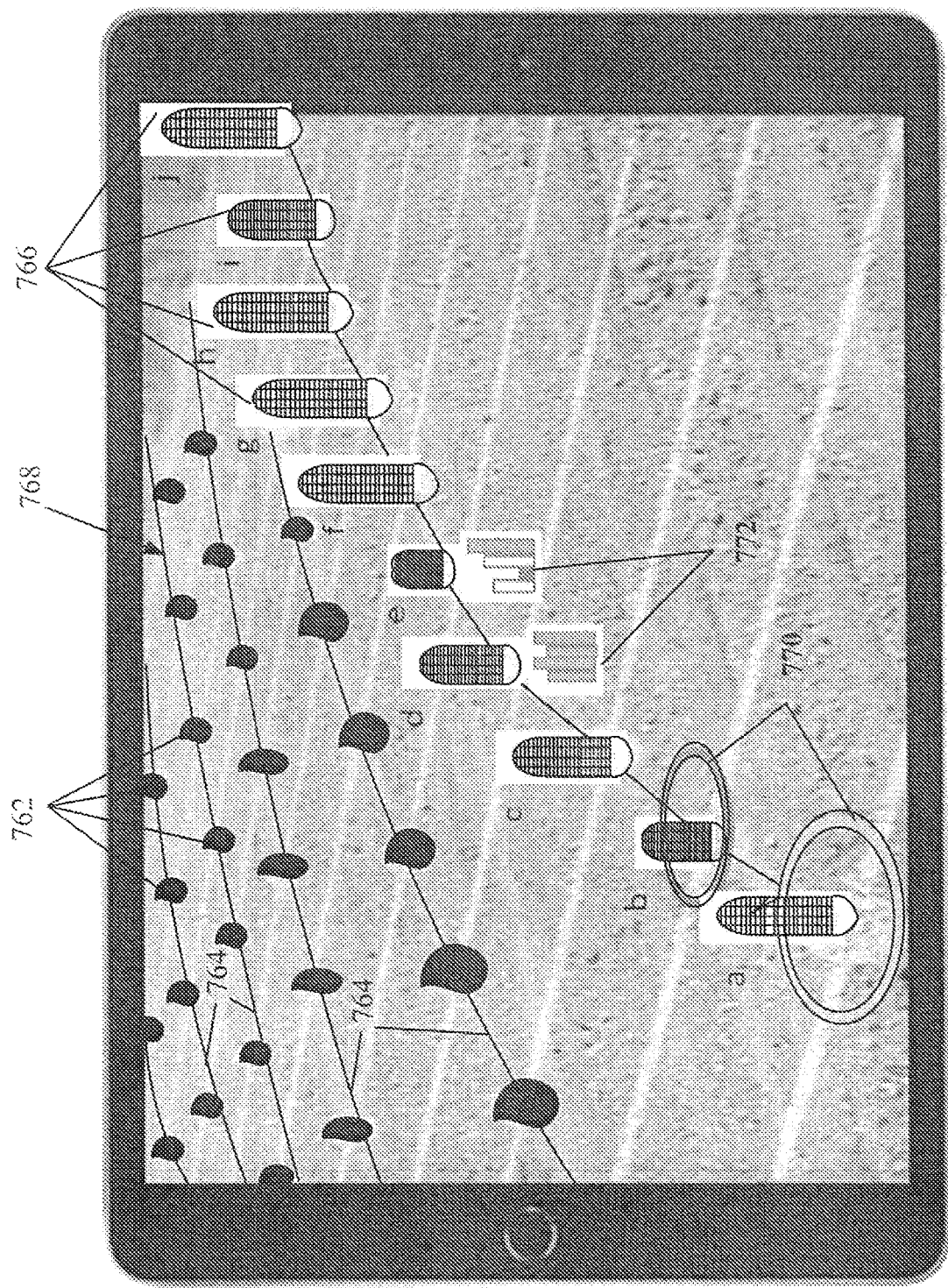

FIG. 22 is another example of an enhanced display 768, which is similar to the enhanced display 760 shown in FIG. 21, and similar items are similarly numbered. However, enhanced display 768 has additional augmented reality display elements, in addition to those shown in FIG. 21. For instance, each of the display elements 766 has an associated lowercase letter a-j. The display elements 766 may also have corresponding circles 770. The circles may represent the per-plant yield or other data, such as a composite planting score. The differences in the values represented by display element 766 and circles 770 may be visually depicted using shape, color, size, pattern, flashing indicia, intensity, or other visual indicia. FIG. 22 also shows that some of the display elements 766 have graph (e.g., bar graph) display elements 772 that may show a plurality of different parameters based on the height and color of the bars in each of the graphs 772. Other visual attributes, such as those listed above or others, can be used in display elements 772 to depict different values. Further, the display elements 772 may, in addition to bar graphs, be line graphs, pie charts, spider diagrams, tables, text, animated display elements, and other display elements. The augmentation can be shown in three-dimensions or two-dimensions or otherwise. Some information may also be communicated using speech synthesis or other elements.

It should be noted that the augmentation or enhancement of the display can be sequenced in a variety of different ways as well. For instance, the display mechanism can sequence the different augmentations automatically, or through menu interaction, or through speech interaction, or in other ways. In addition, in one example, only some of the augmented display elements are sequenced while others remain constant. For instance, the example shown in FIG. 22, all of the display elements may remain constant except the display elements 772, which may be replaced with other display elements that represent other variables, according to a desired sequence. The sequence through which the display elements are displayed may be a predefined sequence or a sequence that is selected by the user.

Also, agricultural machine 103 and/or mobile device 104 or hosted agricultural data service 112 may have speech processing functionality so that speech inputs can be received from a user or operator and used to control agricultural system 100. The speech processing functionality may include both speech recognition functionality and speech synthesis functionality so that speech commands can be received and processed, and the results of the processing can be output using spoken language.

Figure 23:
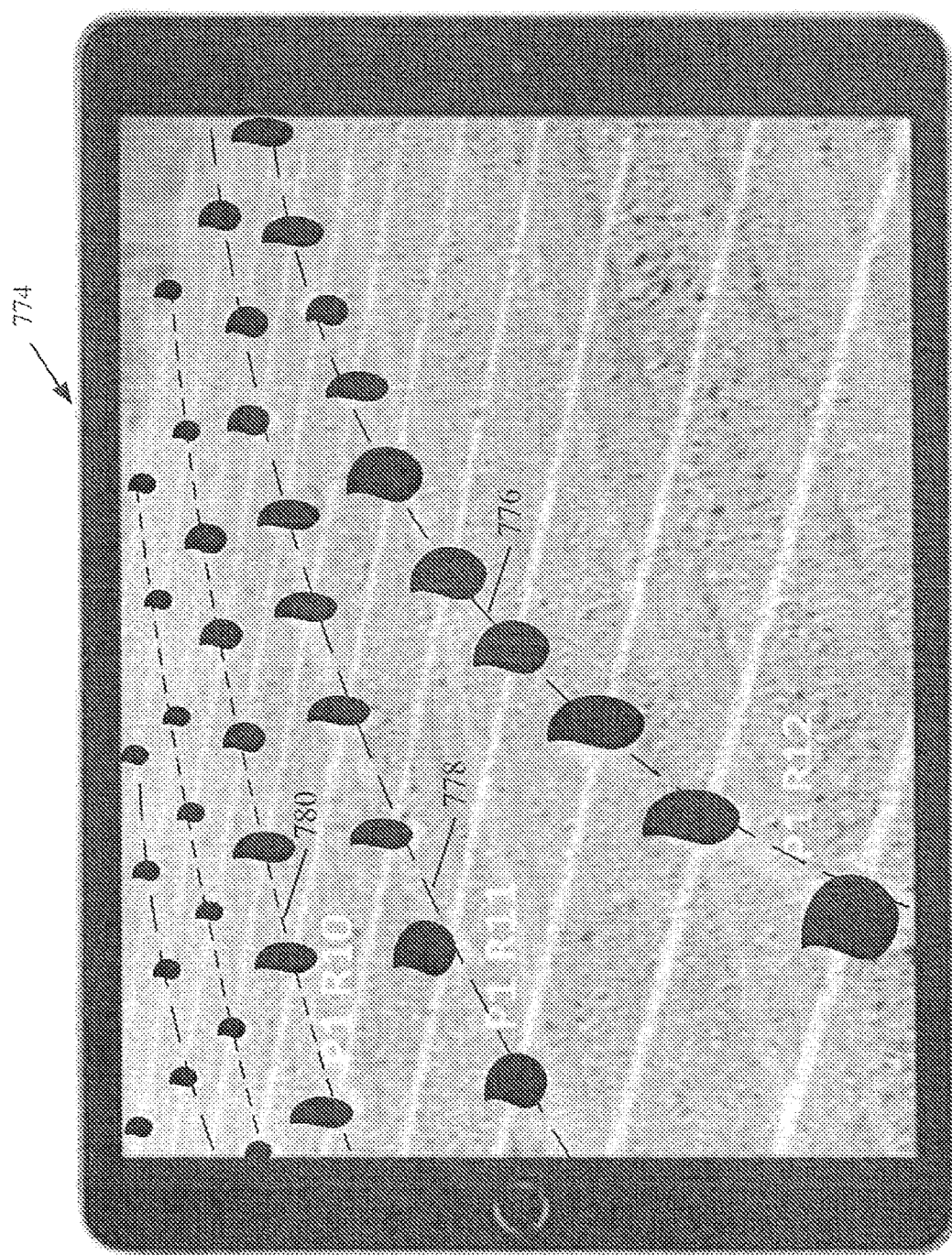

As an example of speech interaction with a system, it is assumed that mobile device 104 has speech processing functionality. FIG. 23 shows an enhanced display 774 in which individual seed locations are shown and the row and pass numbers corresponding to the individual seed locations are shown as well. For instance, in rows 776, 778, and 780 in FIG. 23, the seeds in each of those rows were planted during a particular pass (pass 1 represented by P1) with a 12-row planter. Therefore, the rows 776, 778, and 780 are represented by P1, R12; P1, R11; and P1, R10, respectively. Row 776 is thus the 12$^{th}$ row in pass 1 for a planter. Row 778 is the 11$^{th}$ row in pass 1, and row 780 is the 10$^{th}$ row in pass 1. One example of a speech interaction may be as follows (assuming that the word "Jonny" is a wakeup work for the speech processing functionality so that when the speech processing functionality hears an operator utter that word, the speech processing functionality begins listening for speech commands that are to be performed. Thus, the speech interaction may be as follows:

Operator: "Jonny, show predicted per-plant yield for pass 1, row 12."

The speech recognition system identifies the command and generates an output identifying a particular display that is to be displayed on the mobile device. The display may correspond to the enhanced display 760 shown in FIG. 21. Next, the operator may say "Jonny, show composite planting score for each plant in pass 1, row 12." In that example, the speech recognition system recognizes the command to show the composite planting score and augments the display shown in FIG. 21 to that shown in FIG. 22, for the plants labeled "a". In another example, the composite planting score may be displayed elsewhere in display 774.

Similarly, the user may utter "Jonny, breakdown the composite planting score for pass 1, row 12.". The speech recognition functionality then recognizes the command to break the composite planting score into its individual elements and show a bar graph similar to graphs 772 shown in FIG. 22, adjacent the seeds displayed in pass 1, row 12 in display 774 (in FIG. 23). Each bar in the bar graph may represent the value of a variable used to generate the composite score.

Figure 24:
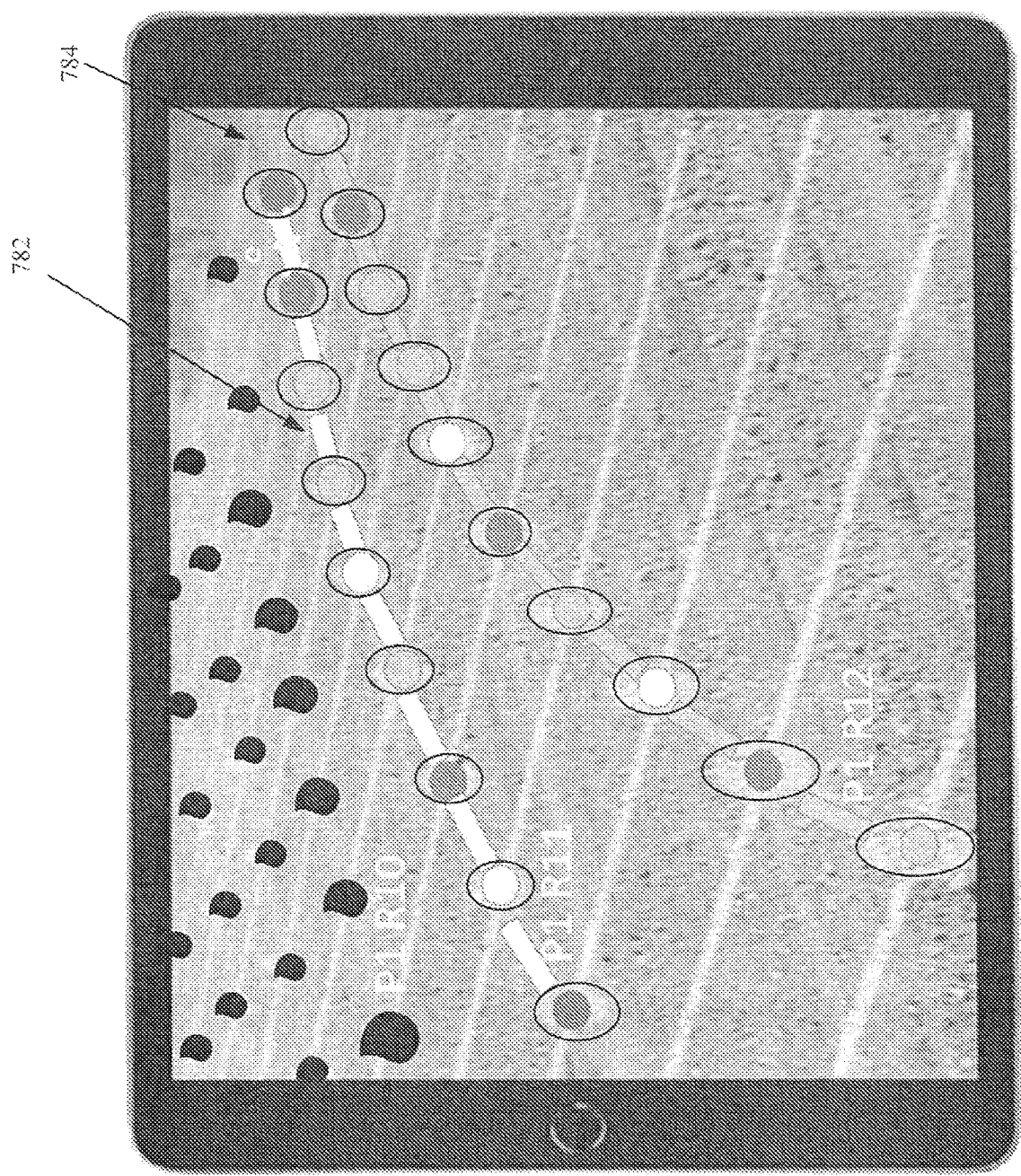

In another example, the mobile applications are touch enabled to recognize touch gestures. By way of example, the user may swipe his or her finger over a set of seed locations. FIG. 24 shows an example of this. It can be seen that the user has swiped his or her finger over two different sets of seeds represented by set 782 and set 784. In such an example, the mobile application 160 may aggregate values corresponding to the seeds in set 782 to obtain an average or other aggregated value. Similarly, the values corresponding to the seeds in set 784 may be aggregated as well to obtain an aggregate value. The seed locations themselves can then be displayed to depict one or more variables, while the aggregated value may be depicted by the color of the line connecting those seed locations (over which the user has swiped). In the example shown in FIG. 24, the dots displayed on the individual seed locations may be colored to show plant locations and to depict per-plant location data (such as planting depth error, the difference between the target depth of a seed and actual sensed depth), with the color bars connecting those individual seed locations being used to depict data for the set of seeds, such as an average value for those plants in the set. In another example, the mobile applications are gesture enabled to recognize finger, hand, or other motions without the need to touch a display or mobile device.

Further, the colors may be selected based on error threshold values. For instance, a color may indicate that a particular value is acceptable, moderate, or unacceptable. By way of example, the color green may indicate an acceptable depth error which may be characterized by a depth error of less than 1 centimeter, while the color yellow indicates a moderate depth error which indicates a depth error between 1 and 2 centimeters, and the color red may indicate an unacceptable depth error indicate that the depth error exceeds 2 centimeters. The thresholds may be default thresholds, preset thresholds, or thresholds that are set by a user.

The combination of per-plant and per-row data may be used by diagnostic/prognosis system 141 in diagnosing planter problems such as, without limitation, unhealth seed meter functioning, unhealthy trash cleaner or opener functioning, unhealthy closing wheel or downforce setting values, excessive planting speed, etc.

Table 1 shows some examples of different information which may comprise, alone or in combination, as a single or multi-element graphic, information which is depicted as an augmented reality display:

TABLE 1

Pesticide type and/or rate
Impact of drift on actual application vs planned/intended chemical distribution
Speed of applicator
Sprayer boom bounce over plant
Sprayer application quality score
Fertilizer type and/or rate
Estimated/measured prior or post operation soil nutrient level
Fertilizer application job quality score
Tillage quality metric
Residue coverage
Tillage tool depth
Tillage tool angle (e.g., disk angle)
Soil attribute, structure, or other soil health metric
Tillage quality score
Plant health metric such as height, NDVI value, other
Crop stage, lodging magnitude, other crop development
Site-specific precipitation, evapotranspiration, other weather
Other In the examples of enhanced or augmented displays shown in the present Figures, tiles displayed around the individual plant locations and other locations are shown as being square tiles. However, the tiles can take other shapes as well, such as circles, hexagons, octagons, or another shape. In some examples, the shape may convey information. For instance, the shapes may convey information that can be understood by a colorblind person who may not necessarily be able to see all different shades of color. Similarly, the shape may identify the particular data that may be aggregated into a metric. For instance, a square shaped tile may indicate that a composite value has been generated using data from four orthogonally located neighboring points (such as four orthogonally located neighboring plants or other locations), while an octagon may indicate that a composite value has been generated using data from eight neighboring points, four being orthogonally located and four being diagonally located relative to the subject point.

Also, while some examples of enhanced or augmented displays herein show that the shapes are centered on the plant locations, in other examples the displayed shapes may be centered on inter-row spaces, on a geographic latitude and longitude grid, etc. In some examples, the shapes may identify where material has been applied to the field. For instance, the shape may be a rectangle covering areas where a ground engaging element, application nozzle, or other machine component was at a particular setting. The two ends of the rectangle may define the start and end of a particular setting. The sides of the rectangle may be defined by a row width or a fraction of the row width, a nozzle spray pattern width, a bed or trench width, estimated root zone width or other soil, plant or machine criteria.

It can thus be seen that the present system allows the farmer to obtain information throughout an entire year that will assist in making the many decisions that need to be made for a successful harvest. In the pre-planting season, the farmer can obtain information that will assist in deciding what crop to plant and in making tillage, fertilizer, harvesting, and other decisions. The information can be displayed on a heads up display or a mobile device. The system can be an image or other data request and receive georeferenced data for display. These are examples only. Thus, the present system reduces the need to perform multiple database access operations in displaying the data on different displays. Instead the data can be overlayed or otherwise displayed in a geo-referenced, augmented reality display. This reduces rendering overhead and network bandwidth. It improves information presentation, completeness, and speed, thus improving the operation of the display device.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

If the implementation comprises multiple processors, the processors may be local or remote or some may be local while others are remote. The processors may share information via wired, wireless, or a mixture of communication systems. The processors may fixedly or dynamically assign portions of computation to processors. Processors may carry out their tasks with varying degrees of human supervision or intervention. Humans may be located at any appropriate processor or communications node of a distributed system. Humans may be physically located on a work machine or at some other location. Example human interaction devices without limitation include screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring. In some examples, processors can include systems-on-a-chip, embedded processors, servers, desktop computers, tablet computers, or cell phones. In some examples, unauthorized monitoring, altering, or substitution of data communications are mitigated. Without limitation, examples may partially or fully implement authentication of nodes sending or receiving data. Authentication systems may include, Physically Unclonable Functions (PUFs), encryption of data sent between nodes, use of a distributed, immutable ledger of data updates (e.g., Blockchain), or other mechanisms or systems or functionality. Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the FIGS. show a number of blocks with functionality ascribed to each block. It will be noted that fewer blocks can be used so the functionality is performed by fewer components. Also, more blocks can be used with the functionality distributed among more components.

It will also be noted that system 100, or portions of it, can be disposed on a wide variety of different devices. Some of those devices include servers, desktop computers, laptop computers, tablet computers, or other mobile devices, such as palm top computers, cell phones, smart phones, wearable computers, multimedia players, personal digital assistants, etc.

Figure 25:
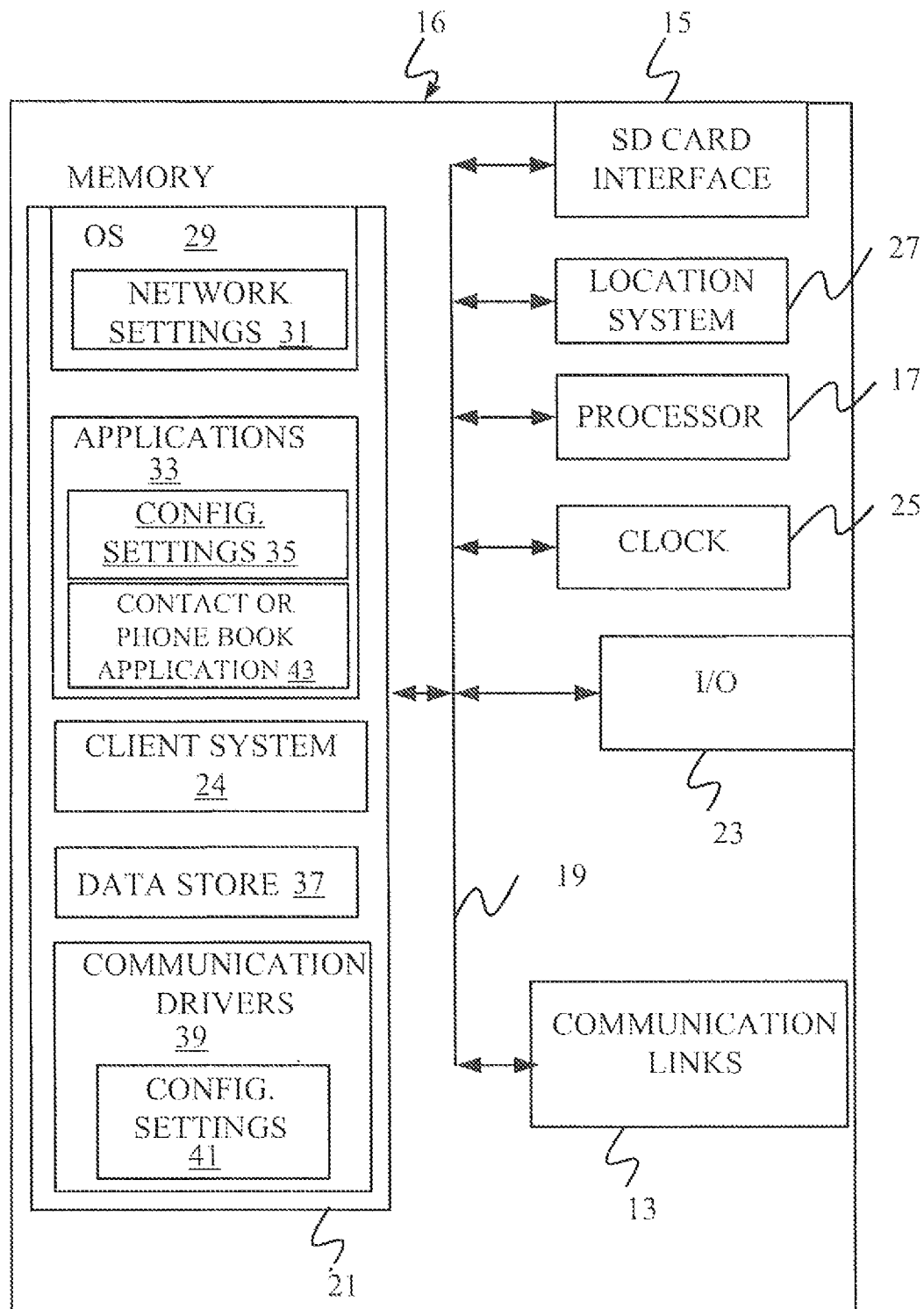
FIGS. 25-27 show various examples of mobile devices.
Figure 26:
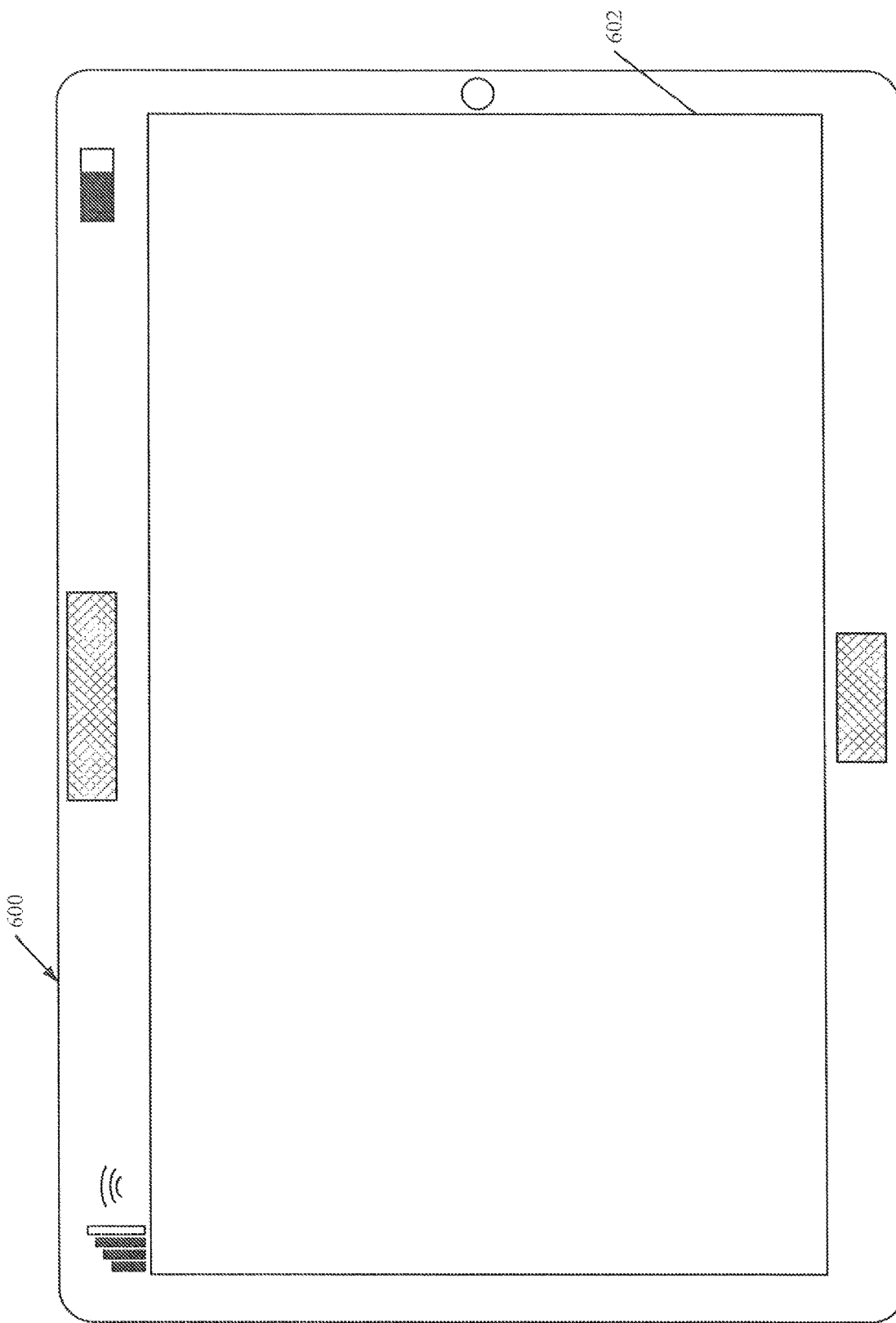
Figure 27:
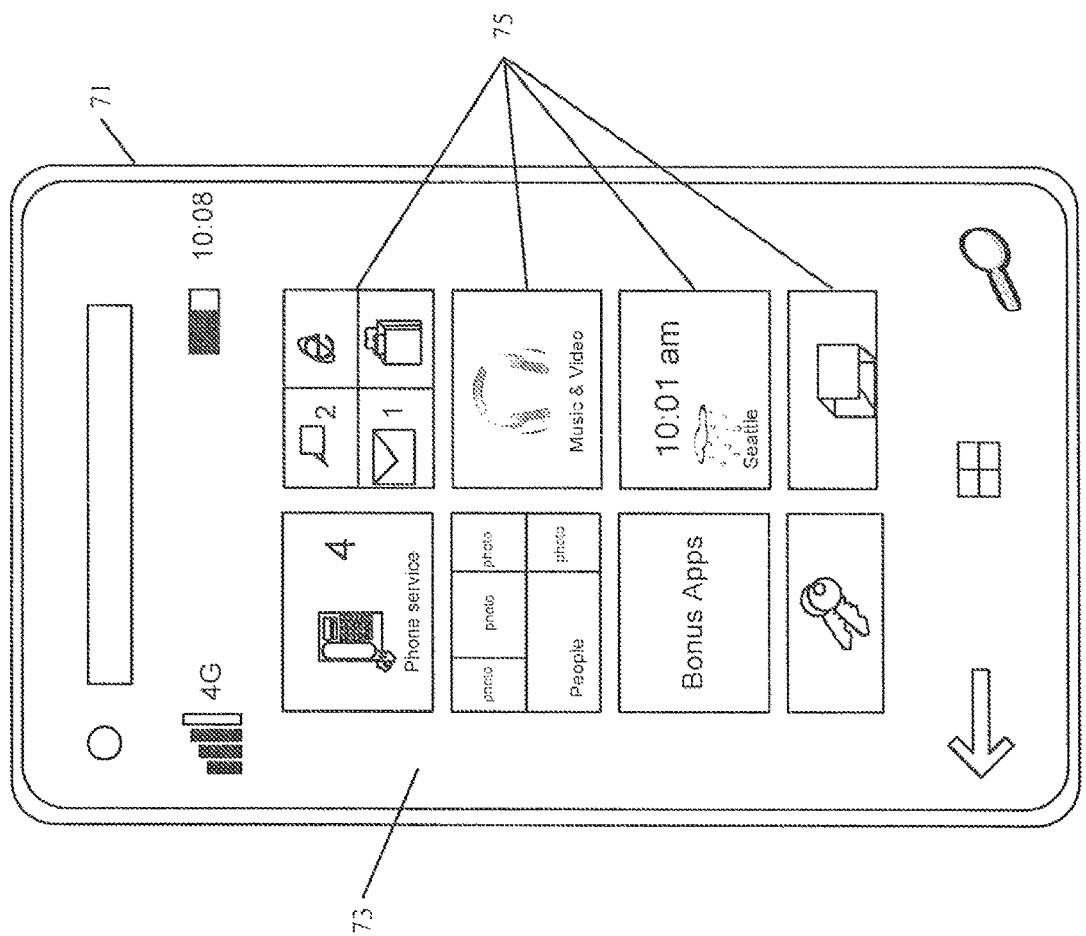

FIG. 25 is a simplified block diagram of one illustrative example of a handheld or mobile computing device 16 that can be used as a user's or client's mobile device 104, in which the present system (or parts of it) can be deployed. It should be noted that device 16 can be hand held, mounted in a cab of a piece of agricultural equipment, or in other places as well. It can be a relatively small device (when it is hand held, for instance) or larger (when it is mounted in a cab, for instance) FIGS. 26-27 are examples of handheld or mobile devices.

FIG. 25 provides a general block diagram of the components of a client device 16 that can run components of system 100 or that interacts with system 100, or both. In the device 16, a communications link 13 is provided that allows the handheld device to communicate with other computing devices and in some examples provides a channel for receiving information automatically, such as by scanning Examples of communications link 13 include an infrared port, a serial/USB port, a cable network port such as an Ethernet port, and a wireless network port allowing communication through one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems (like mobile agricultural application 160) are received on a removable Secure Digital (SD) card that is connected to a SD card interface 15. SD card interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts of the functionality in service 112 or mobile device 104. Processor 17 can be activated by other components to facilitate their functionality as well.

Examples of the settings 31 include things such as proxy information, Internet connection information, and mappings. Settings 35 include settings that tailor the application for a specific user. Settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 26 shows one example in which device 16 is a tablet computer 600. In FIG. 26, computer 600 is shown with user interface display screen 602. Screen 602 can be a touch screen (so touch gestures from a user's finger can be used to interact with the application) or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 27 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 28:
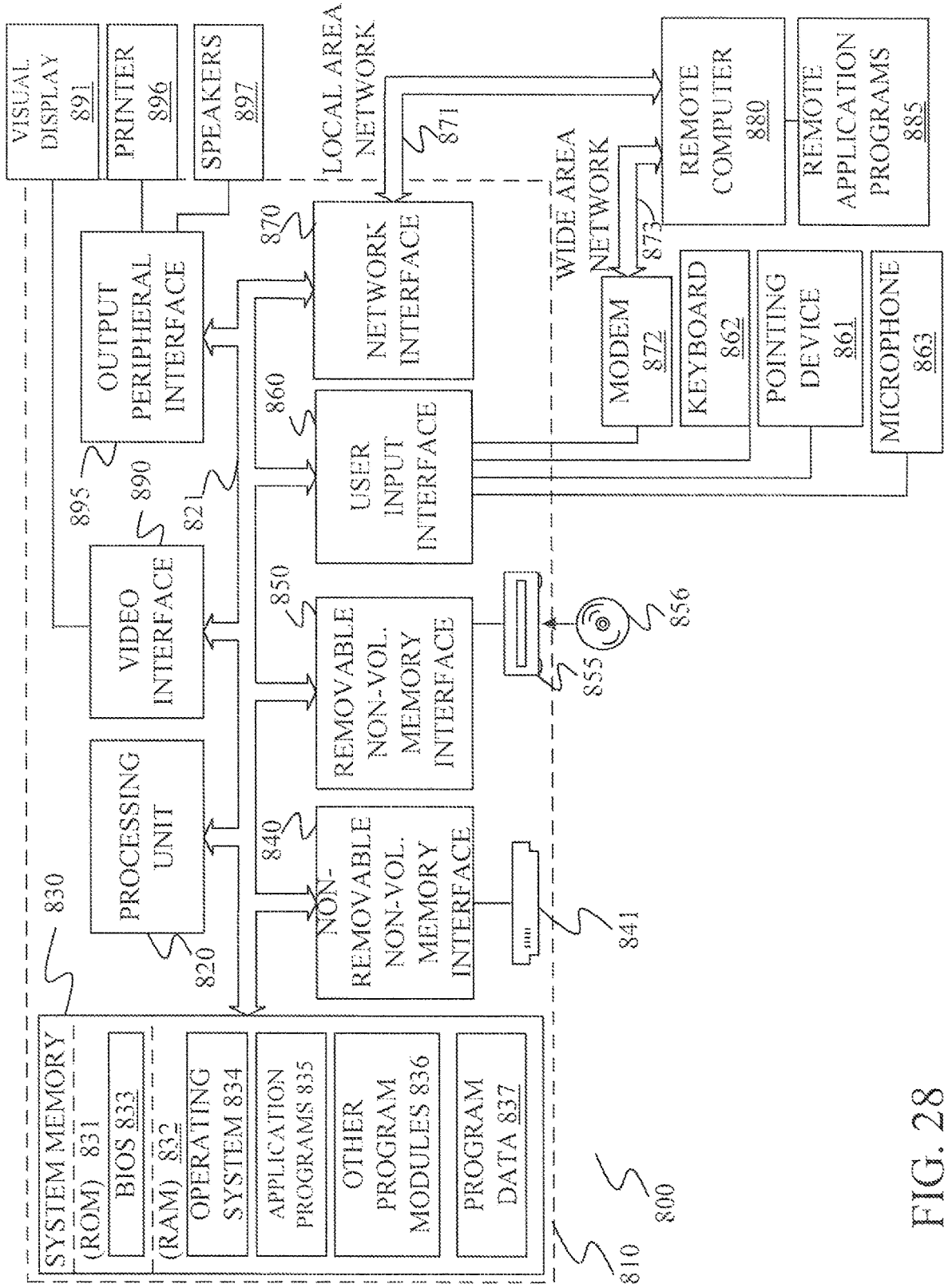
FIG. 28 is a block diagram of one example of a computing environment.

FIG. 28 is one example of a computing environment in which system 100, or parts of it, (for example) can be deployed. With reference to FIG. 28, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures using any of a variety of bus architectures. Such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Memory and programs described with respect previous FIGS. can be deployed in corresponding portions of FIG. 28.

Computer 810 typically includes a variety of computer readable media. Computer readable media can be any media (or a combination of media) that can be accessed by computer 810 and includes both volatile and nonvolatile media. The media can be removable or non-removable media. By way of example, and not limitation, computer readable media may comprise computer readable storage media and communication media. Computer readable storage media is different from, and does not include, a modulated data signal or carrier wave. It includes hardware storage media including both volatile and nonvolatile, removable and non-removable media implemented by any method or in any technology for storage of information such as computer readable instructions, data structures, program modules or other data. For instance, computer storage media includes, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can be accessed by computer 810. Communication media comprises computer readable instructions, data structures, program modules or other data in any information delivery media. The term "modulated data signal" means a signal that has one or more of its characteristics set or changed in such a manner as to encode information in the signal. By way of example, communication media includes wired network or direct-wired connection, and wireless media such as acoustic, RF, infrared and other wireless media.

The system memory 830 can include computer storage media in the form of read only memory (ROM) 831 and random access memory (RAM) 832. A basic input/output system 833 (BIOS), containing the basic routines that help to transfer information between elements within computer 810, such as during start-up, is normally stored in ROM 831. RAM 832 can store data and/or program modules that are immediately accessible to or are being operated on by processing unit 820, like operating system 834, applications 835, other program modules 836 and other data 837.

The computer 810 may also include other computer storage media. FIG. 28 shows a hard disk drive 841 that reads from or writes to magnetic media, and an optical disk drive 855 that reads from or writes to a removable, optical disk 856 such as a CD ROM or other optical media. The hard disk drive 841 can be connected to the system bus 821 through a memory interface such as interface 840, and optical disk drive 855 can be connected to the system bus 821 by a memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 28, provide storage of computer readable instructions, data structures, program modules and other data for the computer 810.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 28 include a local area network (LAN) 871, a controller area network (CAN), and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. For instance, FIG. 28 illustrates remote application programs 885 as residing on remote computer 880. It will be appreciated that the network connections shown are examples.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of automatically controlling an agricultural system, comprising:
   receiving predictive visual data indicative of an expected visualization of a geographic location on an agricultural worksite;
   receiving an actual visual representation of the geographic location;
   comparing the expected visualization of the geographic location to the actual visual representation of the geographic location to identify an anomaly;
   identifying a severity level of the identified anomaly:
   generating a geographically referenced anomaly indicator indicative of the severity level of the identified anomaly;
   generating an enhanced display, the enhanced display showing the geographic location enhanced with the geographically referenced anomaly indicator; and
   automatically controlling an agricultural machine in the agricultural system based on the geographically referenced anomaly indicator.

2. The computer-implemented method of claim 1 and further comprising:
   detecting a user interaction with the enhanced display;
   processing the detected user interaction to identify additional anomaly information corresponding to the identified anomaly; and
   modifying the enhanced display with the additional anomaly information.

3. The computer-implemented method of claim 2 wherein processing the detected user interaction comprises:
   performing diagnostic processing to identify, as the additional anomaly information, a diagnostic factor contributing to a possible cause of the anomaly; and
   generating a diagnostic factor display element, wherein modifying the enhanced display comprises adding the diagnostic factor display element to the enhanced display.

4. The computer-implemented method of claim 2 wherein processing the detected user interaction comprises:
   performing prognosis processing to identify remedial information indicative of a possible remedy for the anomaly; and
   generating a possible remedy display element, wherein modifying the enhanced display comprises adding the possible remedy display element to the enhanced display.

5. The computer-implemented method of claim 4 wherein the identified anomaly corresponds to a crop characteristic anomaly, and where the severity level of the identified anomaly corresponds to a severity level of the crop characteristic anomaly.

6. The computer-implemented method of claim 1 wherein identifying the severity level of the identified anomaly comprises:
   generating a metric value indicative of a measure of difference between the expected visualization and the actual visual representation of the geographic location;
   comparing the metric value to a metric threshold value to obtain a metric difference value; and
   identifying the severity level of the identified anomaly based on the metric difference value.

7. The computer-implemented method of claim 1 wherein receiving the predictive visual data comprises:
   identifying a neighboring geographic location adjacent the geographic location; and
   generating the predictive visual data based on a visualization of the neighboring geographic location.

8. The computer-implemented method of claim 1 wherein generating the geographically referenced anomaly indicator comprises:
   generating a geometric shaped display element, a geometric shape of the geometric shaped display element being indicative of the geographically referenced anomaly indicator.

9. The computer-implemented method of claim 1 wherein generating the geographically referenced anomaly indicator comprises:
   generating a display element having visual indicia, the visual indicia of the display element being indicative of the geographically referenced anomaly indicator.

10. The computer-implemented method of claim 1 wherein receiving predictive visual data indicative of the expected visualization of the geographic location on the agricultural worksite comprises:
    obtaining a prior state of the geographic location and prior conditions that affect the prior state;
    generating a predictive state of the geographic location based on the prior state and the prior conditions; and
    generating the predictive visual data based on the predictive state of the geographic location.

11. The computer-implemented method of claim 1 wherein generating the enhanced display showing the geographic location includes simultaneously showing the geographically referenced anomaly indicator and a data display including geographically referenced planting characteristics.

12. An agricultural system, comprising:
    an expected state identification system identifying predictive visual data indicative of an expected visualization of a geographic location on an agricultural worksite;
    a comparison system receiving an actual visual representation of the geographic location, the comparison system configured to generate a metric value indicative of a measure of difference between the expected visualization of the geographic location and the actual visual representation of the geographic location to generate a comparison result;
    an anomaly identifier identifying an anomaly based on the comparison result;
    an anomaly output system generating a geographically referenced anomaly indicator indicative of the anomaly;
    a display generation system generating an enhanced display, the enhanced display showing the geographic location enhanced with the geographically referenced anomaly indicator; and
    a control system configured to automatically control an agricultural machine in the agricultural system based on the geographically referenced anomaly indicator shown in the enhanced display.

13. The agricultural system of claim 12 and further comprising:
    a user interaction detector configured to detect a user interaction with the enhanced display;

a workflow processing system configured to process the detected user interaction to identify additional anomaly information corresponding to the identified anomaly; and a display output system configured to modify the enhanced display with the additional anomaly information.

14. The agricultural system of claim 13 wherein the workflow processing system comprises:
a diagnostic system configured to perform diagnostic processing to identify, as the additional anomaly information, a diagnostic factor contributing to a possible cause of the anomaly and generate a diagnostic factor display element, the display generation system modifying the enhanced display by adding the diagnostic factor display element to the enhanced display.

15. The agricultural system of claim 14 wherein the workflow processing system comprises:
a prognosis system configured to perform prognosis processing to identify remedial information indicative of a possible remedy for the anomaly and generate a possible remedy display element, the display generation system modifying the enhanced display by adding the possible remedy display element to the enhanced display.

16. The agricultural system of claim 12 wherein the comparison system is configured to compare the metric value to a metric threshold value to obtain a metric difference value and wherein the anomaly identifier is configured to identify a severity level of the identified anomaly based on the comparison result.

17. The agricultural system of claim 12 wherein the display generation system is configured to generate, as the geographically referenced anomaly indicator, a geometric shaped display element, a geometric shape of the geometric shaped display element being indicative of the geographically referenced anomaly indicator.

18. The agricultural system of claim 12 wherein the display generation system is configured to generate, as the geographically referenced anomaly indicator a colored display element, a color of the colored display element being indicative of the geographically referenced anomaly indicator.

19. The agricultural system of claim 12 and further comprising:
a prior state identification system configured to identify a prior state of the geographic location;
a prior condition identification system configured to identify prior conditions that affect the prior state; and
an expected state identification system configured to generate a predictive state of the geographic location based on the prior state and prior conditions.

20. A computing system, comprising:
non-transitory computer readable medium containing computer instructions stored therein for causing a computer processor to:
obtain predictive visual data indicative of an expected visualization of a geographic location on an agricultural worksite;
obtain an actual visual representation of the geographic location;
compare the expected visualization of the geographic location to the actual visual representation of the geographic location to identify an anomaly;
generate a geographically referenced anomaly indicator indicative of the anomaly;
generate an enhanced display showing the geographic location enhanced with a relationship between the geographically referenced anomaly indicator and seed singulation data; and
automatically control an agricultural machine based on the geographically referenced anomaly indicator shown in the enhanced display.

\* \* \* \* \*